US009167113B2

(12) United States Patent
Akiyoshi et al.

(10) Patent No.: US 9,167,113 B2
(45) Date of Patent: Oct. 20, 2015

(54) IMAGE FORMING APPARATUS AND METHODS USED IN THE IMAGE FORMING APPARATUS

(71) Applicants: Kunihiro Akiyoshi, Fukuoka (JP); Hiroyuki Tanaka, Fukuoka (JP); Mitsuo Ando, Fukuoka (JP)

(72) Inventors: Kunihiro Akiyoshi, Fukuoka (JP); Hiroyuki Tanaka, Fukuoka (JP); Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 13/907,384

(22) Filed: May 31, 2013

(65) Prior Publication Data

US 2013/0258407 A1 Oct. 3, 2013

Related U.S. Application Data

(60) Continuation of application No. 11/923,178, filed on Oct. 24, 2007, now Pat. No. 8,516,475, which is a division of application No. 10/660,723, filed on Sep. 12, 2003, now abandoned.

(30) Foreign Application Priority Data

| | | | |
|---|---|---|---|
| Sep. 13, 2002 | (JP) | ................................ | 2002-269280 |
| Sep. 13, 2002 | (JP) | ................................ | 2002-269281 |
| Sep. 13, 2002 | (JP) | ................................ | 2002-269282 |
| Sep. 14, 2002 | (JP) | ................................ | 2002-307636 |
| Sep. 14, 2002 | (JP) | ................................ | 2002-307637 |
| Sep. 9, 2003 | (JP) | ................................ | 2003-317280 |
| Sep. 9, 2003 | (JP) | ................................ | 2003-317281 |
| Sep. 9, 2003 | (JP) | ................................ | 2003-317282 |
| Sep. 9, 2003 | (JP) | ................................ | 2003-317283 |

(51) Int. Cl.
*G06F 9/44* (2006.01)
*G06F 9/445* (2006.01)
(Continued)

(52) U.S. Cl.
CPC .............. *H04N 1/00474* (2013.01); *G06F 8/60* (2013.01); *H04N 1/00962* (2013.01);
(Continued)

(58) Field of Classification Search
CPC .................... G06F 8/60–8/66; H04N 1/00962; H04N 1/00965; H04N 1/32502; H04N 1/32507; H04N 1/32523
USPC ......... 358/1.1, 1.11–1.18, 504; 717/171–178, 717/168, 169
See application file for complete search history.

(56) References Cited

U.S. PATENT DOCUMENTS

| | | | |
|---|---|---|---|
| 4,977,304 | A | 12/1990 | Ino et al. |
| 5,060,071 | A | 10/1991 | Ino |

(Continued)

FOREIGN PATENT DOCUMENTS

| | | | |
|---|---|---|---|
| CN | 1035375 | A | 9/1989 |
| CN | 1224862 | A | 8/1999 |

(Continued)

OTHER PUBLICATIONS

U.S. Appl. No. 13/886,578, filed May 3, 2013, Akiyoshi.

(Continued)

*Primary Examiner* — Chad Dickerson
(74) *Attorney, Agent, or Firm* — Oblon, McClelland, Maier & Neustadt, L.L.P.

(57) ABSTRACT

An image forming apparatus in which applications can be installed is provided, in which the image forming apparatus includes an application information obtaining part for obtaining application information that is used for determining whether an application is installable in the image forming apparatus.

12 Claims, 80 Drawing Sheets

(51) Int. Cl.
*H04N 1/00* (2006.01)
*H04N 1/32* (2006.01)
*G06F 3/12* (2006.01)

(52) U.S. Cl.
CPC ...... *H04N 1/00965* (2013.01); *H04N 1/32502* (2013.01); *H04N 1/32507* (2013.01); *H04N 1/32523* (2013.01); *H04N 2201/0094* (2013.01)

(56) References Cited

U.S. PATENT DOCUMENTS

| | | | | |
|---|---|---|---|---|
| 5,412,798 | A | 5/1995 | Garney | |
| 5,630,076 | A | 5/1997 | Saulpaugh et al. | |
| 5,678,135 | A | 10/1997 | Fukui et al. | |
| 5,699,494 | A | 12/1997 | Colbert et al. | |
| 5,870,467 | A | 2/1999 | Imai et al. | |
| 5,953,530 | A | 9/1999 | Rishi et al. | |
| 5,974,454 | A | 10/1999 | Apfel et al. | |
| 6,091,508 | A | 7/2000 | Love et al. | |
| 6,138,178 | A | 10/2000 | Watanabe | |
| 6,226,665 | B1 | 5/2001 | Deo et al. | |
| 6,236,814 | B1 | 5/2001 | Yago | |
| 6,252,609 | B1 | 6/2001 | Kanno | |
| 6,493,871 | B1 | 12/2002 | Welch et al. | |
| 6,618,857 | B1 * | 9/2003 | Zimniewicz et al. | 717/175 |
| 6,662,363 | B1 * | 12/2003 | Miyamoto | 717/174 |
| 6,675,382 | B1 * | 1/2004 | Foster | 717/177 |
| 6,704,933 | B1 * | 3/2004 | Tanaka et al. | 725/132 |
| 6,717,690 | B1 | 4/2004 | Salgado et al. | |
| 6,990,659 | B1 | 1/2006 | Imai | |
| 7,146,412 | B2 | 12/2006 | Turnbull | |
| 7,227,656 | B1 | 6/2007 | Kato | |
| 2001/0027517 | A1 | 10/2001 | Kato | |
| 2002/0002604 | A1 | 1/2002 | Nomura et al. | |
| 2002/0002630 | A1 | 1/2002 | Nomura et al. | |
| 2002/0004870 | A1 | 1/2002 | Kobayashi | |
| 2002/0013829 | A1 | 1/2002 | Kishimoto | |
| 2002/0016166 | A1 | 2/2002 | Uchida et al. | |
| 2002/0067504 | A1 | 6/2002 | Salgado et al. | |
| 2002/0112200 | A1 | 8/2002 | Hines | |
| 2002/0129353 | A1 | 9/2002 | Williams et al. | |
| 2002/0140966 | A1 | 10/2002 | Meade et al. | |
| 2002/0156947 | A1 | 10/2002 | Nishio | |
| 2003/0058471 | A1 | 3/2003 | Okubo | |
| 2003/0137682 | A1 | 7/2003 | Sakai et al. | |
| 2004/0015949 | A1 | 1/2004 | Taylor | |
| 2004/0210893 | A1 | 10/2004 | Chamberlain et al. | |
| 2008/0098389 | A1 | 4/2008 | Akiyoshi et al. | |

FOREIGN PATENT DOCUMENTS

| | | | | |
|---|---|---|---|---|
| CN | 1236344 | A | | 11/1999 |
| CN | 1261690 | A | | 8/2000 |
| CN | 1321933 | A | | 11/2001 |
| EP | 0 576 305 | A1 | | 12/1993 |
| EP | 0 858 022 | A2 | | 8/1998 |
| EP | 0 949 083 | A1 | | 10/1999 |
| JP | 5-158672 | | | 6/1993 |
| JP | 8-87404 | | | 4/1996 |
| JP | 8-137686 | | | 5/1996 |
| JP | 8-305589 | | | 11/1996 |
| JP | 10-31590 | | | 2/1998 |
| JP | 10-247141 | | | 9/1998 |
| JP | H10-260873 | | | 9/1998 |
| JP | 11-112701 | | | 4/1999 |
| JP | 11-296453 | | | 10/1999 |
| JP | 11-353136 | | | 12/1999 |
| JP | 2000-76085 | | | 3/2000 |
| JP | 2000-285010 | | | 10/2000 |
| JP | 2001-100981 | | | 4/2001 |
| JP | 2001-337852 | | | 12/2001 |
| JP | 2001-350631 | | | 12/2001 |
| JP | 2002-82806 | | | 3/2002 |
| JP | 2002-166628 | | | 6/2002 |
| JP | 2002-169739 | | | 6/2002 |
| JP | 2002-207606 | | | 7/2002 |
| JP | 2002366364 | A | * | 12/2002 |
| JP | 2003-216392 | | | 7/2003 |
| WO | WO 99/55534 | | | 11/1999 |
| WO | WO 02/06951 | A2 | | 1/2002 |

OTHER PUBLICATIONS

U.S. Appl. No. 13/886,578, filed May 3, 2013.
Office Action issued Sep. 16, 2010 in co-pending U.S. Appl. No. 11/923,207.
Office Action issued Sep. 18, 2014 in co-pending U.S. Appl. No. 13/628,933.
Office Action issued Jul. 6, 2010 in Japan Patent Application No. 2007-293492.

* cited by examiner

FIG.7

```
int main(int argc, char   argv)
{
  if(argc==2) {
      if(strcmp(argv[1], "-v")==0)
          //EXECUTE TENTATIVE LAUNCH
            if(ConnectVAS()==OK){  //PREPARE COMMUNICATION WITH VAS
                  SetApliInfo();        //PROVIDING APPLICATION INFORMATION
                        Close           //END OF COMMUNICATION
            }
            exit(1)
      }
   }
  NORMAL LAUNCH PROCESSING
}
```

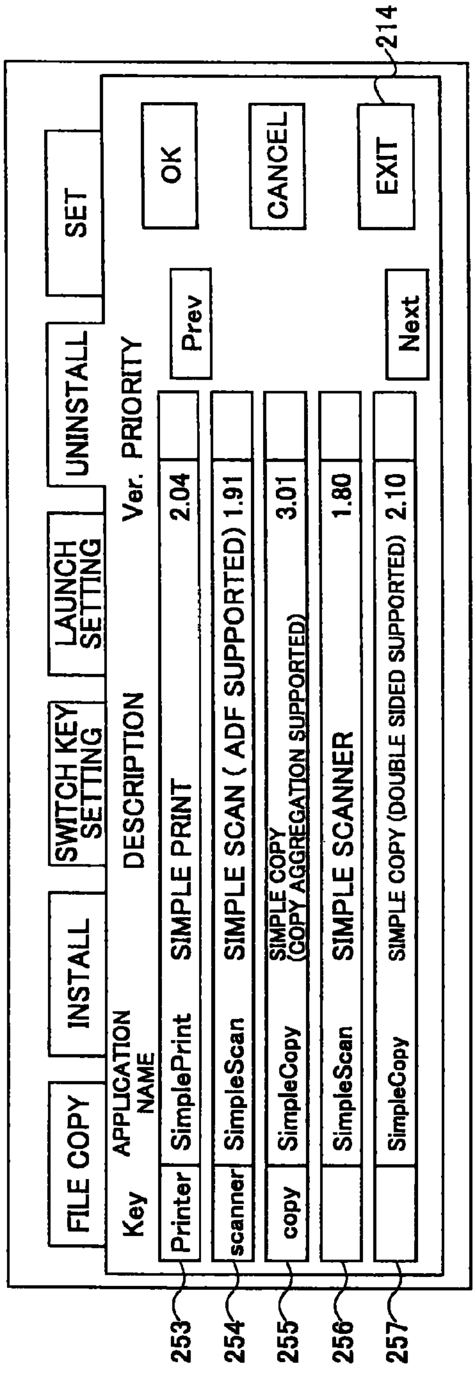

FIG.33A

| Key | APPLICATION NAME | DESCRIPTION | Ver. | PRIORITY |
|---|---|---|---|---|
| Printer | SimplePrint | SIMPLE PRINT | 2.04 | |
| scanner | SimpleScan | SIMPLE SCAN (ADF SUPPORTED) | 1.91 | |
| copy | SimpleCopy | SIMPLE COPY (COPY AGGREGATION SUPPORTED) | 3.01 | |
| | SimpleScan | SIMPLE SCANNER | 1.80 | |
| | SimpleCopy | SIMPLE COPY (DOUBLE SIDED SUPPORTED) | 2.10 | |

Tabs: FILE COPY | INSTALL | SWITCH KEY SETTING | LAUNCH SETTING | UNINSTALL | SET Buttons: Prev | OK | CANCEL | Next | EXIT (214)

Labels: 253, 254, 255, 256, 257

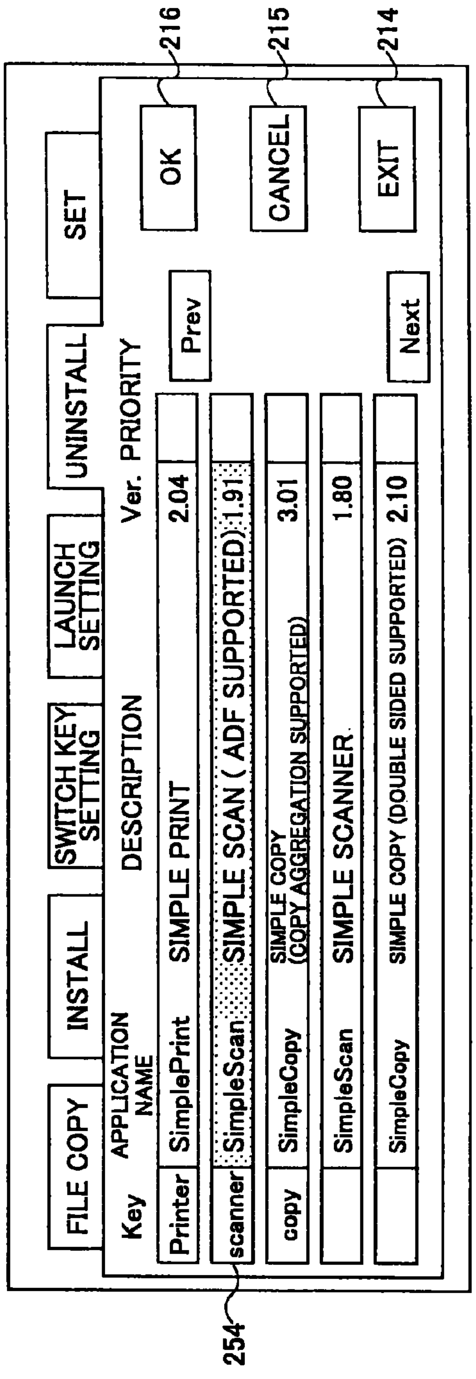

FIG.33B

| Key | APPLICATION NAME | DESCRIPTION | Ver. | PRIORITY |
|---|---|---|---|---|
| Printer | SimplePrint | SIMPLE PRINT | 2.04 | |
| scanner | SimpleScan | SIMPLE SCAN (ADF SUPPORTED) | 1.91 | |
| copy | SimpleCopy | SIMPLE COPY (COPY AGGREGATION SUPPORTED) | 3.01 | |
| | SimpleScan | SIMPLE SCANNER | 1.80 | |
| | SimpleCopy | SIMPLE COPY (DOUBLE SIDED SUPPORTED) | 2.10 | |

Tabs: FILE COPY | INSTALL | SWITCH KEY SETTING | LAUNCH SETTING | UNINSTALL | SET Buttons: Prev | OK (216) | CANCEL (215) | Next | EXIT (214)

Label: 254

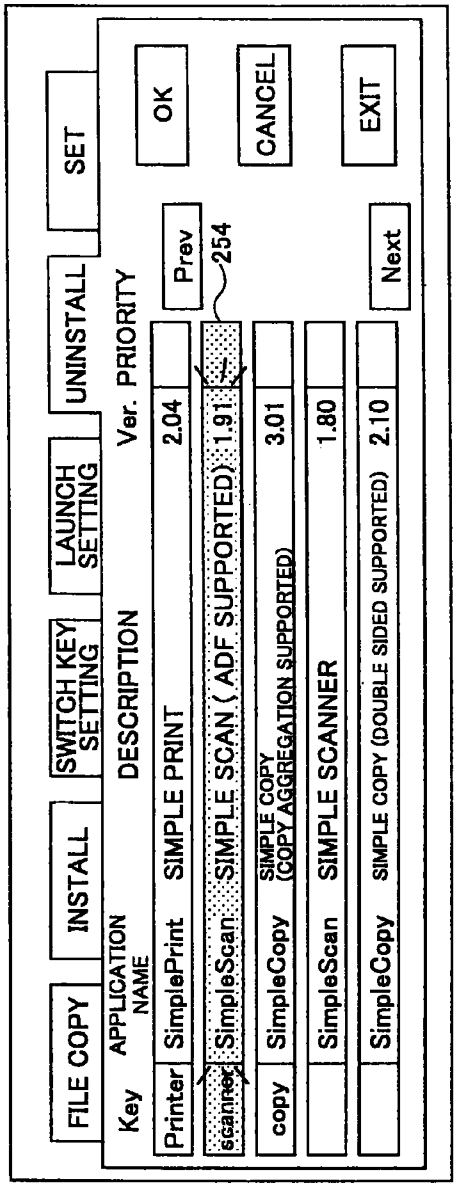

FIG.34A

| Key | APPLICATION NAME | DESCRIPTION | Ver. | PRIORITY |
|---|---|---|---|---|
| Printer | SimplePrint | SIMPLE PRINT | 2.04 | |
| scanner | SimpleScan | SIMPLE SCAN ( ADF SUPPORTED) | 1.91 | Prev —254 |
| copy | SimpleCopy | SIMPLE COPY (COPY AGGREGATION SUPPORTED) | 3.01 | |
| | SimpleScan | SIMPLE SCANNER | 1.80 | |
| | SimpleCopy | SIMPLE COPY (DOUBLE SIDED SUPPORTED) | 2.10 | Next |

FILE COPY | INSTALL | SWITCH KEY SETTING | LAUNCH SETTING | UNINSTALL | SET

OK | CANCEL | EXIT

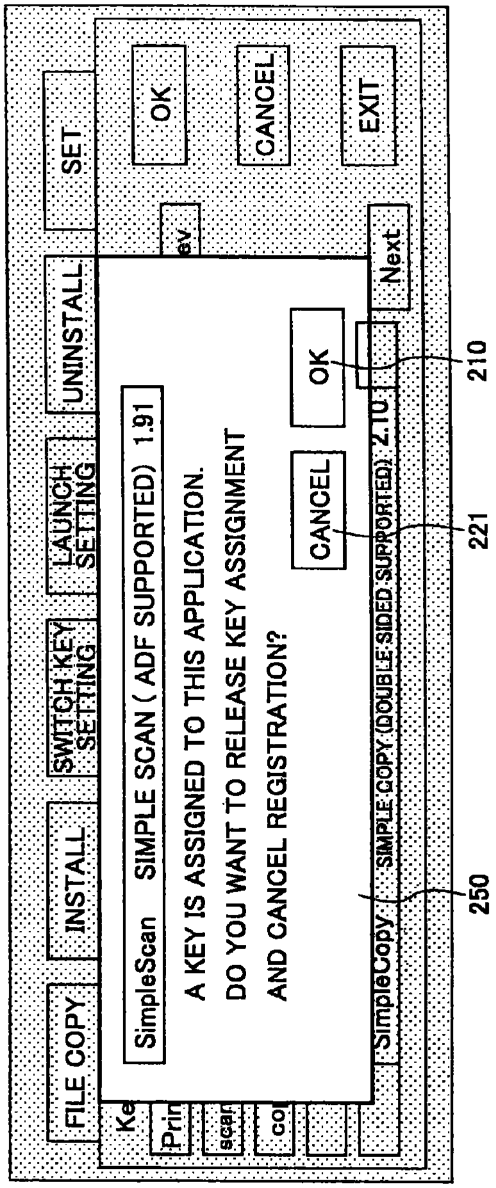

FIG.34B

SimpleScan  SIMPLE SCAN ( ADF SUPPORTED) 1.91

A KEY IS ASSIGNED TO THIS APPLICATION.
DO YOU WANT TO RELEASE KEY ASSIGNMENT
AND CANCEL REGISTRATION?

OK —210
CANCEL —221

SimpleCopy  SIMPLE COPY (DOUBLE SIDED SUPPORTED) 2.10 —250

FIG.39

RESOURCE USE INFORMATION FILE 201

| APPLICATION ID | TEXT MEMORY AREA SIZE | HEAP AREA SIZE | STACK AREA SIZE |
|---|---|---|---|
| 101 | 3MB | 1MB | 10KB |
| 102 | 2MB | 500KB | 5KB |
| 103 | 4MB | 200KB | 3KB |
| . . . | . . . | . . . | . . . |

FIG.40

PROC STRUCTURE 211

| MEMBER NAME | DESCRIPTION |
|---|---|
| p_pid | PROCESS ID |
| p_txtsz | TEXT MEMORY AREA SIZE |
| p_heapsz | HEAP AREA SIZE, |
| p_stacksz | STACK AREA SIZE |
| . . . | . . . |

FIG.60

| APPLICATION ID | INCOMPATIBLE APPLICATION ID |
|---|---|
| 101 | 105,103 |
| 102 | 104 |
| 103 | 101 |
| 104 | 102 |
| 105 | 101 |

FIG.61

| APPLICATION ID | ATTRIBUTE | OPERATION TARGET | APPLICATION NAME | VERSION |
|---|---|---|---|---|
| 101 | PRINTER TYPE | PRINTER | SP PRINT | 1.1 |
| 102 | AUTHENTICATION TYPE | OPERATION PANEL | VERIFICATION AP | 2.0 |
| 103 | BILLING TYPE | BILLING COUNTER | COUNT PLUS | 1.01 |
| 104 | AUTHENTICATION TYPE | OPERATION PANEL | AUTHENTICATION AP | 1.5 |
| 105 | PRINTER TYPE | PRINTER | SP PRINT | 1.2 |
| ⋮ | ⋮ | ⋮ | ⋮ | ⋮ |

OPERATION PANEL

2211 — <LAUNCH REQUEST APPLICATION LIST>
① SP PRINT (Ver. 1.2)
② VERIFICATION AP (Ver. 2.0)
③ AUTHENTICATION AP (Ver. 1.5)

2212 — <NOT LAUNCHABLE APPLICATION LIST>PLEASE SELECT A BUTTON

| NAME | VERSION | ATTRIBUTE | TARGET |
|---|---|---|---|
| ● VERIFICATION AP | 2.0 | AUTHENTICATION TYPE | OPERATION PANEL |
| ○ AUTHENTICATION AP | 1.5 | AUTHENTICATION TYPE | OPERATION PANEL |

FIG.68

INDISPENSABLE APPLICATION INFORMATION FILE

| APPLICATION ID | PRESENCE OR ABSENCE OF INDISPENSABLE APPLICATION | TYPE OF APPLICATION | CORRESPONDING APPLICATION ID |
|---|---|---|---|
| 101 | × | COPY | — |
| 102 | × | PRINTER | — |
| 103 | ○ | BROWSER | 105 |
| 104 | × | FAX | — |
| 105 | ○ | PLUG-IN | 103 |
| ⋮ | ⋮ | ⋮ | ⋮ |

FIG.69

OPERATION PANEL

| [LAUNCH REQUESTED APPLICATION] | [PRESENCE OR ABSENCE OF INDISPENSABLE APPLICATION] | [INDISPENSABLE APPLICATION] | [PRESENCE OR ABSENCE OF LAUNCH] |
|---|---|---|---|
| 1.BROWSER | ○ | PLUG-IN | × |
| 2.PRINTER | × | — | ○ |

<LAUNCH ERROR MESSAGE>

PLEASE LAUNCH BOTH OF BROWSER AND PLUG-IN

FIG.74

| PRODUCT ID | APPLICATION OF INCOMPATIBLE OR INDISPENSABLE RELATIONSHIP |
|---|---|
| 101 | 105(−3),103(+1) |
| 102 | 101(−3) |
| 103 | 101(+1) |
| 104 | 105(−2),106(+2) |
| ⋮ | ⋮ |

IMAGE FORMING APPARATUS AND METHODS USED IN THE IMAGE FORMING APPARATUS

CROSS REFERENCE TO RELATED APPLICATION

The present Continuation application claims the benefit of priority under 35 U.S.C. §120 to application Ser. No. 11/923,178, filed on Oct. 24, 2007, which is a Divisional application of application Ser. No. 10/660,723, filed Sep. 12, 2003, which is based upon and claims benefit of priority from the prior Japanese Patent Application Nos. 2002-269280, filed Sep. 13, 2002; 2002-269281, filed Sep. 13, 2002; 2002-269282, filed Sep. 13, 2002; 2002-307636, filed Sep. 14, 2002; 2002-307637, filed Sep. 14, 2002; 2003-317280, filed Sep. 9, 2003; 2003-317281, filed Sep. 9, 2003; 2003-317282, filed Sep. 9, 2003; and 2003-317283, filed Sep. 9, 2003; the contents of all of which are incorporated herein by reference.

BACKGROUND OF THE INVENTION

1. Field of the Invention

The present invention relates to an image forming apparatus that provides user services relating to image forming processes such as copying, printing, scanning, facsimile and the like.

2. Description of the Related Art

Recently, an image forming apparatus (to be referred to as a compound machine hereinafter) that includes functions of a printer, a copier, a facsimile, a scanner and the like in a cabinet is generally known. The compound machine includes a display part, a printing part and an image pickup part and the like in a cabinet. In the compound machine, three pieces of software corresponding to the printer, copier and facsimile respectively are provided, so that the compound machine functions as the printer, the copier, the scanner and the facsimile respectively by switching the software.

According to such a conventional compound machine, application programs corresponding to each of the capabilities such as printing, copying, faxing and scanning are launched. As for the existing application programs, since resource amounts to be used by the applications, and consistency of versions between applications and the system of the compound machine and the like are known beforehand, the applications can be simply installed into the compound machine and can be launched. Therefore, for example, it is not necessary to check resource amounts to be used by the applications before installing the applications or before launching the applications.

Since the conventional compound machine is provided with each software for the printer, the copier, the scanner and the facsimile individually, much time is required for developing the software. Therefore, the applicant has developed an image forming apparatus (compound machine) including hardware resources, a plurality of applications, and a platform including various control services provided between the applications and the hardware resources. The hardware resources include a display part, a printing part and an image pickup part. The applications perform processes intrinsic for user services of printer, copier and facsimile and the like. The platform includes various control services performing management of hardware resources necessary for at least two applications commonly, performing execution control of the applications, and performing image forming processes, when a user service is executed.

According to the compound machine, since the control services are provided separately from the applications, a new application that is developed by a user or a third party vendor can be installed in the compound machine. Therefore, there are following problems.

As for the existing applications such as the copy application, since the version and a necessary resource amount are known beforehand, there is no possibility of malfunction due to inconsistency of version or lack of resources when the application is installed and launched. However, as to the new application developed by the third vendor or the user, the status (version and available resources and the like) of the compound machine is not considered when developing the new application. Thus, there is a possibility that the operation of the compound machine becomes unstable when the new application is launched. More particularly, for example, when a necessary resource amount used by the new application is larger than the available resource amount in the compound machine, the operation of the compound machine may be stopped due to lack of the resource.

In addition, as for the existing applications for copying, printing, faxing and scanning, these applications are configured such that they operate stably even when they are executed simultaneously in the compound machine. However, as for the new application developed by the third party, the new application is not necessarily developed in consideration of compatibility with other applications. Therefore, in a case when the new application and another application are mutually incompatible, if the new application is executed simultaneously with the another application, the new application operates abnormally or does not operate. For solving this problem, it can be considered to assign priorities to applications. However, the priorities should be updated each time when a new application is installed. In addition, for a general user, it is difficult to determine priorities of the applications.

In addition, among new applications developed by the third vendor, there may be a new application that should be executed with another application. If a user executes only the new application that needs the another application, the new application can not provide its full capabilities, or the application may be stopped.

SUMMARY OF THE INVENTION

A first object of the present invention is to provide an image forming apparatus and a method for obtaining application information for determining whether an application is installable. A second object of the present invention is to provide an image forming apparatus and a method for displaying the application information on an operation panel. A third object of the present invention is to provide an image forming apparatus and a method for performing launch restriction process according to information on resources. A fourth object of the present invention is to provide an image forming apparatus and a method for performing launch control for incompatible or indispensable applications.

The above-mentioned object is achieved by an image forming apparatus in which applications can be installed, in which the image forming apparatus includes: an application information obtaining part for obtaining application information that is used for determining whether an application is installable in the image forming apparatus.

According to the present invention, it can be determined whether an application is installable.

The above-mentioned object is also achieved by an image forming apparatus including an operation panel for displaying or inputting operation information, in which the image forming apparatus includes:

an information obtaining part for obtaining application information on an application to be used in the image forming apparatus; and a display part for displaying the application information or information related to the application information on the operation panel.

According to the present invention, since application information is displayed on the operation panel, the user can determine whether an application is installable.

The above-mentioned object is also achieved by an image forming apparatus in which a plurality of applications can be installed, in which the image forming apparatus includes:

an information obtaining part for obtaining necessary resource information for executing an application and available resource information in the image forming apparatus; and a launch restriction part for comparing the necessary resource information and the available resource information, and performing launch restriction process on the application according to the result of comparison between the necessary resource information and the available resource information.

According to the present invention, the image forming apparatus can prevent erroneous launch of an application for which resources are lacking. Thus, the image forming apparatus can operate stably.

The above-mentioned object is also achieved by an image forming apparatus in which a plurality of applications can be installed, in which the image forming apparatus includes:

a part for referring to a database which includes, for each application, information on propriety of combination of applications; and a launch control part for performing launch control process on an application according to the information on propriety.

According to the present invention, proper applications can be launched according to the information on propriety of combination of applications.

BRIEF DESCRIPTION OF THE DRAWINGS

Other objects, features and advantages of the present invention will become more apparent from the following detailed description when read in conjunction with the accompanying drawings, in which:

FIG. 7 shows an example of a program description (main function) of an application including the provisional launch function;

FIGS. 29-36 shows screens for uninstall operations according to the second embodiment;

FIG. 39 shows an example of the resource use information file 1201;

FIG. 40 shows an example of the proc structure 211 that is referred to by the resource use information obtaining thread 1141;

FIG. 60 shows an example of the application compatibility information file 2201;

FIG. 61 shows another file according to the fifth embodiment;

FIG. 68 is an example of the indispensable application information file 2202;

FIG. 69 is an example of a screen for prompting the user to launch an indispensable application (plug-in) for a launch-requested-application (browser);

FIG. 74 shows a database of the eighth embodiment;

DETAILED DESCRIPTION OF THE PREFERRED EMBODIMENTS

In the following, embodiments of the image forming apparatus and the method will be described with reference to figures.

(First Embodiment)

Figure 1:
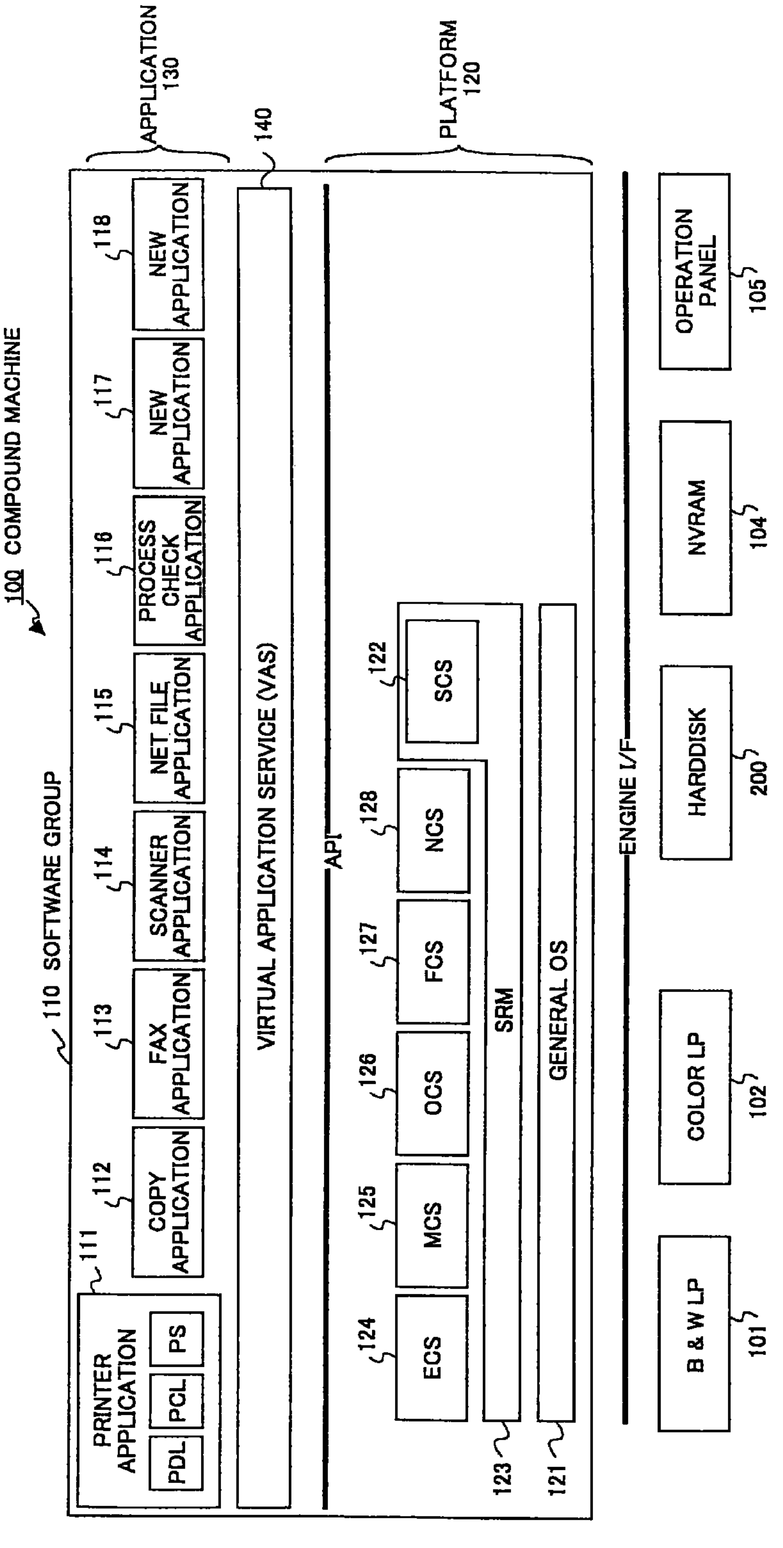
FIG. 1 is a block diagram of a compound machine according to the first embodiment of the present invention.

FIG. 1 is a block diagram of an image forming apparatus (to be referred to as a compound machine hereinafter) according to the first embodiment of the present invention. As shown in FIG. 1, the compound machine 100 includes hardware resources and a software group 110. The hardware resources include a black and white line printer (B&W LP) 101, a color laser printer 102, and hardware resources 103 such as a scanner, a facsimile, a hard disk, memory (RAM, NV-RAM, ROM and the like) and a network interface. The software group 110 includes a platform 120, applications 130 and a virtual application service 140 (to be referred to as VAS hereinafter).

The VAS 140 operates as a client process for the control services and operates as a server process for the applications. The VAS 140 obtains application information before performing install process, in which the install process is performed for making an application launchable in the compound machine. Then, the VAS 140 produces an application information file in the hard disk 200. As an example of the information that is obtained is product information. The product information includes a product ID, a vendor name, an application name, a version, a contact address (telephone number), required resources, determination on install, and related application information. The product information can be included in an execution file of the application, or can be obtained by reading a file via a network for example. In addition, when the product information has been stored in the hard disk 200, a NVRAM 104, an application information table 106 or the like, the product information can be obtained by reading one of them.

The application information included in the application execution file can be obtained by the VAS 140 by provisionally launching the application to enable interprocess communication between the VAS 140 and the application.

By provisionally launching the application, the application information in the execution file of the application can be obtained by the VAS 140 by using interprocess communication between the VAS 140 and the application.

The application is copied to the hard disk from a PC card, IC card, SD card and the like, for example. Then, install process is performed for the application, in which the application is set to be launchable. In the present embodiment, before performing the install process, the VAS obtains the application information that relates to the application, so that the VAS can determine whether the application can be installed or not in the compound machine. Whether the application can be installed or not is determined according to whether the application causes the compound machine to operate unstably or to stop its operation due to lack of resources or inconsistency of versions or the like. The reason for performing the check of the application before installing the application is that it is meaningless to install an application that cannot be launched, and that, the application may adversely affect the operation of the compound machine if the application is erroneously launched.

The platform 120 includes control services for interpreting a process request from an application and issuing an acquiring request for hardware resources, a system resource manager (SRM) 123 for managing one or more hardware resources and arbitrating the acquiring requests from the control services, and a general-purpose OS 121.

The control services include a plurality of service modules, which are a system control service (SCS) 122, an engine control service (ECS) 124, a memory control service (MCS) 125, an operation panel control service (OCS) 126, a fax control service (FCS) 127, a network control service (NCS) 128. In addition, the platform 120 has application program interfaces (API) that can receive process requests from the applications 130 by using predetermined functions.

The general purpose OS 121 is a general purpose operating system such as UNIX, and can execute each piece of software of the platform 120 and the applications 130 concurrently as a process.

The process of the SRM 123 is for performing control of the system and for performing management of resources with the SCS 122. The process of the SRM 123 performs arbitration and execution control for requests from the upper layer that uses hardware resources including engines such as the scanner part and the printer part, a memory, a HDD file, host I/Os (Centronics I/F, network I/F IEEE1394 I/F, RS232C I/F and the like).

More specifically, the SRM 123 determines whether the requested hardware resource is available (whether it is not used by another request), and, when the requested hardware resource is available, notifies the upper layer that the requested hardware resource is available. In addition, the SRM 123 performs scheduling for using hardware resources for the requests from the upper layer, and directly performs processes corresponding to the requests (for example, paper transfer and image forming by a printer engine, allocating memory area, file generation and the like).

The process of the SCS 122 performs application management, control of the operation part, display of system screen, LED display, resource management, and interrupt application control.

The process of the ECS 124 controls engines of hardware resources including the white and black laser printer (B&W LP) 101, the color laser printer (Color LP) 102, the scanner, and the facsimile and the like. The process of the MCS 125 obtains and releases an area of the image memory, uses the hard disk apparatus (HDD), and compresses and expands image data.

The process of the FCS 127 provides APIs for sending and receiving of facsimile from each application layer by using PSTN/ISDN network, registering/referring of various kinds of facsimile data managed by BKM (backup SRAM), facsimile reading, facsimile receiving and printing, and mixed sending and receiving.

The NCS 128 is a process for providing services commonly used for applications that need network I/O. The NCS 128 distributes data received from the network by a protocol to a corresponding application, and acts as mediation between the application and the network when sending data to the network. More specifically, the process of the NCS 128 includes server daemon such as ftpd, httpd, lpd, snmpd, telnetd, smtpd, and client function of the protocols.

The process of the OCS 126 controls an operation panel that is a means for transferring information between the operator (user) and control parts of the machine. In the compound machine 100 of the embodiment, the OCS 126 includes an OCS process part and an OCS function library part. The OCS process part obtains an key event, which indicates that the key is pushed, from the operation panel, and sends a key event function corresponding to the key event to the SCS 122. The OCS function library registers drawing functions and other functions for controlling the operation panel, in which the drawing functions are used for outputting various images on the operation panel on the basis of a request from an application or from the control service. The OCS function library is dynamically linked to the application and each module of the control services. All of the OCS 126 can be configured as a process, or can be configured as an OCS library.

The application 130 includes a printer application 111 that is an application for a printer having page description language (PDL) and PCL and post script (PS), a copy application 112, a fax application 113, a scanner application 114 that is an application for a scanner, a network file application 115, a process check application 116 and the new applications 117 and 118. These applications are applications specific for the compound machine 100. When the application is launched, the application sends an application registration request message with the process ID to the VAS 140. Then, the VAS 140 performs registration process for the application.

Interprocess communication is performed between a process of the application 130 and a process of the control service, in which a function is called, a returned value is sent, and a message is sent and received. By using the interprocess communication, user services for image forming processes such as copying, printing, scanning, and sending facsimile are realized.

As mentioned above, the compound machine 100 of the first embodiment includes a plurality of applications 130 and a plurality of control services, and each of those operates as a process. In each process, one or more threads are generated and the threads are executed in parallel. The control services provide common services to the applications 130. User services on image formation such as copying, printing, scanning and sending facsimile are provided while the processes are executed in parallel, the threads are executed in parallel, and interprocess communication is performed. A third party vendor can develop applications for the compound machine 100, and can executes the application in an application layer on the control service layer in the compound machine 100. The new applications 117 and 118 shown in FIG. 1 are the examples. The new application can be added or deleted one by one.

Figure 2:
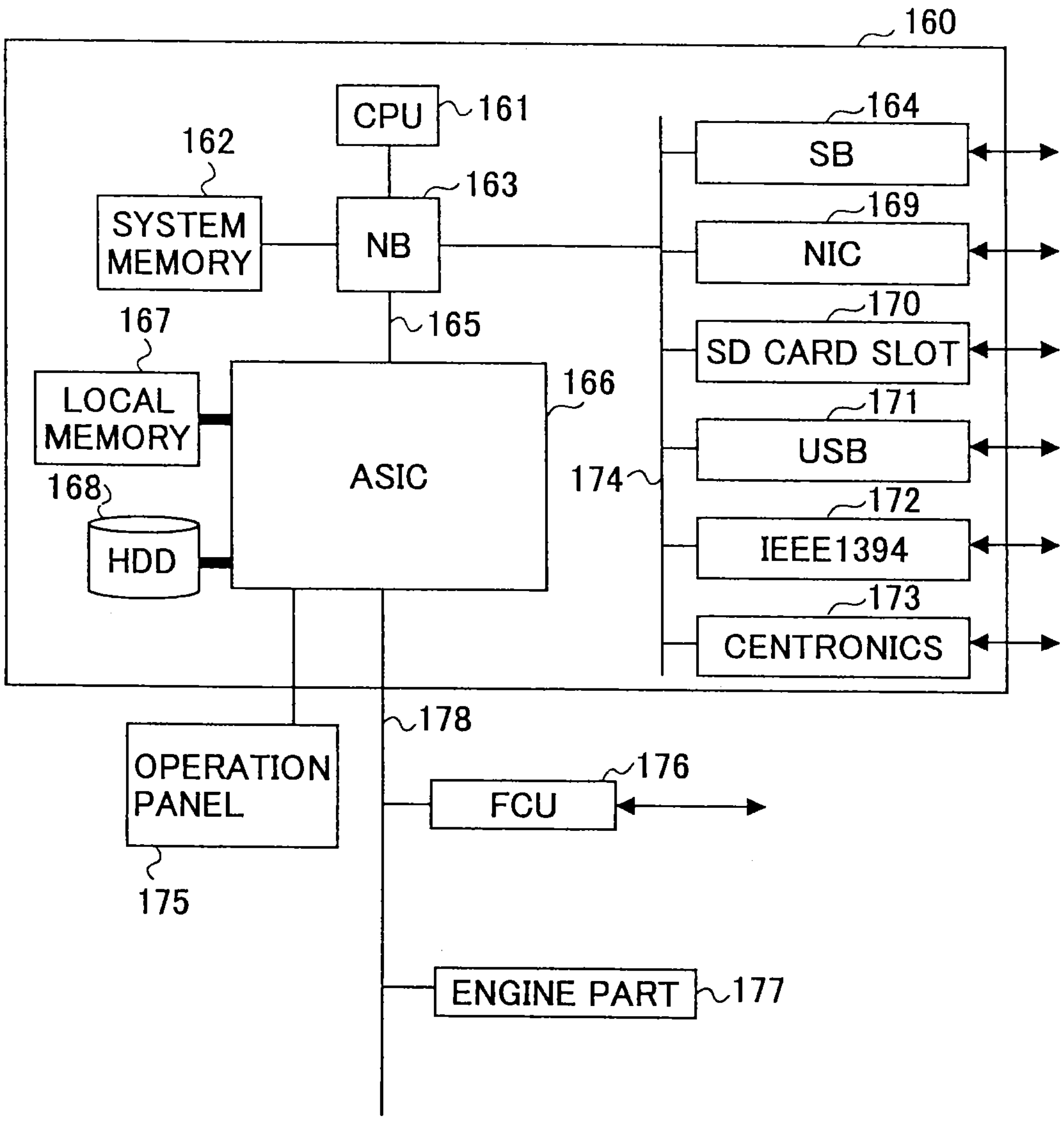
FIG. 2 is a block diagram of the hardware configuration of the compound machine according to the first embodiment.

FIG. 2 shows an example of a hardware configuration of the compound machine 100.

The compound machine 100 includes a controller 160, an operation panel 175, a fax control unit (FCU) 176, and an engine part 177 that is hardware resource such as a printer that is specific for image forming processing. The controller 160 includes CPU 161, a system memory 162, a north bridge (NB) 163, a south bridge (SB) 164, ASIC 166, a local memory 167, HDD 168, a network interface card (NIC) 169, a SD card slot 170, a USB device 171, an IEEE1394 device 172, and a Centronics 173. The memories 162, 167 may includes RAMs and/or ROMs, for example. The FCU 176 and the engine part 177 are connected to the ASIC 166 in the controller via a PCI bus 178. The CPU 161 executes programs of the application and control services and the like installed in the compound machine 100 by reading data from a RAM.

Figure 3:
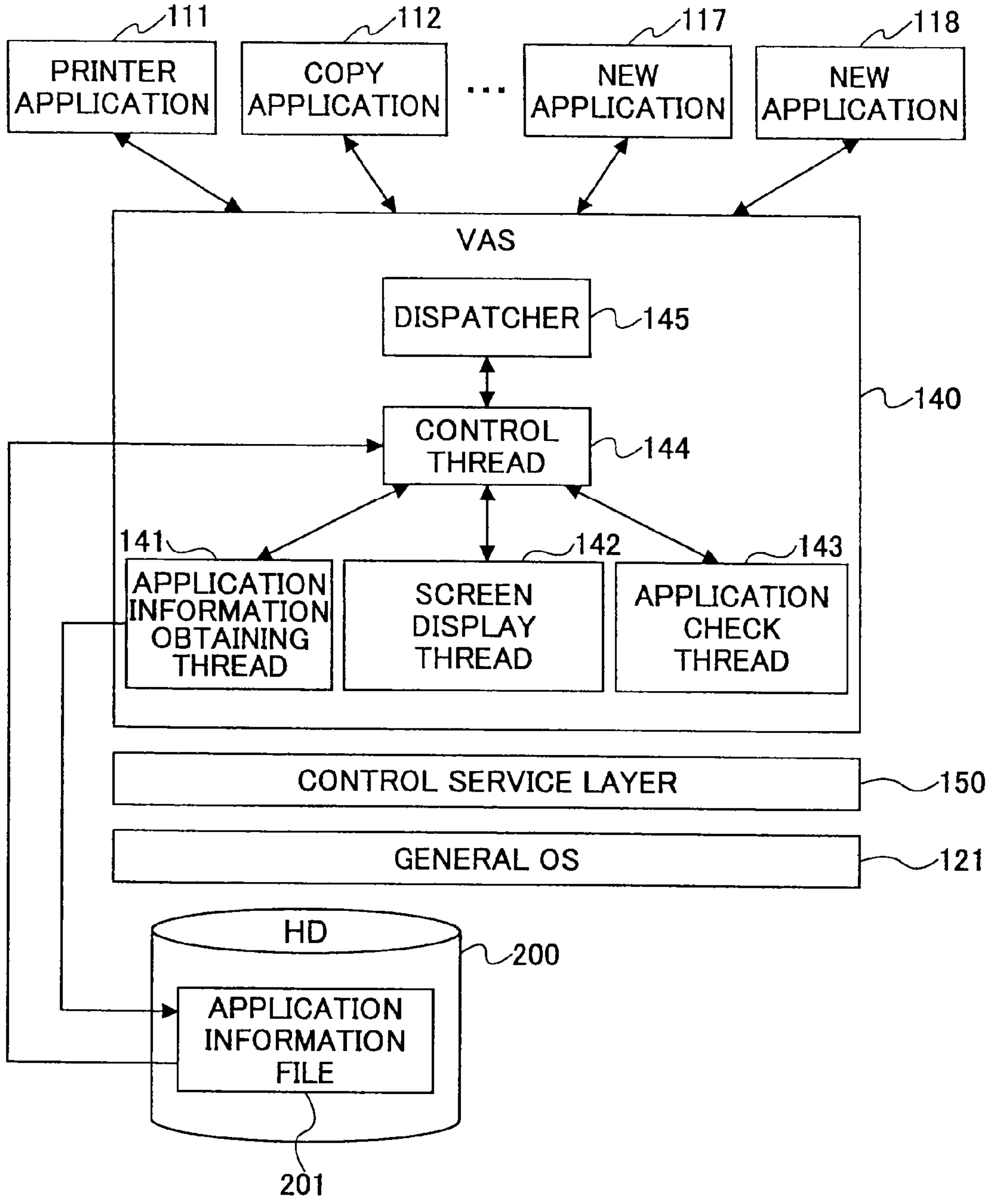
FIG. 3 is a block diagram showing the configuration of the VAS 140, and relationship among the VAS 140, each application, the control service layer 150 and the general OS 121 according to the first embodiment.

FIG. 3 is a block diagram showing the configuration of the VAS 140, and relationship among the VAS 140, each application, the control service layer 150 and the general OS 121.

The process of the VAS 140 includes a dispatcher 145, a control thread 144 and an application information obtaining thread 141, and a screen display thread 142 and an application check thread 143. The screen display thread 142 produces an operation screen on the operation panel. The application check thread 143 checks whether the application can be installed according to the obtained application information.

The dispatcher 145 monitors message receiving from the application 130 or from control services. The dispatcher 145 sends a process request to the control thread 144, the application information obtaining thread 141, the screen display thread 142 and the application check thread 143 according to the received message.

The control thread 144 requests the threads 141-143 to perform application information obtaining process, screen display process, and application check process. In the application check process, the VAS checks whether the application adversely affects the compound machine 100 if the application is launched. For example, the VAS 140 obtains application information of an application for which install is requested and obtains application information of applications that have already been installed. Then, the VAS can check resources or versions of the applications to check whether the application may adversely affect the compound machine. At that time, the screen display thread 142 displays application information of the application on the operation panel 105 by using application information stored in the application information file in the hard disk 200. Therefore, the user can grasp status of the application to be installed. Thus, even when an application is not determined to be installable, the user can understand the reason of the determination.

In addition, the control thread 143 controls install process and uninstall process, in which the install process is performed when the application is determined to be installable, and the uninstall process is performed when the application becomes unnecessary.

When the application information obtaining thread 141 receives a process request from the control thread 143, the application information obtaining thread 141 provisionally launches an application that is not installed so as to enable interprocess communication between the VAS and the application, and obtains application information from the application. As to an application that is installed, by launching the application, the application information can be obtained by interprocess communication. The obtained application information is stored in the hard disk 200 as the application information file 201. The application information is recorded as a record for each application.

The program of the VAS 140 can be provided as a part or a whole of SDK (Software Development Kit). The program is provided as an executable file or an installable file in an recording medium such as a CD-ROM or a FD. In addition, the program file of the VAS 140 can be provided via a network.

Figure 4:
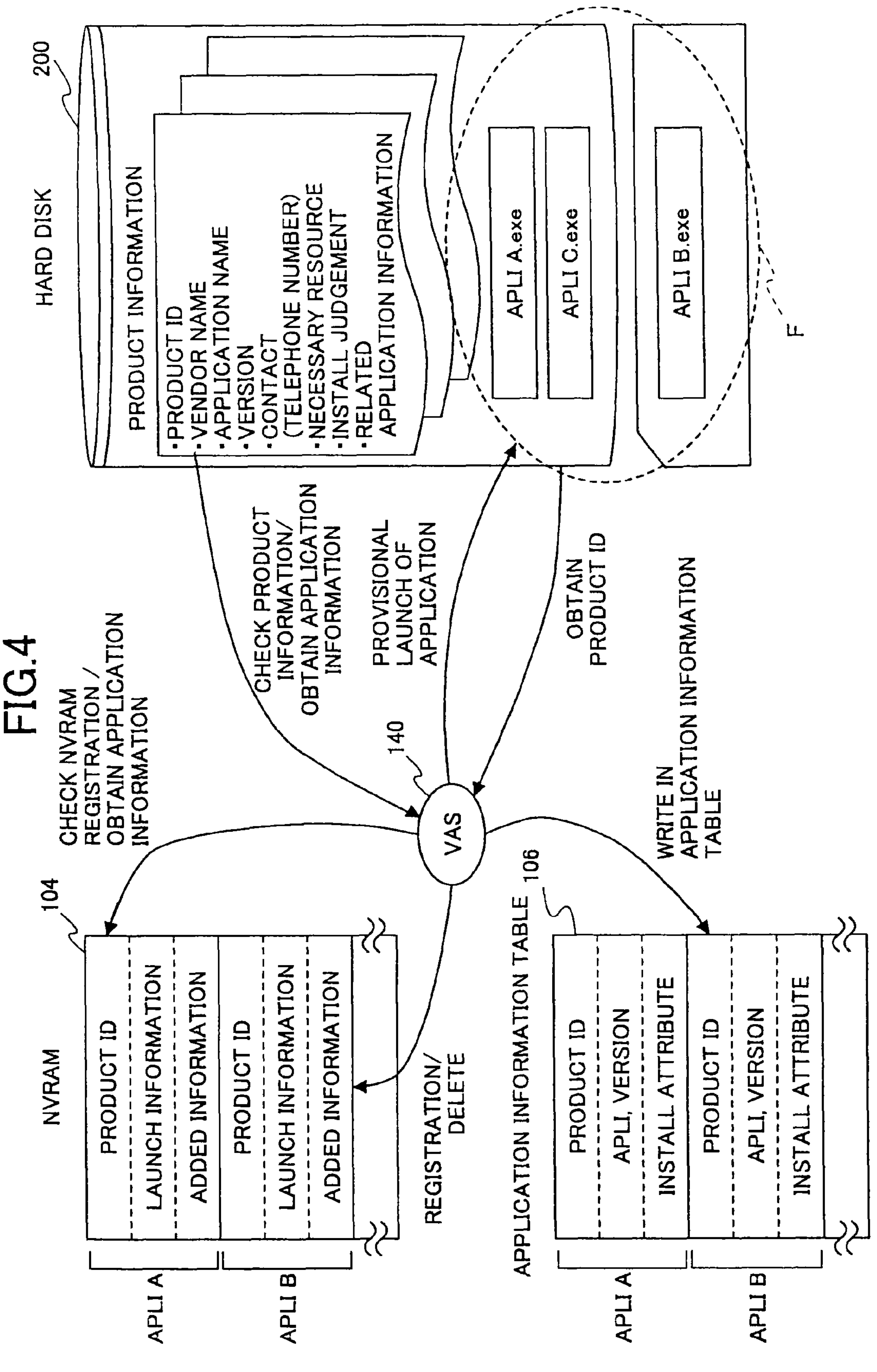
FIG. 4 shows relationship between the VAS 140, and the hard disk 200 that stores application information, the application information table 106, and the NVRAM 104.

FIG. 4 shows relationship between the VAS 140, and the hard disk 200 that stores application information, the application information table 106, and the NVRAM 104. As shown in FIG. 4, the product information stored in the hard disk 200 is managed for each application. By specifying a product ID, application information corresponding to the product ID can be specified. In addition, the hard disk 200 stores data of applications A and C that are copied in the compound machine 100. The application B is installed from an IC card. "F" that is indicated by dotted lines indicates an execution file group existing in a path.

NVRAM 104 is a non-volatile memory that keeps memory content even when the power is turned off. The NVRAM 104 stores the product ID, launch information, additional information for each application. When installing an application, information on the application is recorded in the NVRAM 104. In addition, the launch information indicates whether the corresponding application is to be launched when the power of the compound machine is turned on.

The application information table stores information on applications as table data. By specifying the product ID of the application A, the application name, the version and the install attribute can be obtained from the table, and the information can be displayed on the operation panel.

Figure 5:
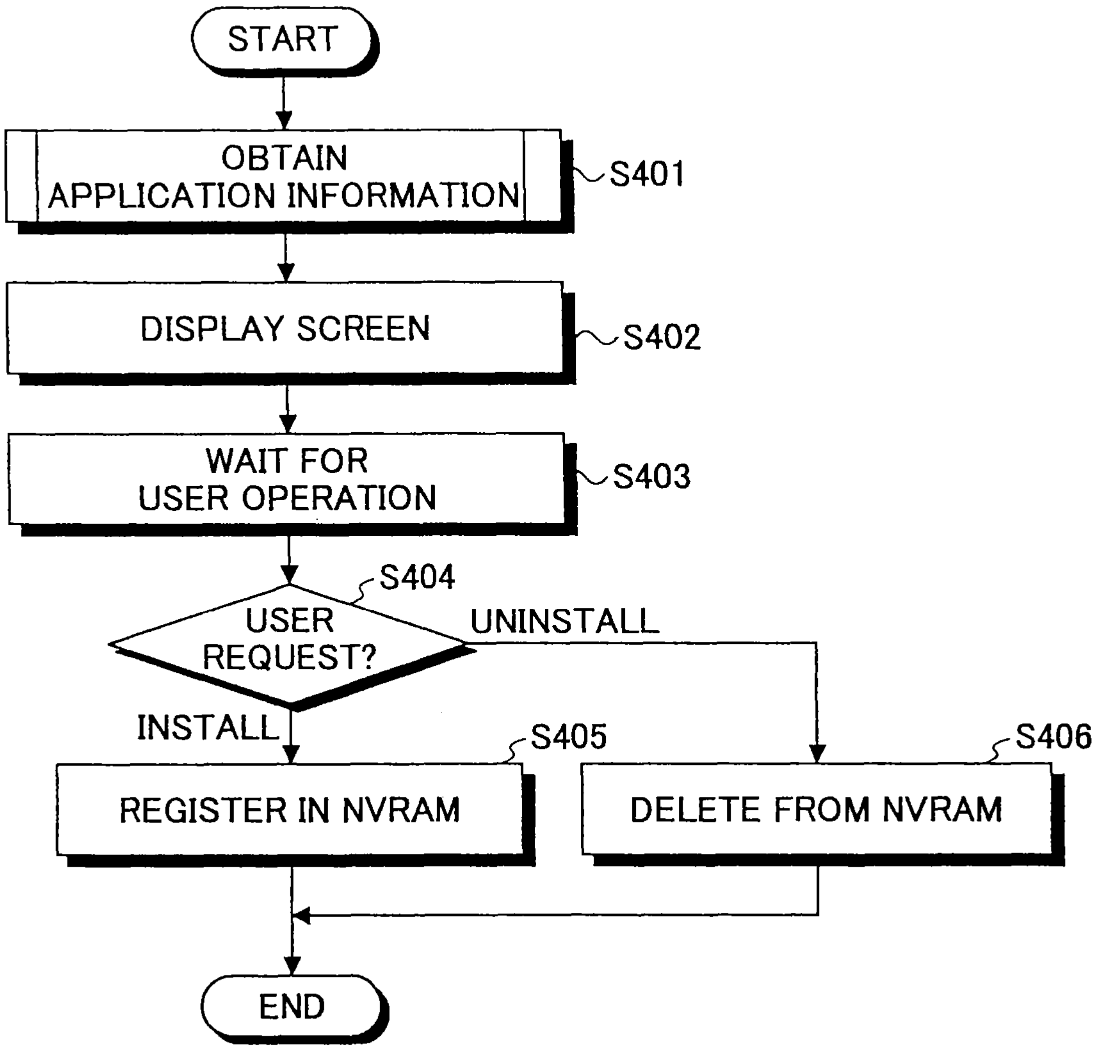
FIG. 5 shows a whole procedure for performing install process or uninstall process in the compound machine 100.
Figure 6:
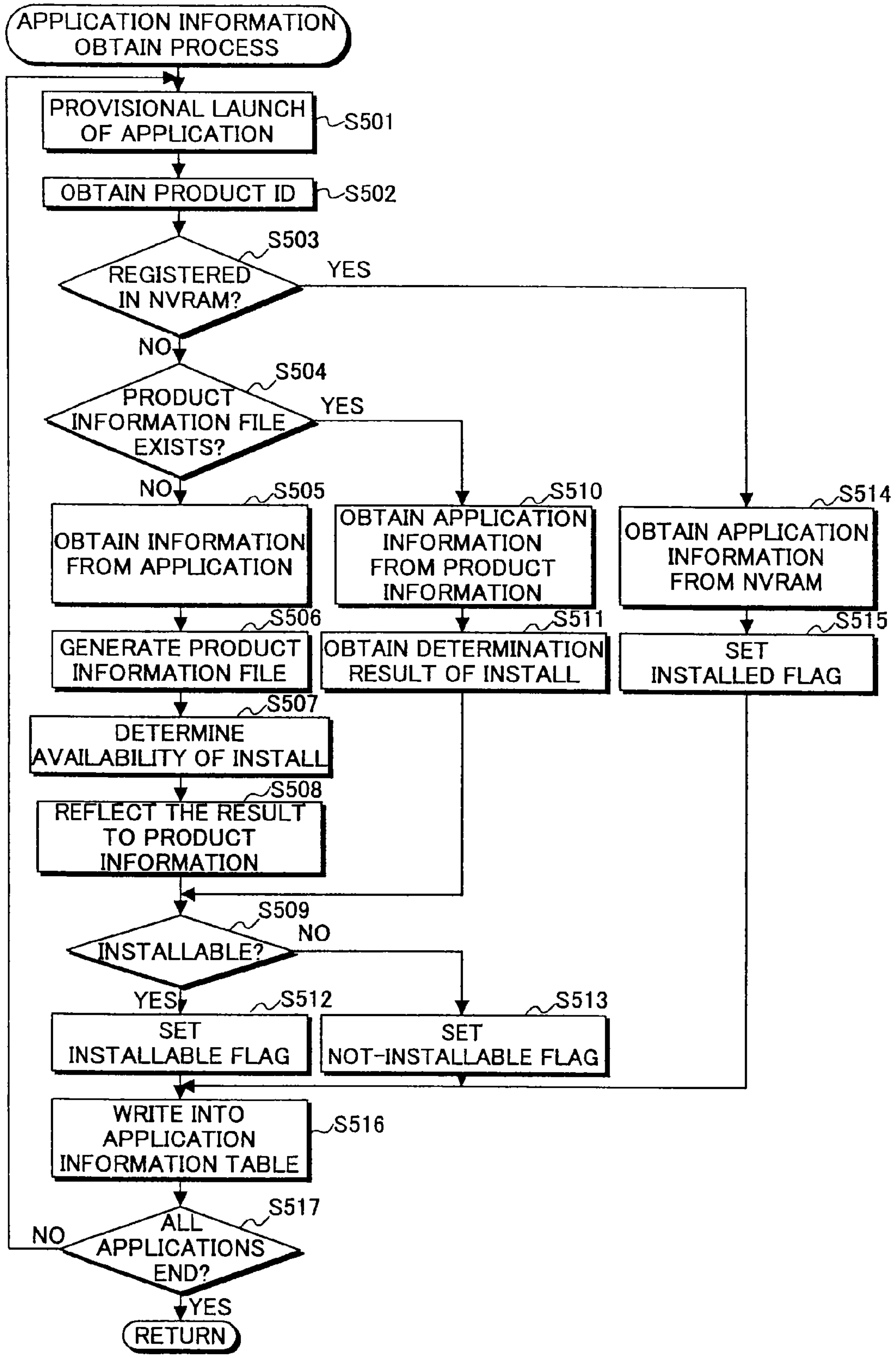
FIG. 6 is a flowchart showing a subroutine of application information obtaining process in step S401 in FIG. 5.

FIG. 5 shows a whole procedure for performing install process or uninstall process in the compound machine 100. FIG. 6 is a flowchart showing a subroutine of application information obtaining process in step S401 in FIG. 5.

In step S401 in FIG. 5, the dispatcher 145 requests the application information obtaining thread 141 to obtain application information of an application via the control thread 144. The application information obtaining thread 141 generates the application information file 201 by performing application information obtaining process shown in FIG. 6.

Then, the control thread 144 reads application information from the application information file 201, and produces an operation screen to display the operation screen on the operation panel in step S402. The display screen displays the application name, the version, resource information and the like for each application. In addition, the display screen shows whether the application can be installed or not. By displaying the screen, the user can understand status of applications, and the user can selects items in the screen to proceed install process.

After the user selects some items, the compound machine 100 waits for user input in step S403, and determines presence or absence of a user request in step S404. The user request is an install request of an application or uninstall request of an application. If install of an application is requested and the request is permitted, information is registered to the NVRAM 104 shown in FIG. 4 in step S405. If the request is for uninstalling the application, application information is deleted from the NVRAM 104 shown in FIG. 4 in step S406.

FIG. 6 is a flowchart showing the operation for obtaining the application information. Since the application information can not be obtained if the application is not launched, the VAS 140 provisionally launches the application in step S501. Then, the VAS 140 can obtain application information by requesting desired information from the application by using interprocess communication. According to the present embodiment, the VAS 140 obtains the product ID in step S502, and refers to the NVRAM 104, so that the VAS 140 can determine whether the application is already registered or not in step S503.

If the application is not registered in the NVRAM 104, the VAS 140 determines whether there is the product information file in step S504. If there is not the product information file, the VAS 140 obtains application information by using interprocess communication from the application in step S505. Then, the product information file is produced in step S506, and the VAS 140 determines whether the application can be installed or not in step S507. The VAS 140 reflects the determination result to the product information in step S508. For example, The determination is performed by comparing resource information, obtained from the application, to be used by the application with available resource information of the system of the compound machine.

In step S509, on the basis of the determination result, it is determined that the application can be installed or not. When there is the product information file in the step S504, the application information is obtained from the product information file in step S510. After information used for determining whether an application is installable is obtained in step S511, it is determined whether the application is installable in step S509.

If the application is installable in step S509, an installable flag is set in step S512, and the flag is written into the application information table in step S516. When the application is not installable, not-installable flag is set in step S513 and the flag is written into the application information table in step S516. If the product information is already registered in the NVRAM 104 in step S503, the application information is obtained from the NVRAM 104 in step S514, and installed flag is set in step S515 and the flag is written into the application information table in step S516.

If the above-mentioned process is not completed for every application, the step returns to the step S501, and the above-mentioned process is repeated.

According to the compound machine of this embodiment, since the application information is obtained for all applications, the status of applications can be grasped.

Next, the provisional launch of the application will be described. The provisional launch is different from normal launch of the application in which substantive resources of the compound machine is used (launch for causing functions intended by the application is called "normal launch"). In the provisional launch, the application does not obtain resources such as memory areas that are required when the application normally operates. In the provisional launch, the application only perform interprocess communication with the VAS 140, in which the application provides, to the VAS, information on the application. The process of the provisionally launched application ends when communication between the application and the VAS ends. In addition, the function of the provisional launch of the application is independent of normal functions of the application, and is common to applications for the compound machines of the present embodiment.

Therefore, for example, by providing a program template including the function of the provisional launch to a vendor, the vendor can easily develop an application applicable for the compound machine by using the program template. For including application information in the application, for example, the vendor makes an include file in which the application information is included, and includes the include file into the application when compiling the application program.

By providing the provisional launch function to the application, the application can provide application information to the VAS 140 without normal launch, so that the VAS 140 can check the application.

FIG. 7 shows an example of a program description (main function) of an application including the provisional launch function. This description can be provided as the program template. As shown in FIG. 7, whether the application is provisionally launched or normally launched is determined by an argument (−v). Accordingly, one of normal launch and provisional launch can be easily selected when the VAS 140 launches the application. That is, when provisional launch is selected by using argument (−v), the application is provisionally launched so that application information is notified. If provisional launch is not selected, the application is normally launched so that intrinsic operation of the application can be performed.

Figure 8:
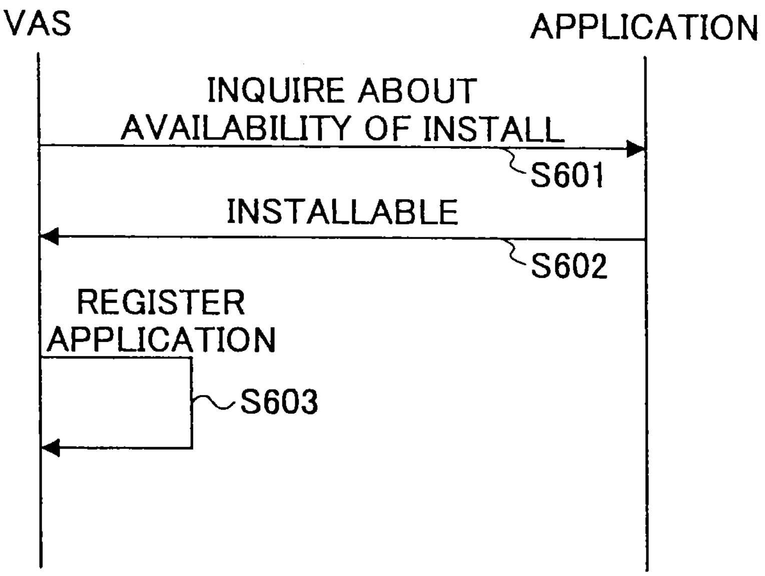
FIG. 8 shows a sequence between the VAS and the application.

The VAS 140 obtains information from the application and determines whether the application is installable in this embodiment. Instead of this procedure, a procedure shown in FIG. 8 can be adopted. In the procedure shown in FIG. 8, after the VAS 140 determines that the application is installable, the VAS 140 asks the application whether the application is actually installable in step S601. If the application notifies the VAS 140 that the application is installable in step S602, the VAS 140 performs the install process for the application in step S603.

Between the step S601 and the step S602, the application may obtain system information (resource data or configuration data) from the VAS 140, and the application may determines whether the application itself is installable according to the system information.

In this embodiment, the VAS 140 obtains the application information from the execution file of the application. Instead of this method, for example, the VAS 140 also can obtain the application information from a file that includes the application information. By storing the file in a server, the VAS 140 can obtain the application information via a network.

In addition, displaying the screen on the operation panel and checking applications can be respectively performed by a program other than the VAS 140.

(Second Embodiment)

In this embodiment, examples of screens displayed by the screen display thread 142 can be described in more detail.

Figure 9:
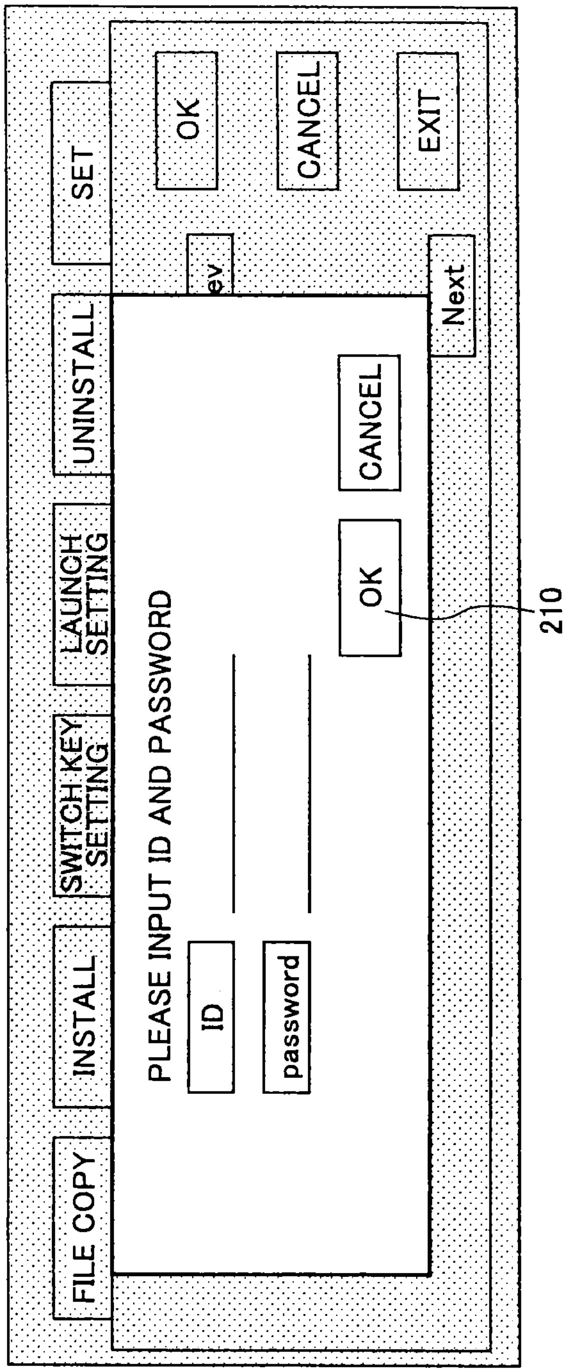
FIG. 9 shows an authentication screen of an initial setting screen according to the second embodiment.

FIGS. 9-36 show state transition of operation screens displayed on the operation panel 105. FIG. 9 shows an authentication screen of an initial setting screen. FIGS. 10-16 show screens for file copy operations. FIGS. 17-28 show screens for install operations. FIGS. 29-36 shows screens for uninstall operations.

Figure 10A:
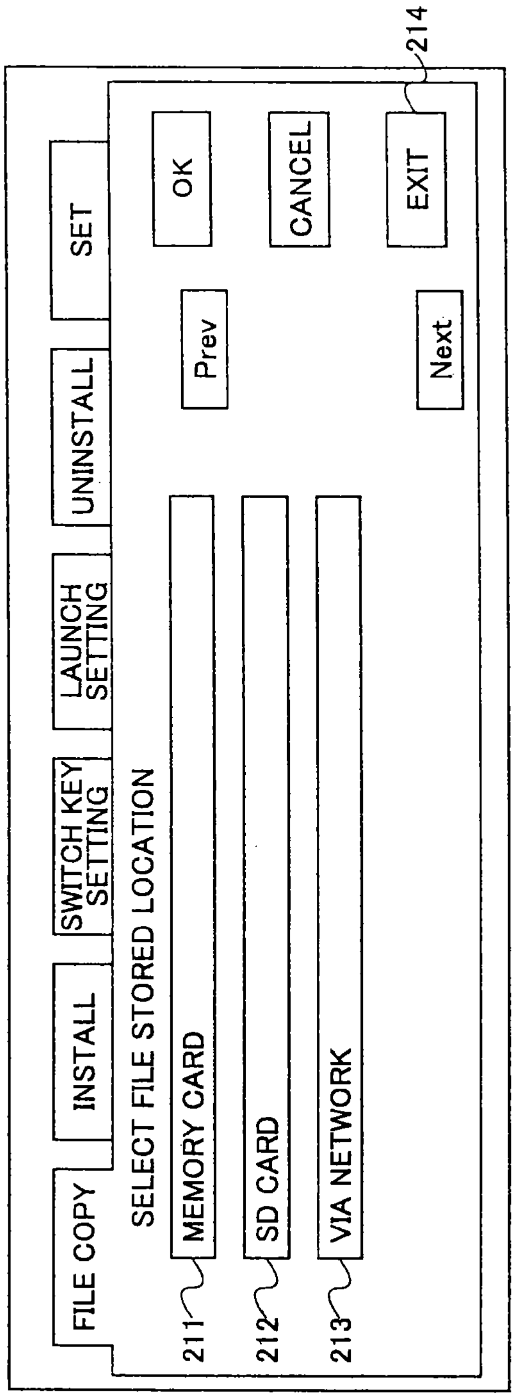
FIGS. 10-16 show screens for file copy operations according to the second embodiment.
Figure 10B:
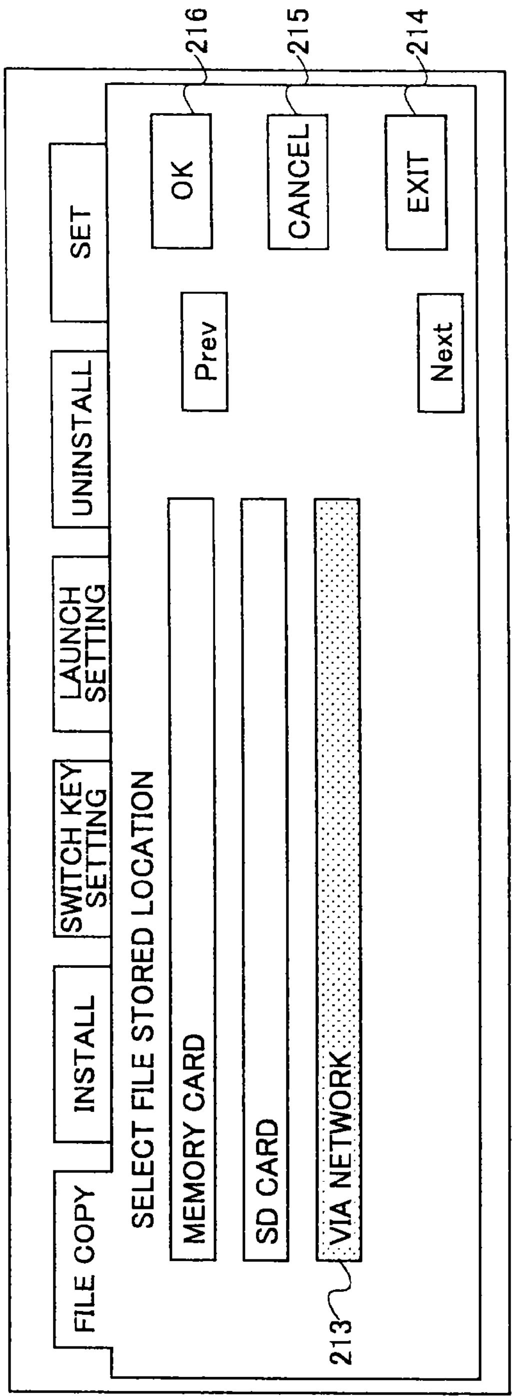
Figure 11A:
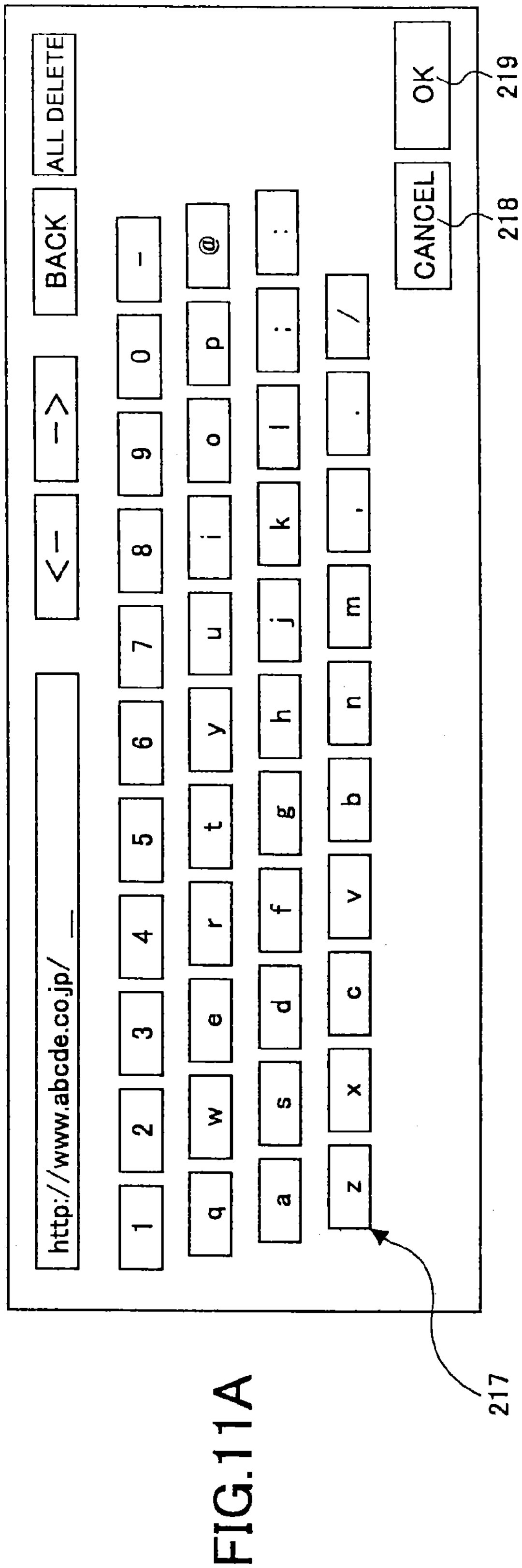
Figure 11B:
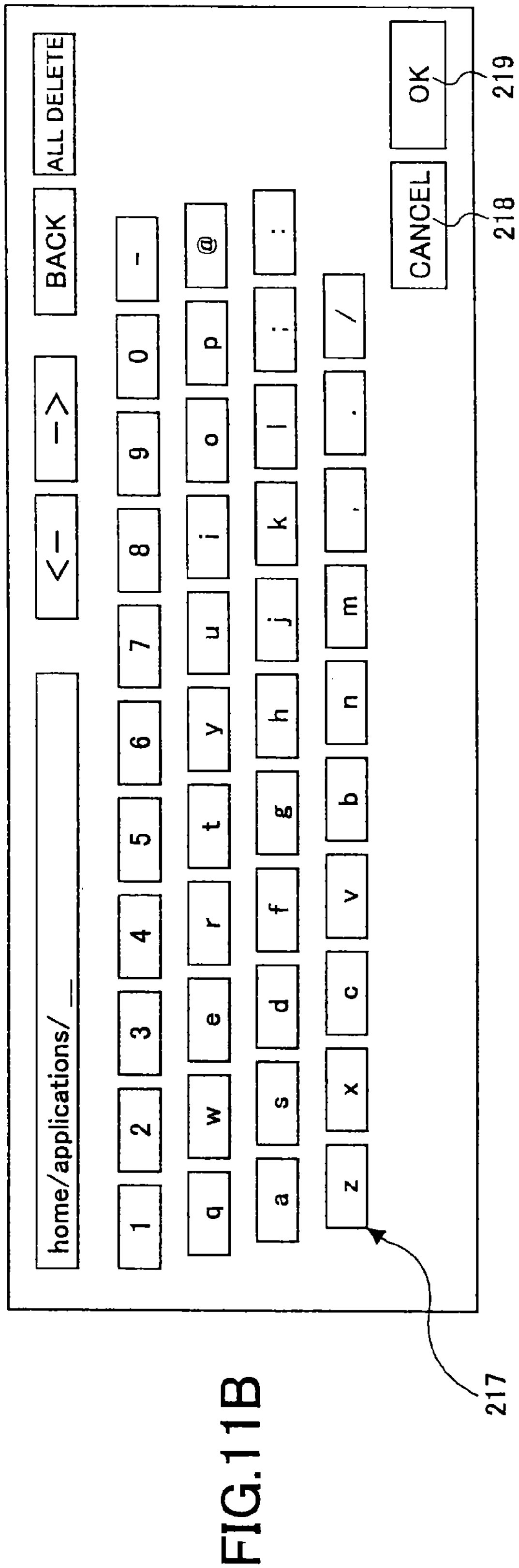

In the authentication screen shown in FIG. 9, a user ID and a password are input. After the input and the OK button 210 is pushed, a desired mode can be selected. In this embodiment, an application is copied in the compound machine 100 before installing the application. As shown in FIG. 10A, a file copy screen is displayed, and a storing destination of a file to be copied is selected. In this embodiment, a destination can be selected among from memory card 211, SD card 212 and via-network 213. As sown in FIG. 10B, when via-network 213 is selected and the OK button 216 is pushed, a download screen shown in FIG. 11A or a copy screen shown in FIG. 11B is displayed. The download screen is for downloading an application by using the Web. The copy screen is for copying an application by using a LAN network. When the cancel button 215 is pushed in FIG. 10B, the screen is returned to FIG. 10A. When the EXIT button 214 is pushed, the screen is returned to FIG. 9 in which the authentication screen is not shown.

Figure 12A:
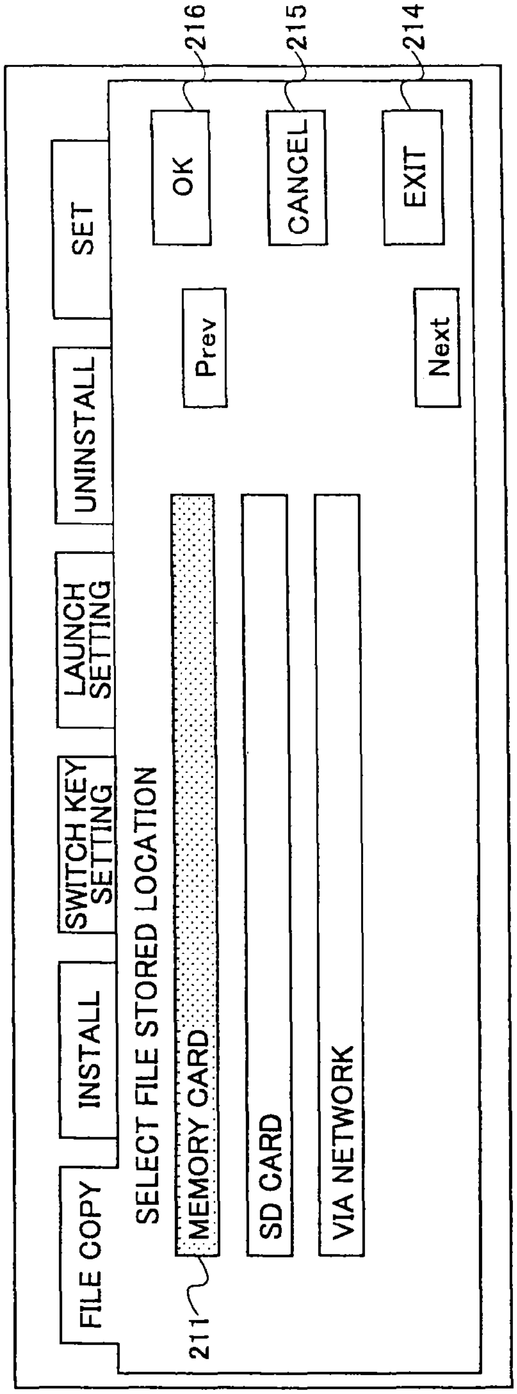
Figure 12B:
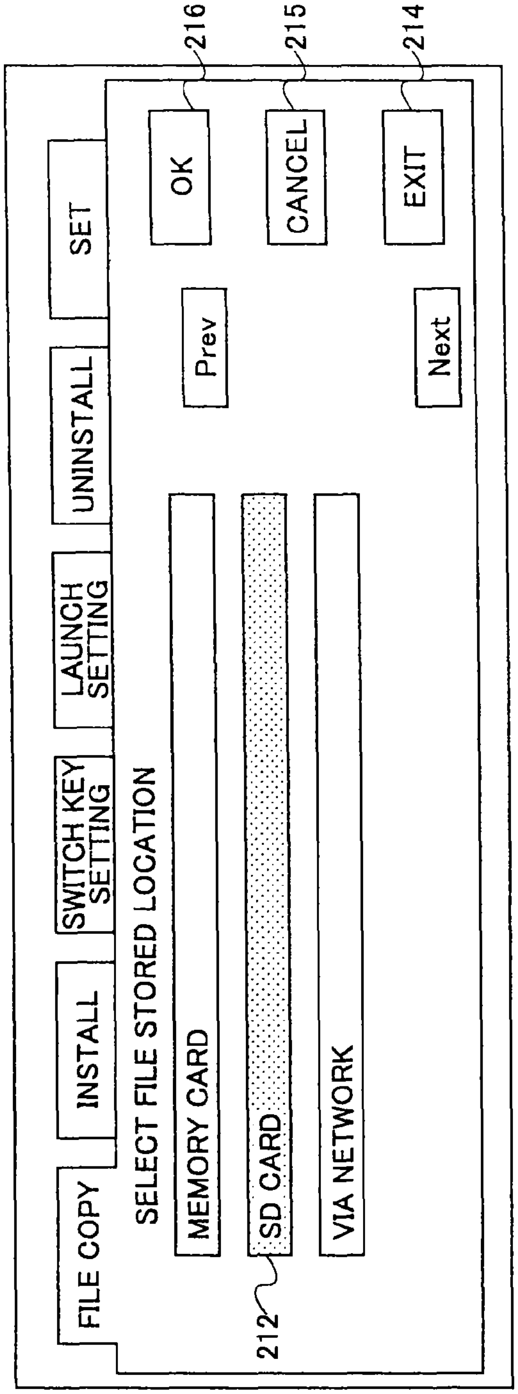
Figure 13A:
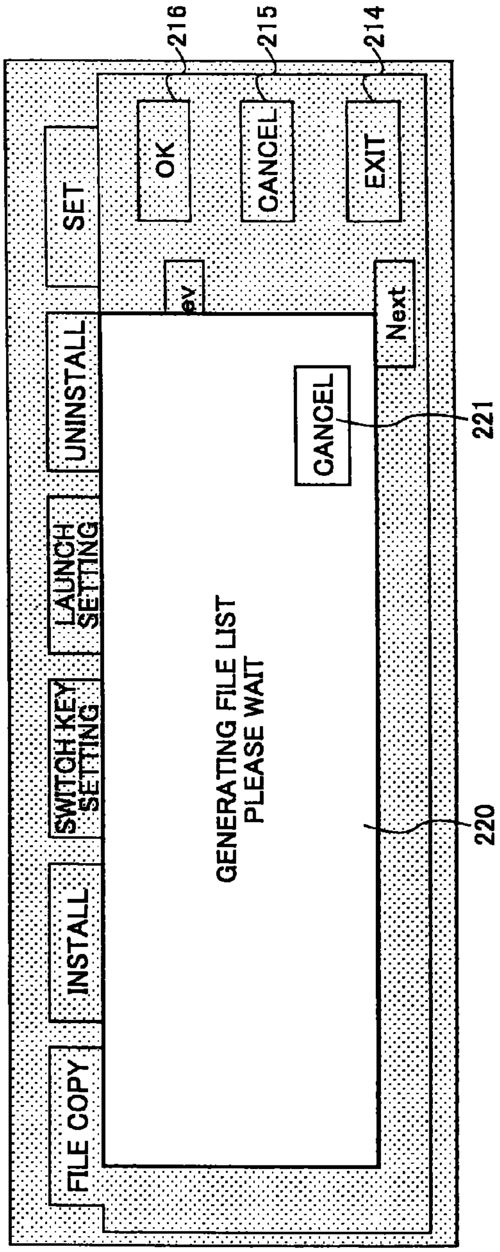
Figure 13B:
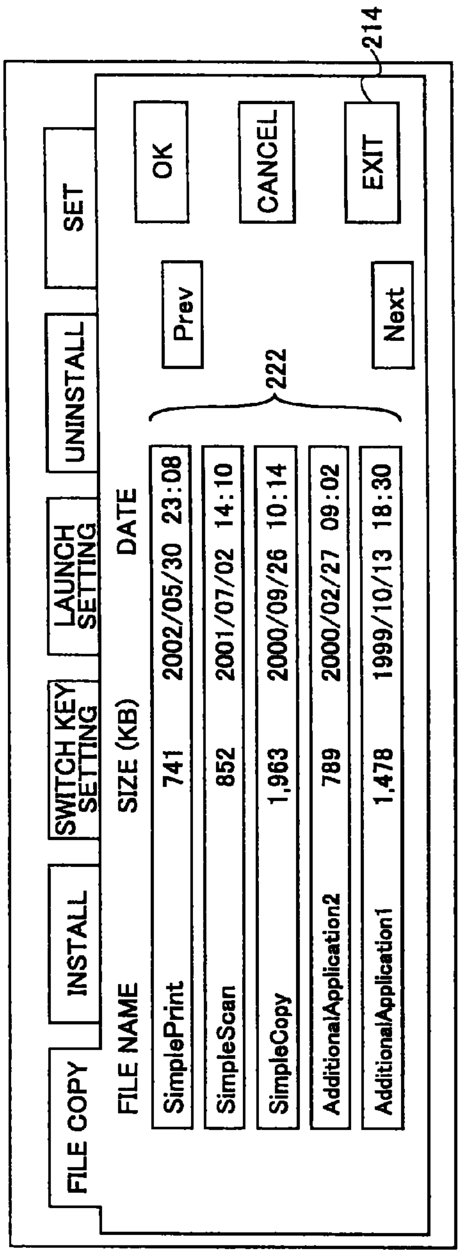

FIG. 12A shows a case in which the memory card 211 is selected. FIG. 12B shows a case in which the SD card 212 is selected. When the OK button is pushed, the screen is changed to FIG. 13A in which a file list produce waiting screen is displayed. When the CANCEL button 221 is pushed, the screen is returned to FIG. 10A. FIG. 13B shows the file list 222.

Figure 14A:
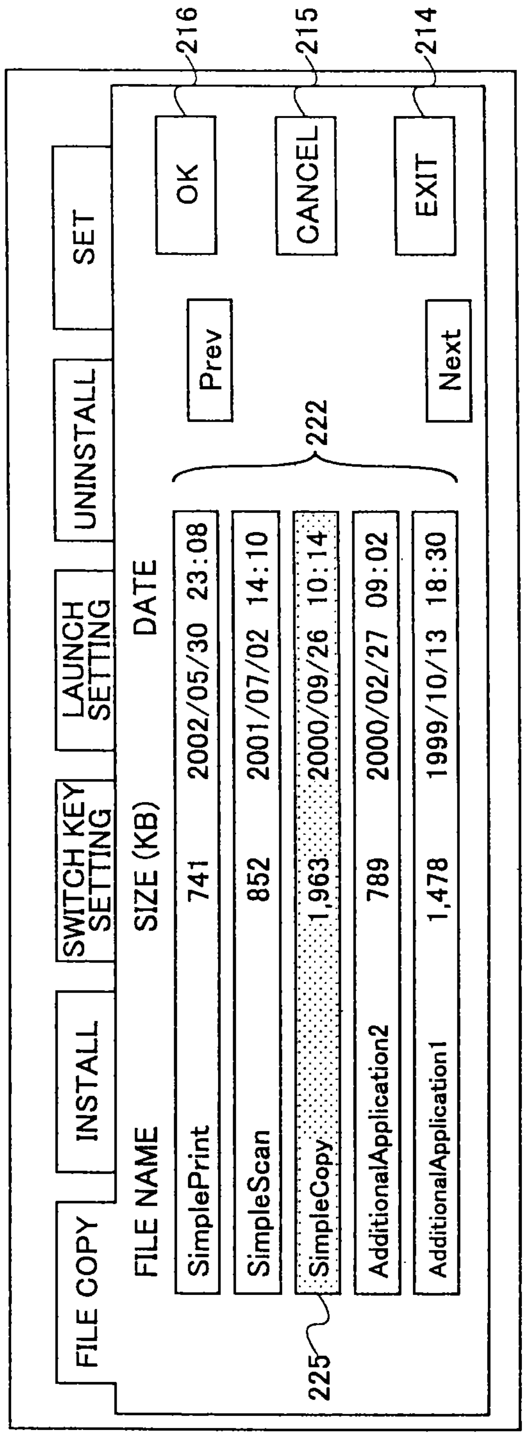
Figure 14B:
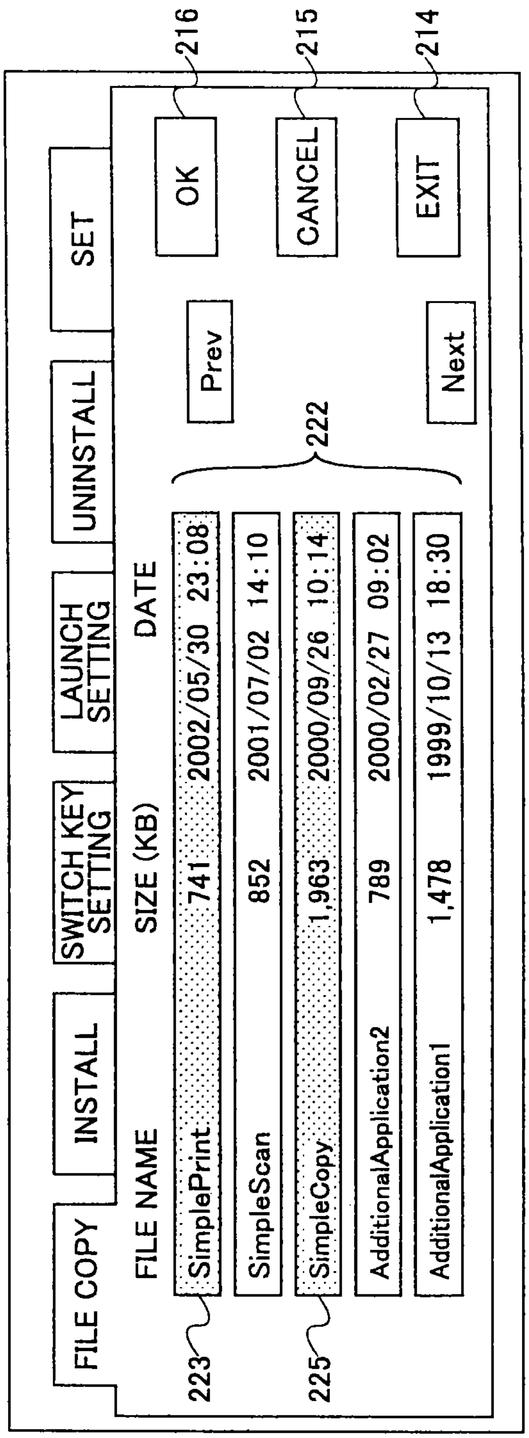
Figure 15A:
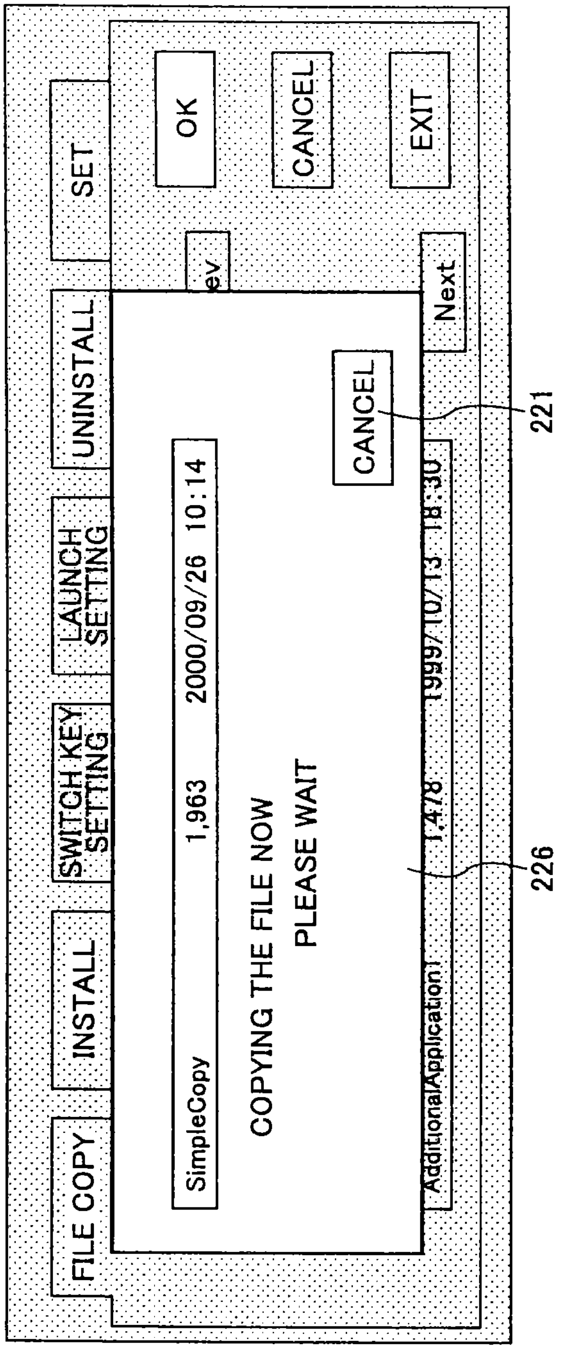
Figure 15B:
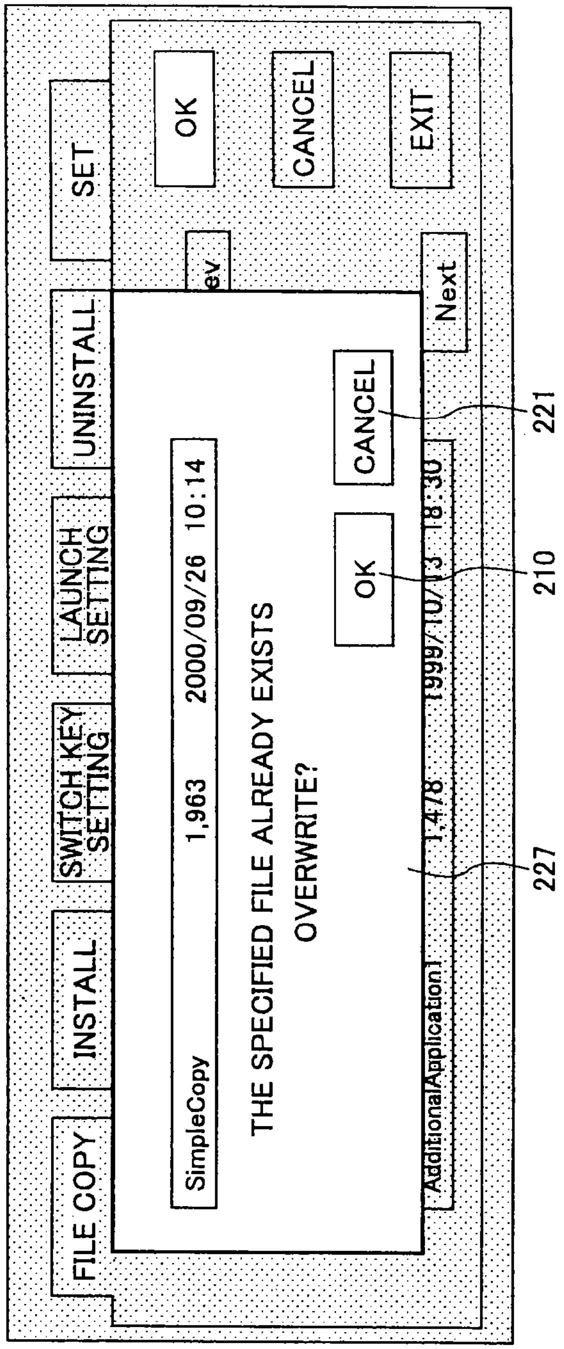
Figure 16:
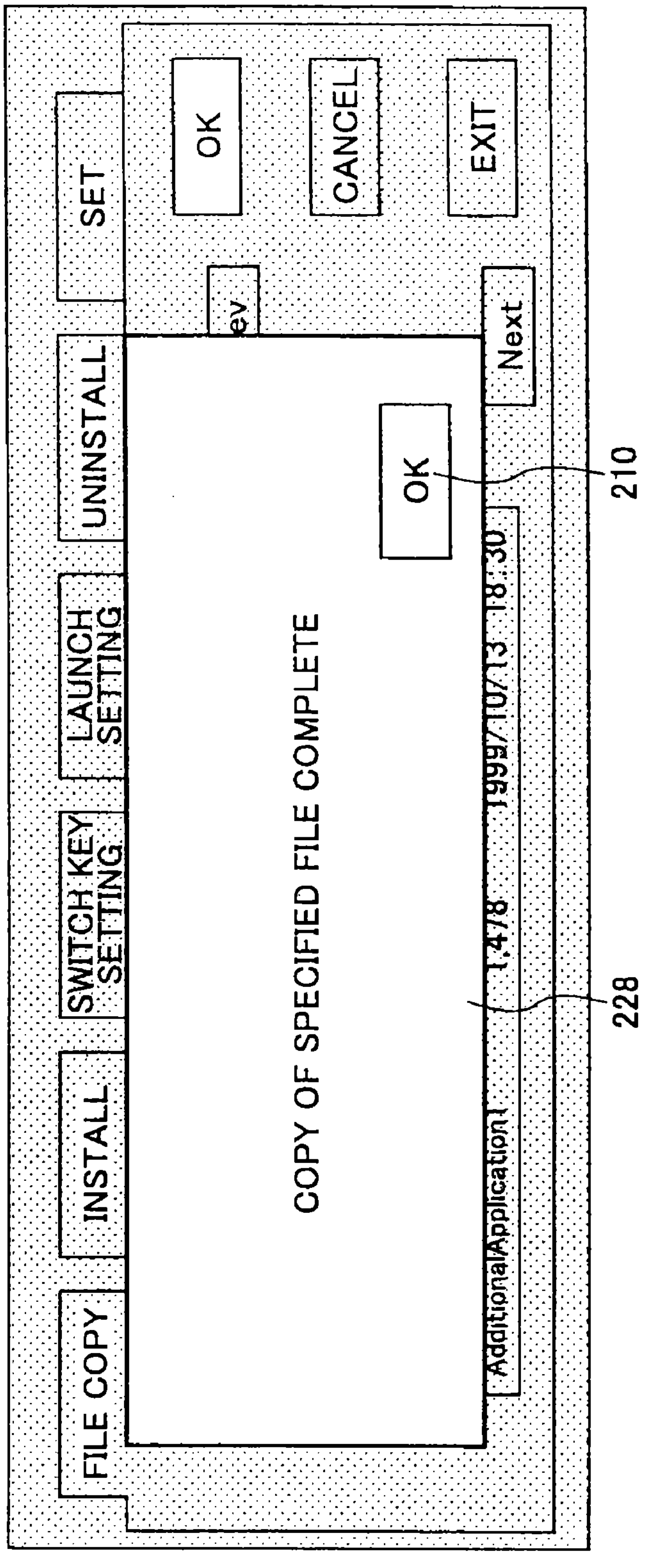

FIG. 14A shows a screen in which SimpleCopy 225 is selected from the file list. FIG. 14B shows a screen in which SimplePrint 223 is selected additionally. When the OK button 216 is pushed in FIG. 14A, the screen is changed to a waiting screen shown in FIG. 15A. If there is the same file, a warning screen shown in FIG. 15B is displayed in which confirmation for overwriting is displayed. When copying of the file ends, a screen shown in FIG. 16 is displayed. At this time, copying of the application into the compound machine is completed.

FIG. 17 shows an example of an install operation screen. When an install tag is selected, the before-mentioned application information is obtained.

Figure 17A:
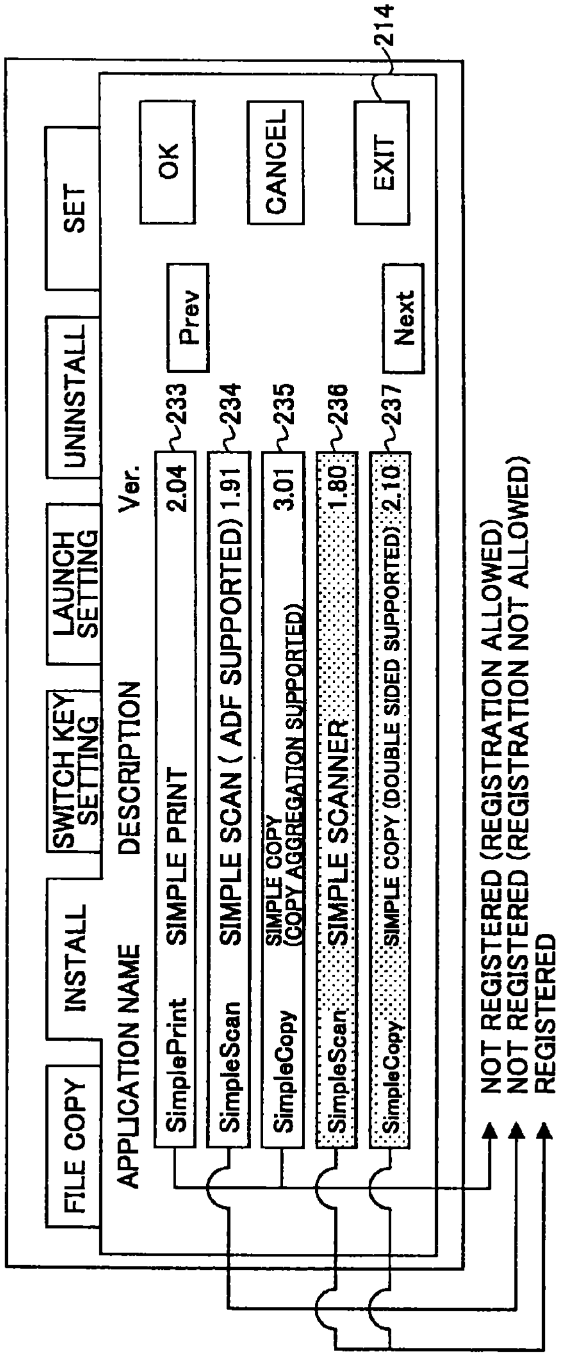
FIGS. 17-28 show screens for install operations according to the second embodiment.

FIG. 17A shows information such as "registration allowed", "registration not allowed", and "registered". The "registered" means that the application information is recorded in the NVRAM by performing install process. When the VAS 140 refers to the NVRAM, the VAS 140 can determine whether the application is already registered or not.

The "registration not allowed" is shown when the VAS 140 determines that the application can not be installed in the compound machine 100 for some reason. For example, when a resource to be used by the application is not provided on the compound machine 100, the application is determined to be not-installable.

The "not registered (registration allowed)" means that the install process is not yet performed although the application is installable.

Figure 17B:
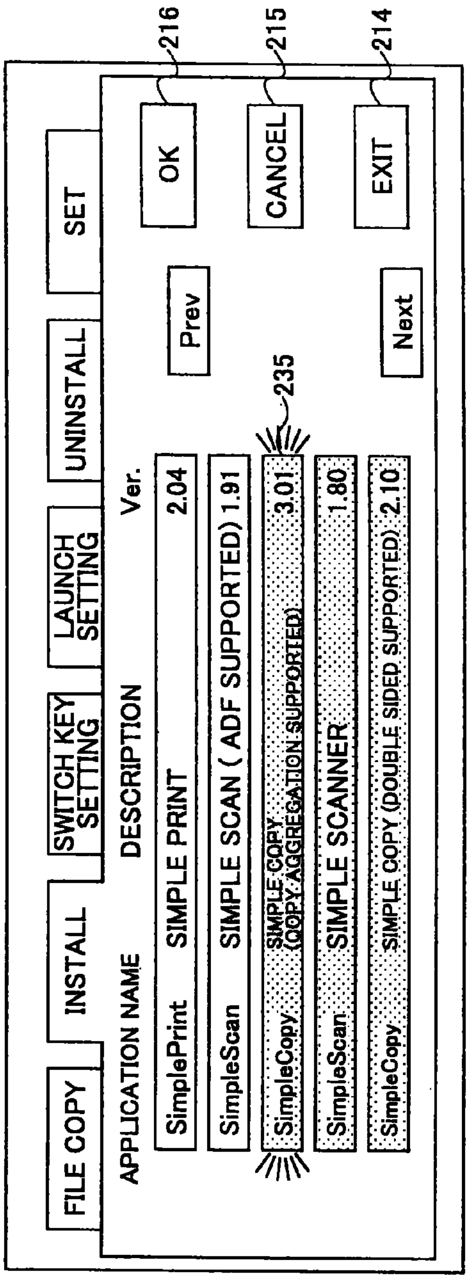
Figure 19A:
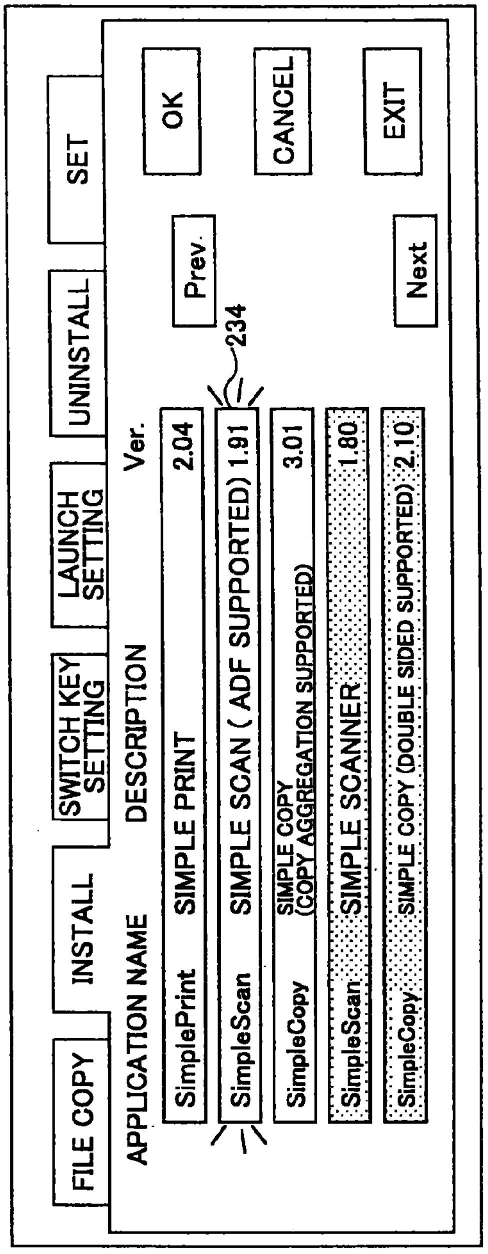
Figure 19B:
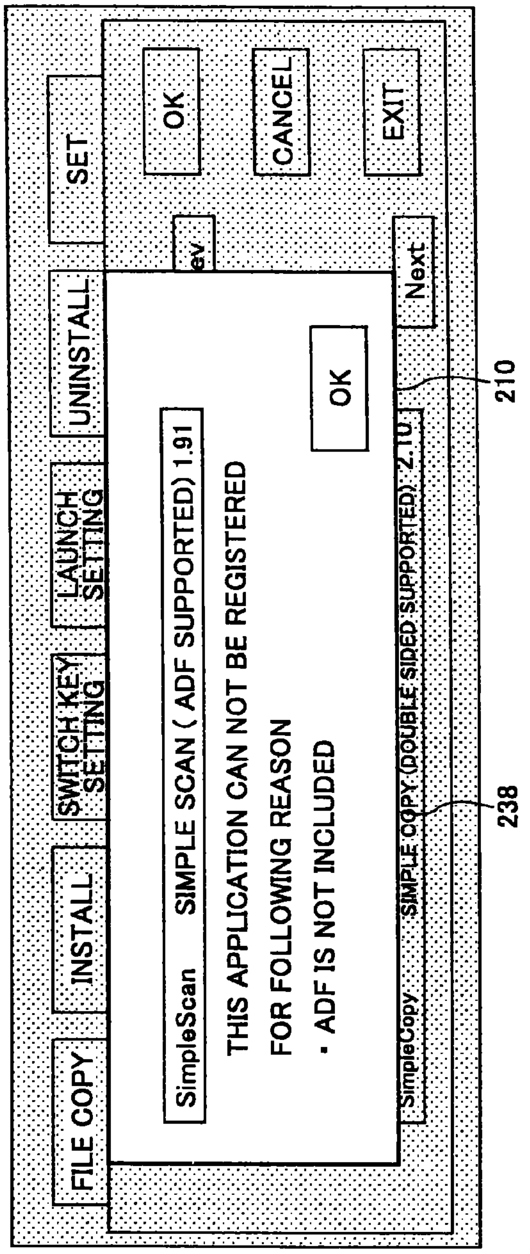

As shown in FIG. 17B, when SimpleCopy 235 that is an installable application is specified, the field of the application blinks. On the other hand, as shown in FIG. 19A, when a registration-not-allowed application 234 is specified, the screen is changed to FIG. 19B, and information indicating the application cannot be installed and the reason are displayed. Information used for displaying this message was stored in the compound machine when the VAS 140 obtained application information.

Figure 18:
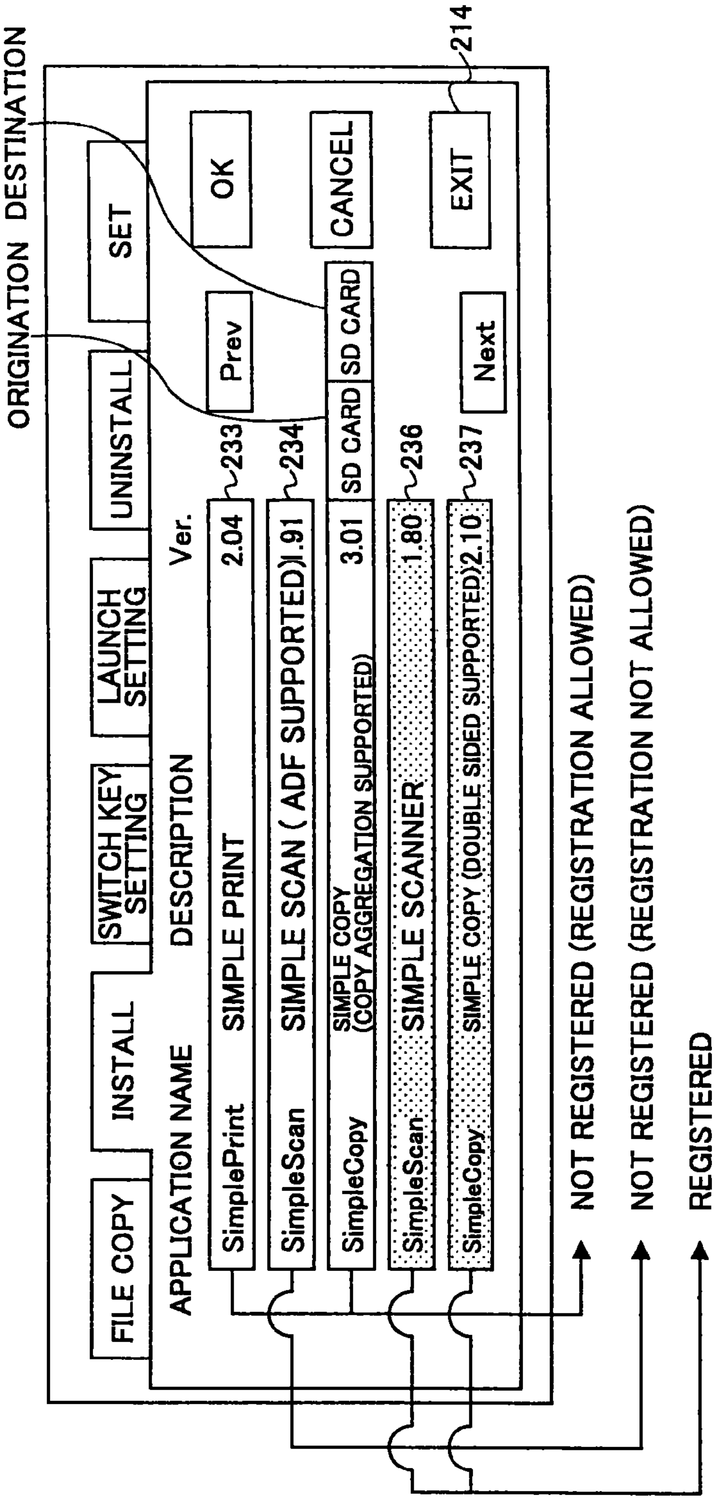

In the screen shown in FIG. 17A, when an application is selected for install, a medium that is an origination (a medium in which the application is copied) and a medium that is a destination in which the application exists after it is installed may be displayed as shown in FIG. 18. In this case, the destination can be selected. For example, as shown in FIG. 18, an application copied in the SD card can be installed in the SD card.

Figure 20A:
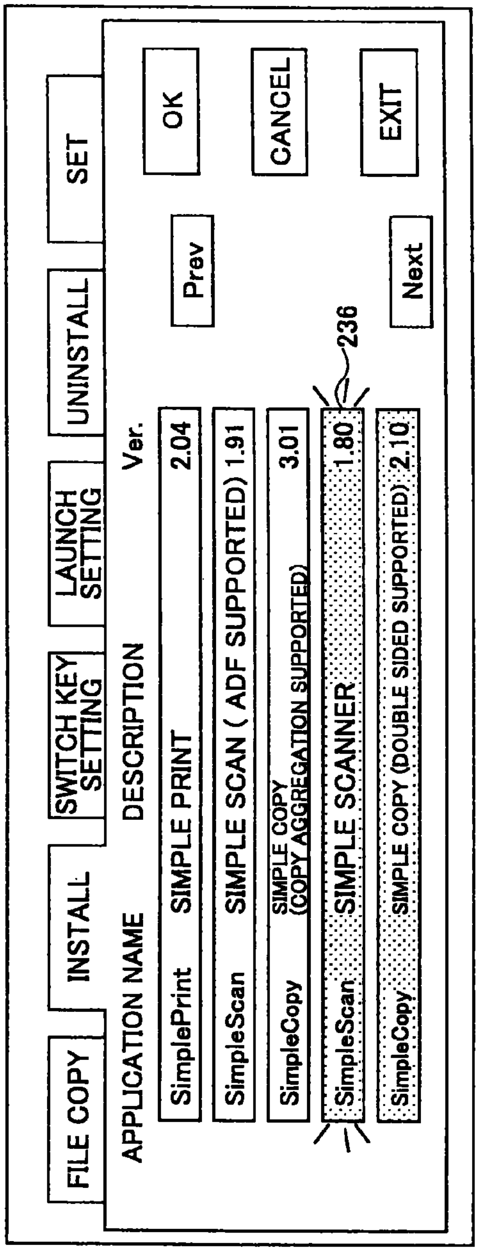
Figure 20B:
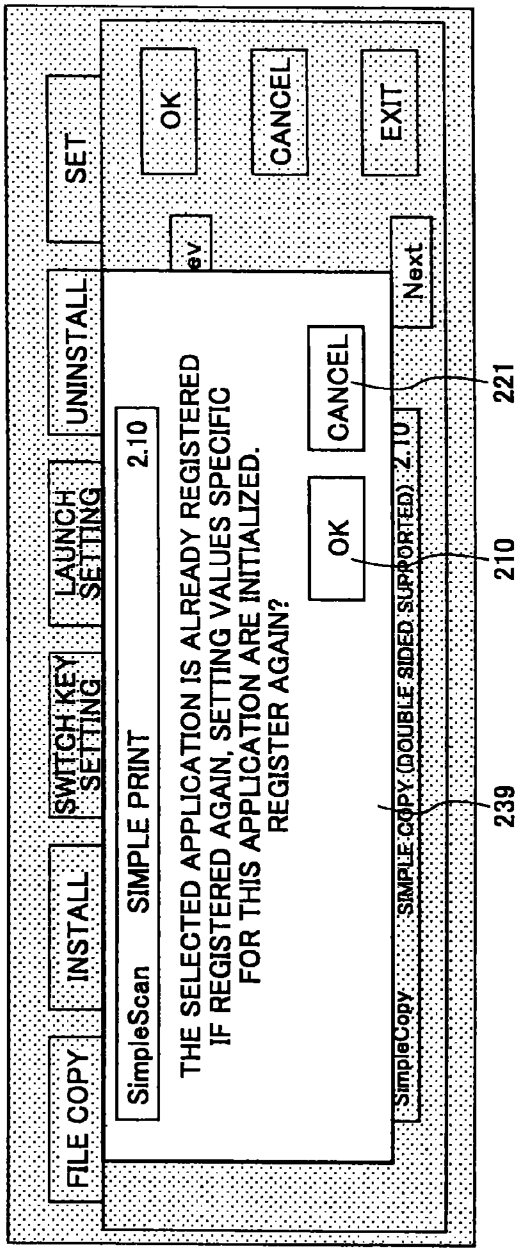
Figure 21A:
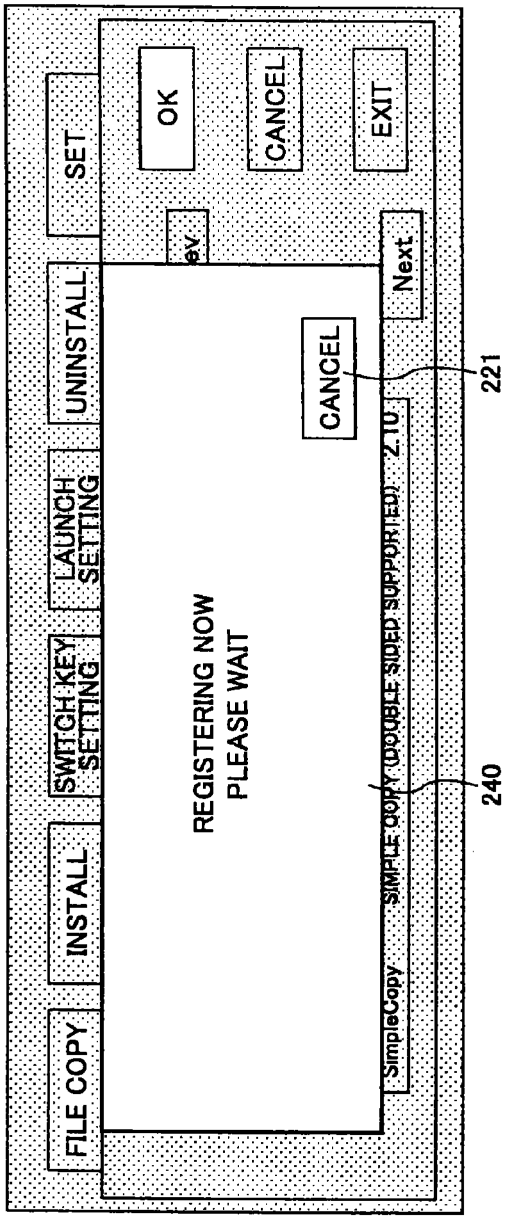
Figure 21B:
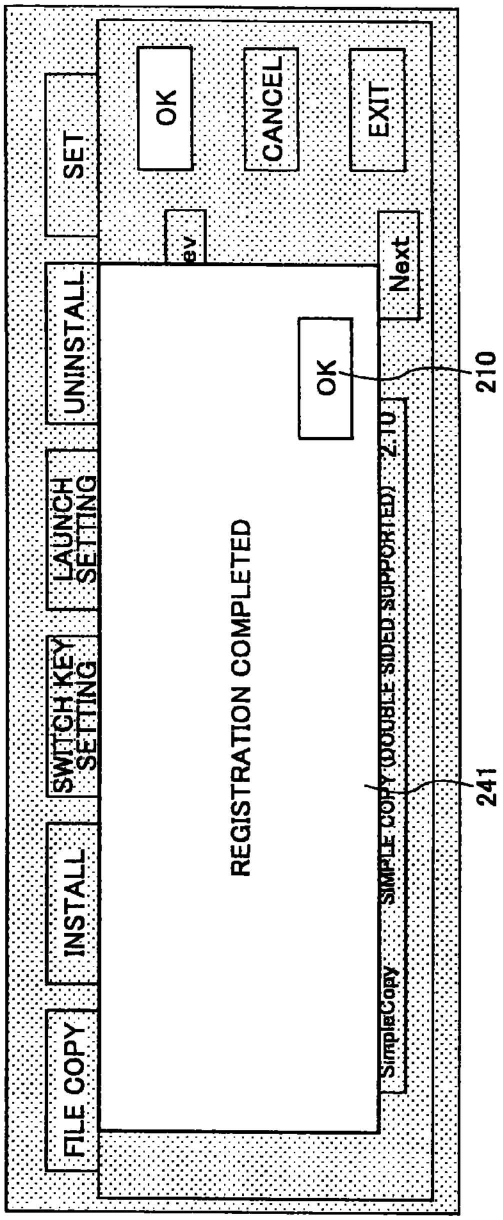
Figure 22:
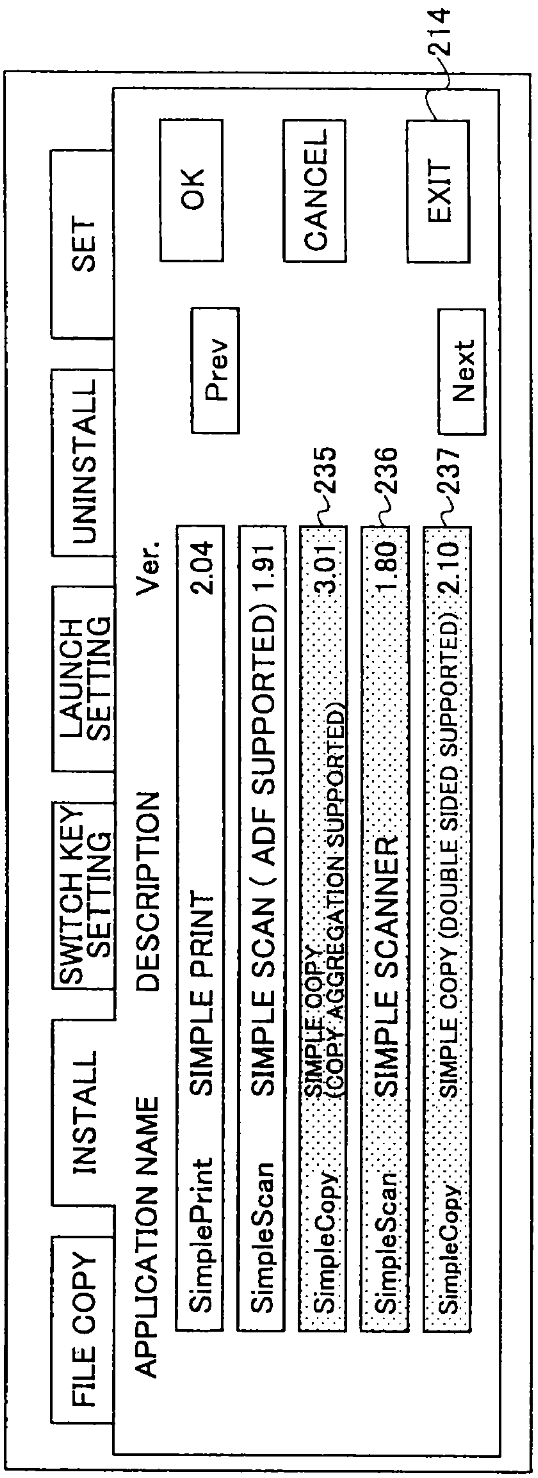

When an installed application is selected, the screen changes from FIG. 20A to FIG. 20B, and a warning screen is displayed. When an installable application is selected, after a registration waiting screen 240 shown in FIG. 21A is displayed, a registration end screen shown in FIG. 21B is displayed. Then, application registration (application install) ends. As a result, as shown in FIG. 22, the number of installed applications increases.

Figure 23A:
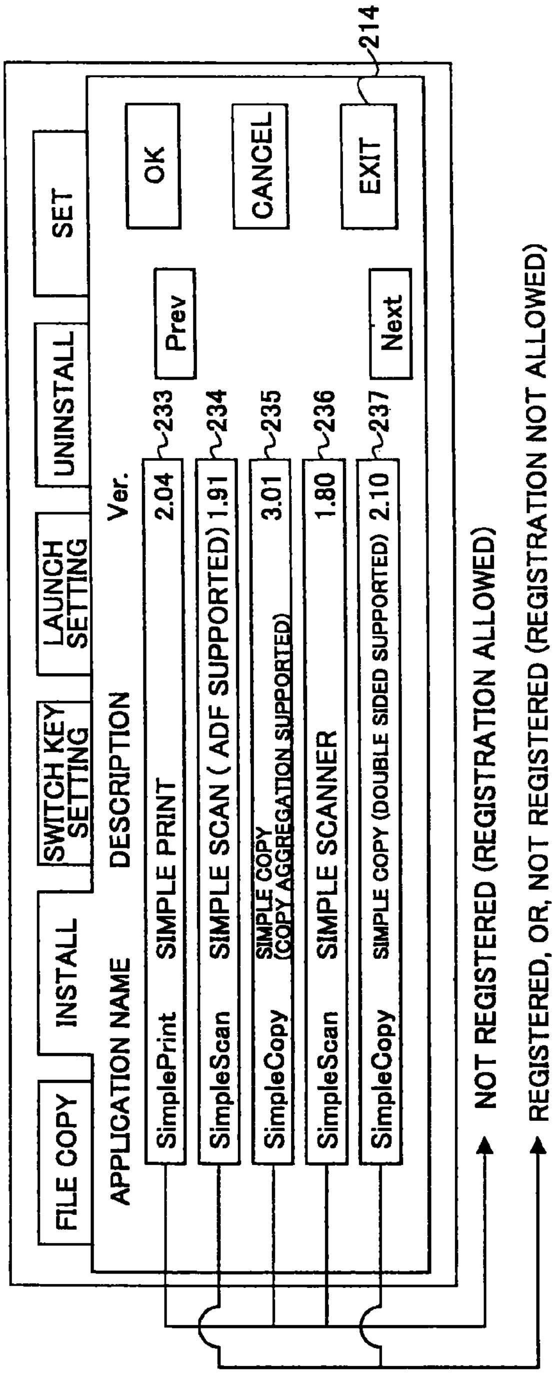
Figure 23B:
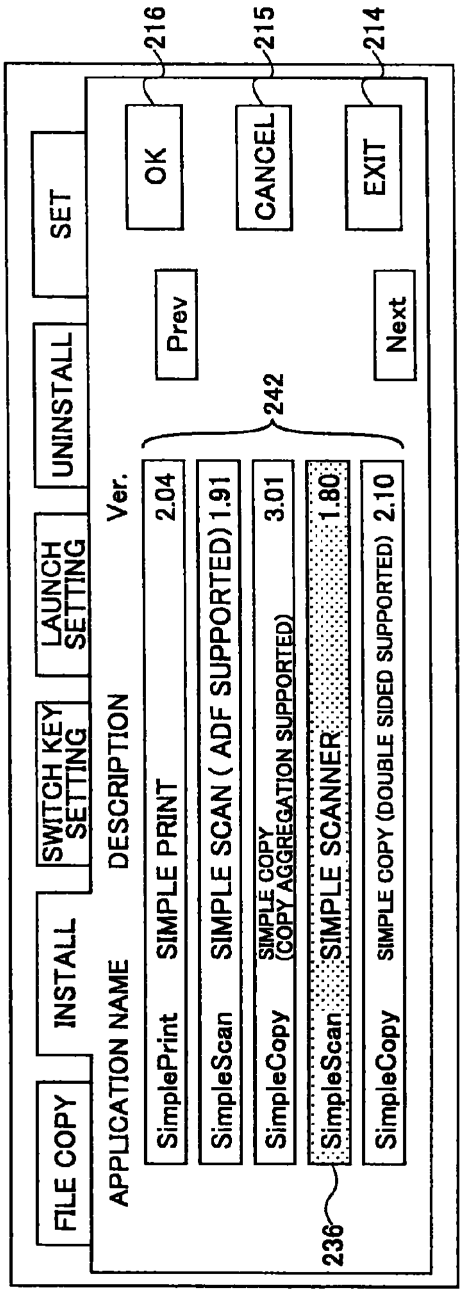
Figure 24A:
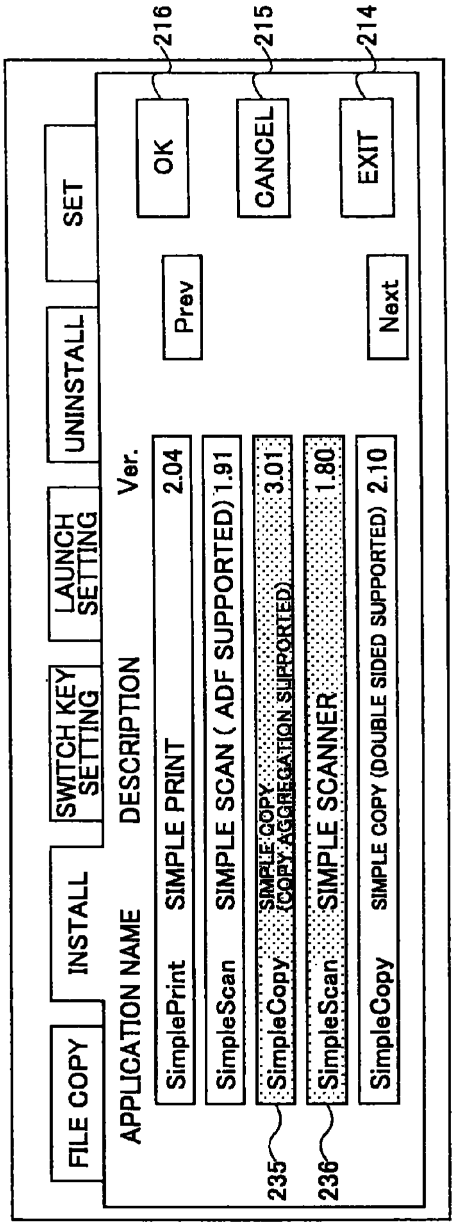
Figure 24B:
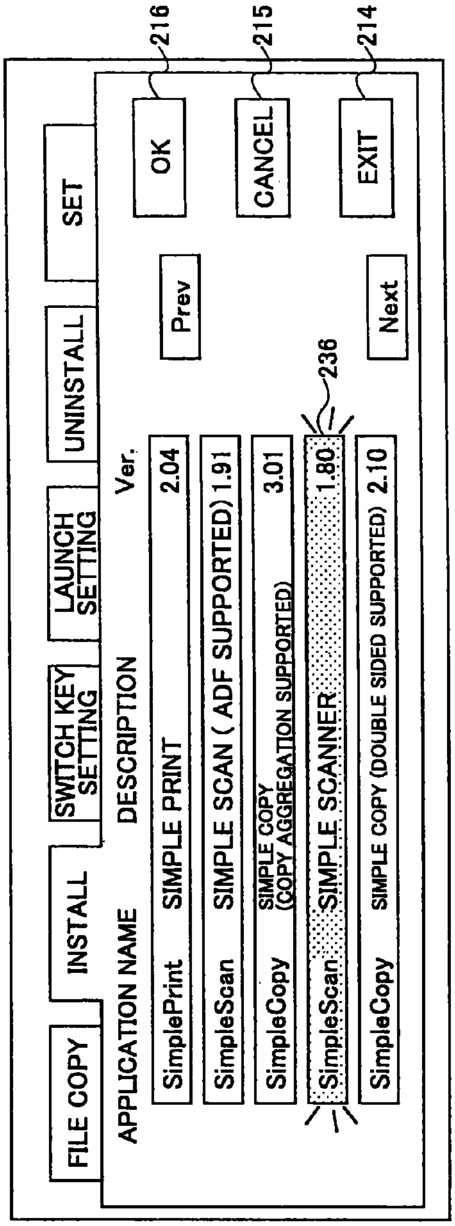

FIG. 23A shows another example in which installed applications and not-installable applications are shown. From the state of FIG. 23B, when nothing is selected, the screen is returned to FIG. 23A. As shown in FIG. 24A, a plurality of applications can be selected as applications to be installed. As shown in FIG. 24B, even if an application is selected, the selection can be canceled.

Figure 25A:
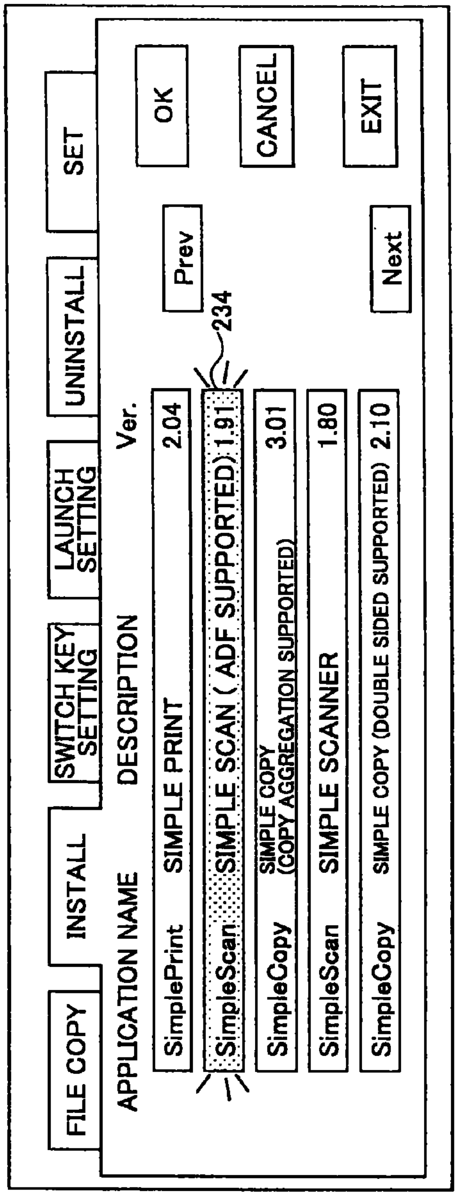
Figure 25B:
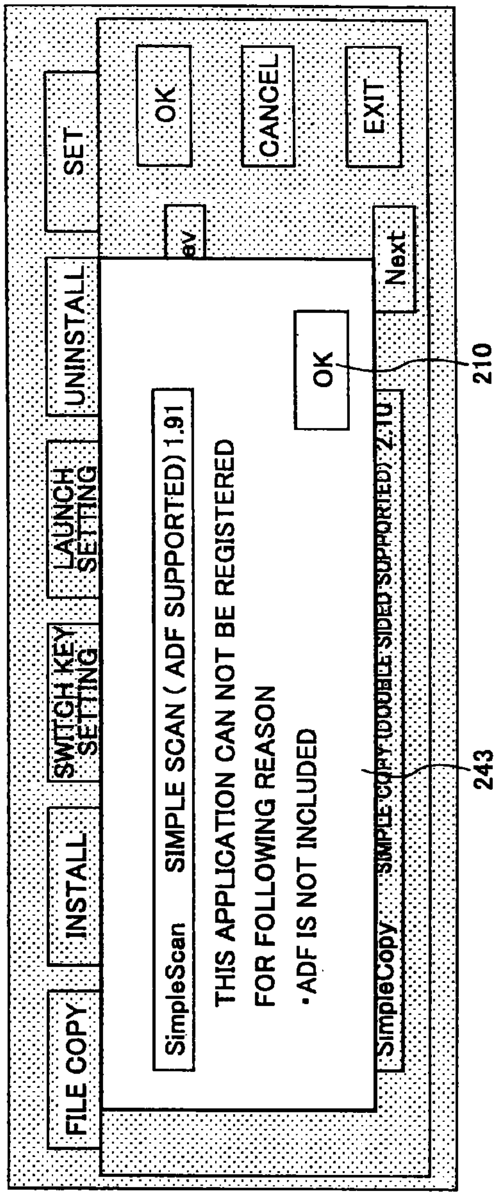
Figure 26A:
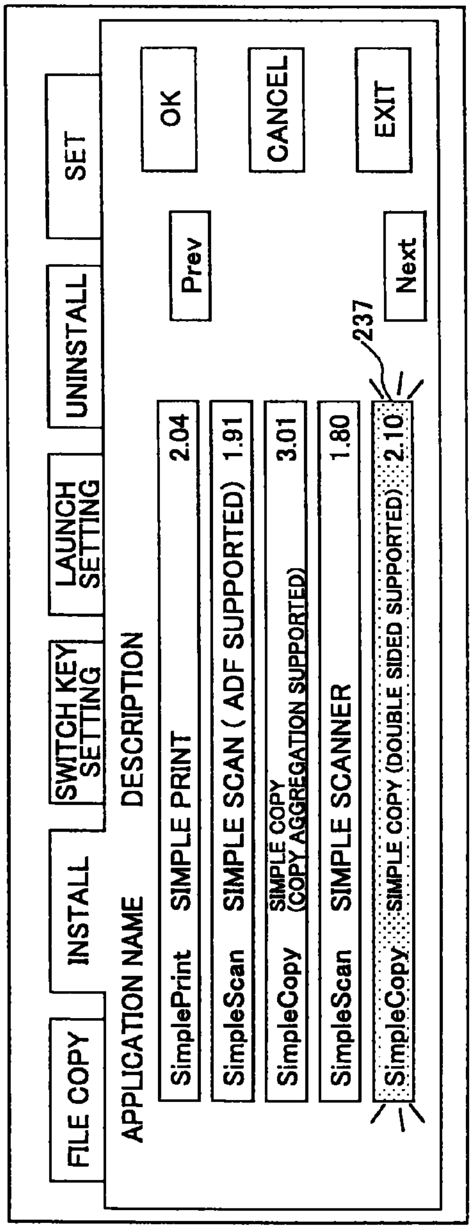
Figure 26B:
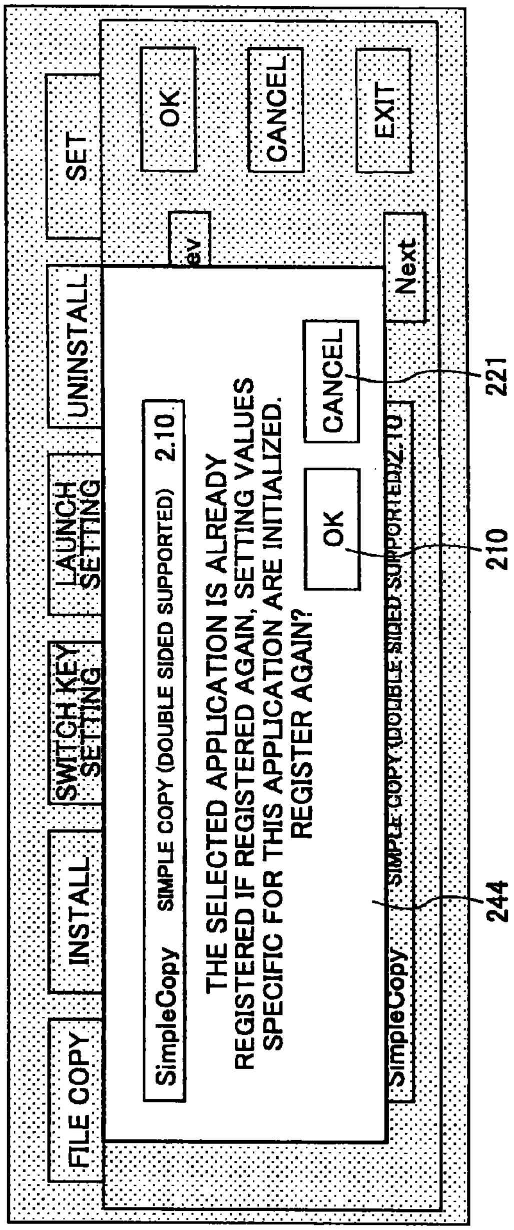
Figure 27A:
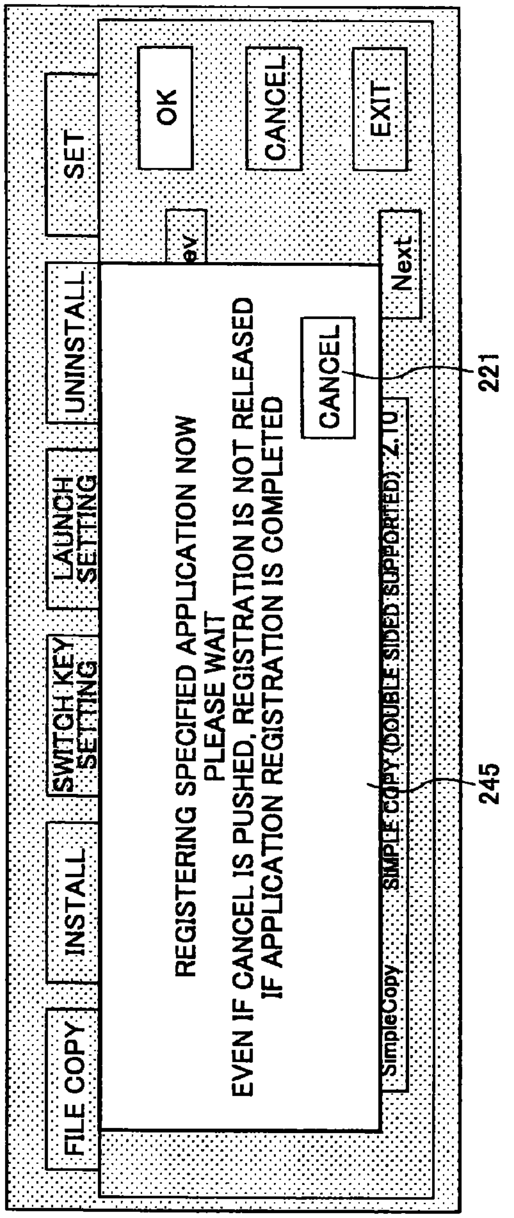
Figure 27B:
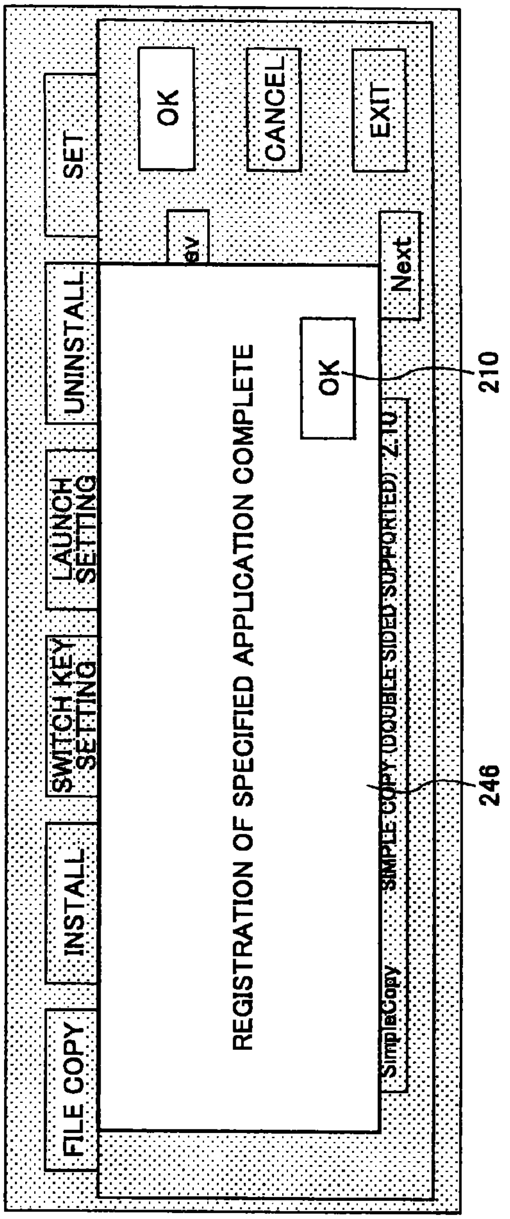
Figure 28:
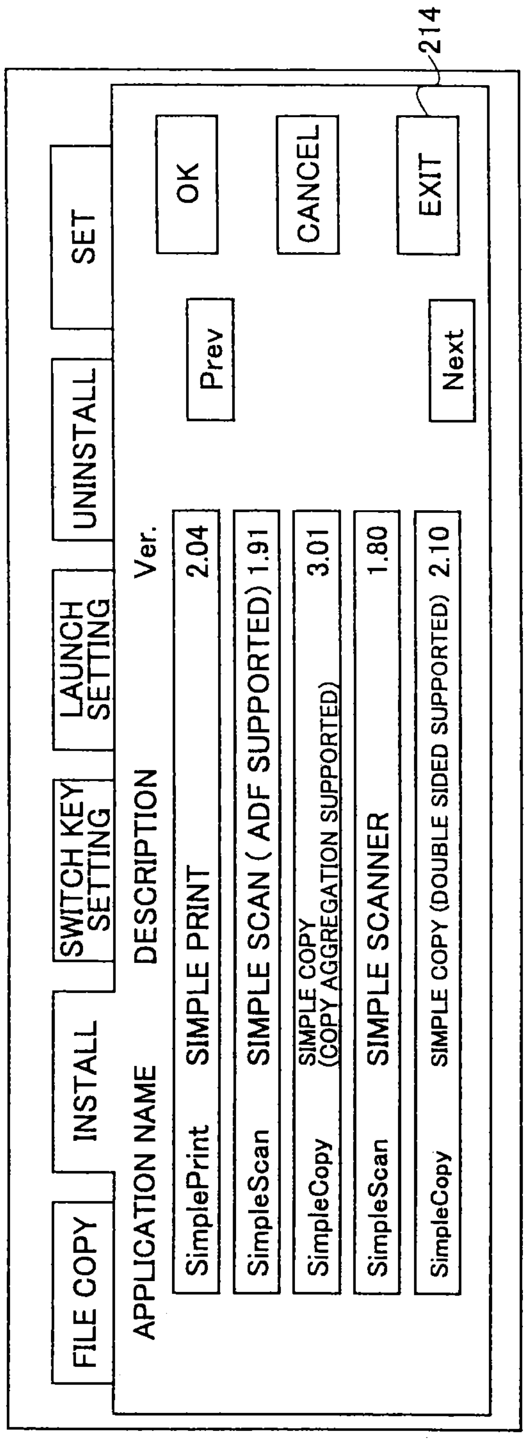

As shown in FIG. 25A, when a not-installable application is selected, a warning screen is displayed as shown in FIG. 25B. As shown in FIG. 26A, when an installed application is selected, a warning screen shown in FIG. 26B is shown, in which a warning indicating that setting values would be initialized is shown. As shown in FIG. 27A, while the application is being registered, the screen is changed to a waiting screen. Then, an completion result is shown in FIG. 27B. Then, as shown in FIG. 28, application names that are installed are shown.

Figure 29A:
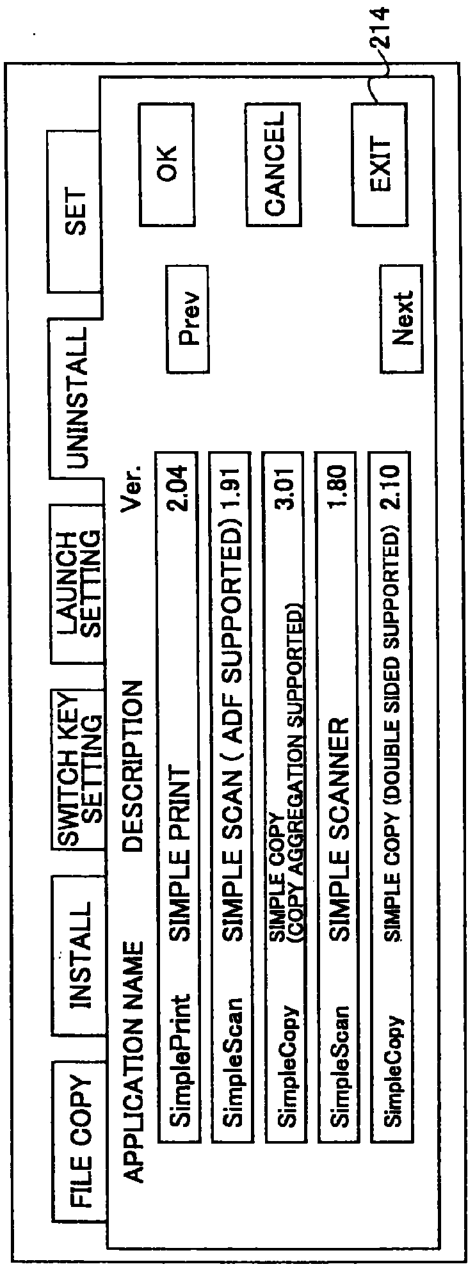
Figure 29B:
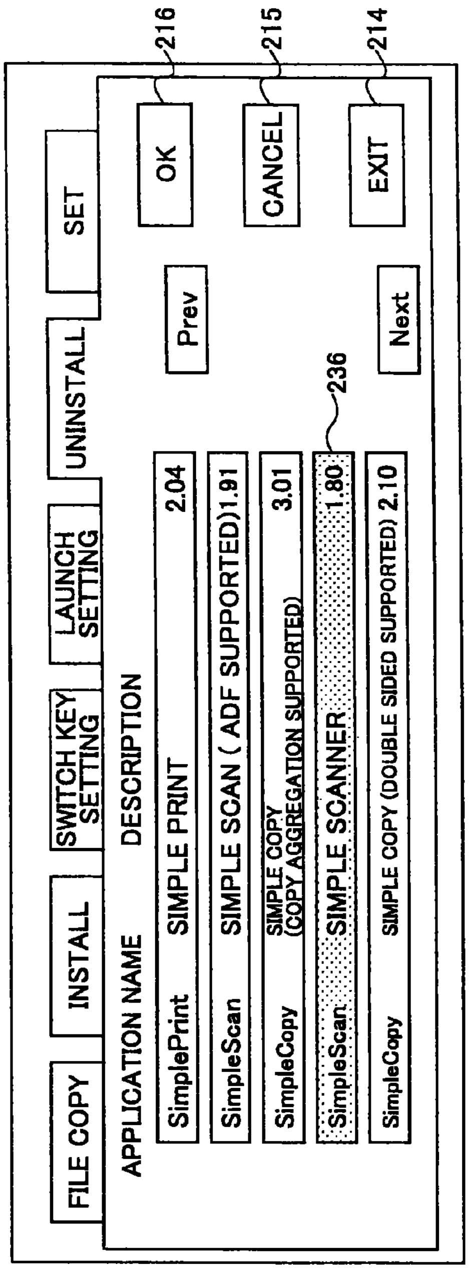
Figure 30A:
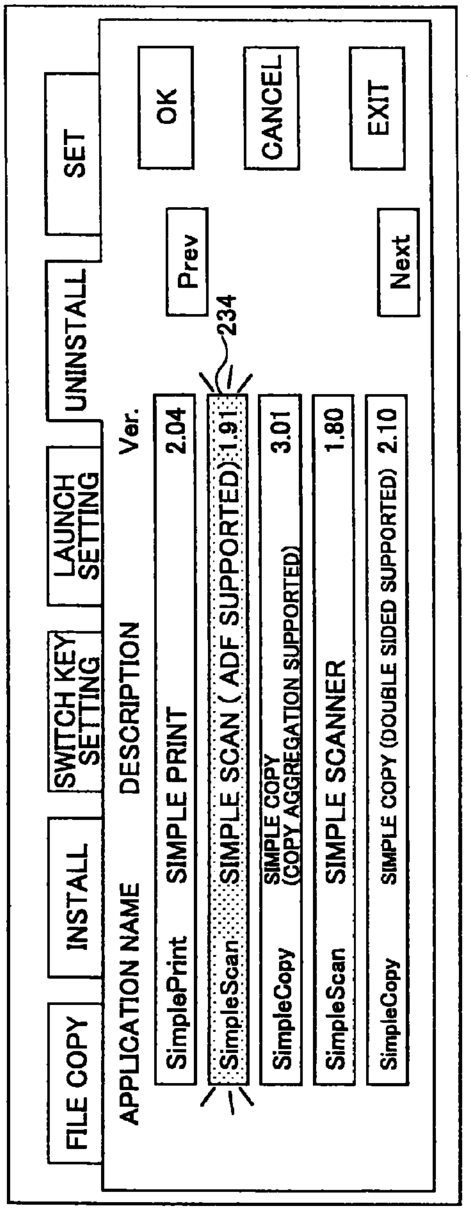
Figure 30B:
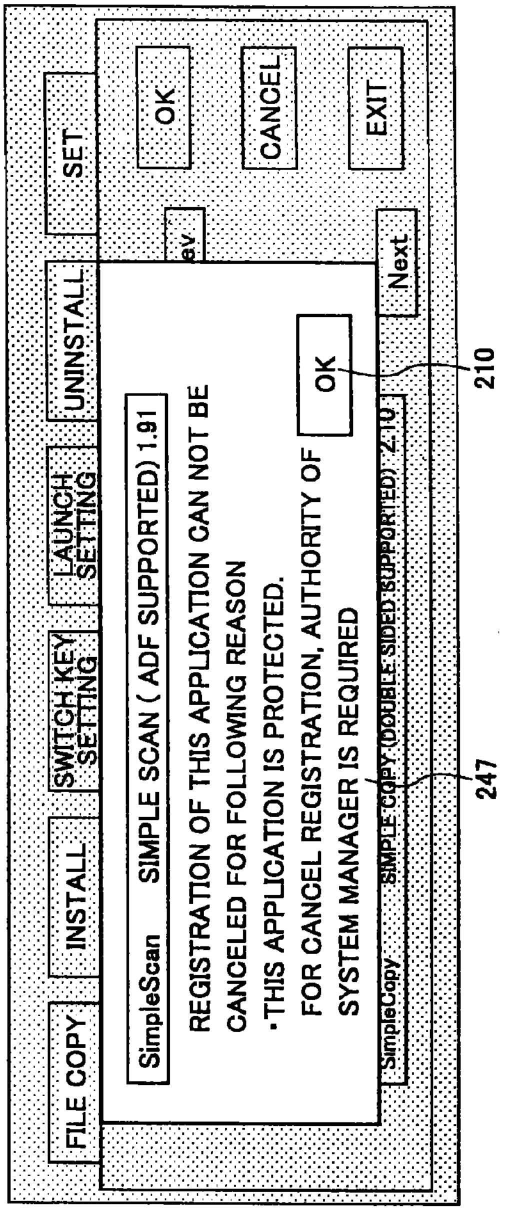
Figure 31A:
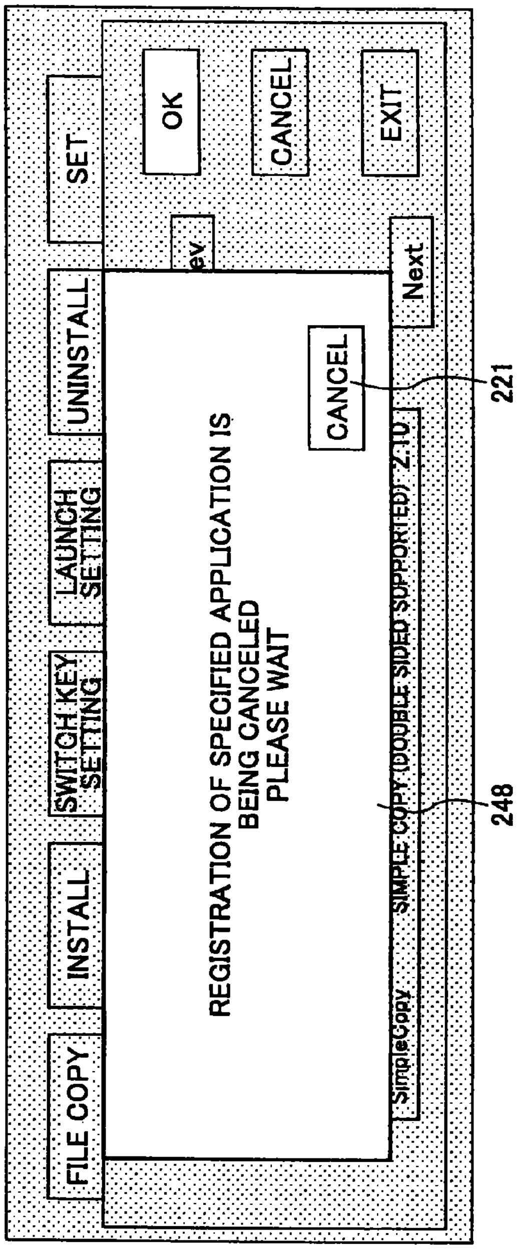
Figure 31B:
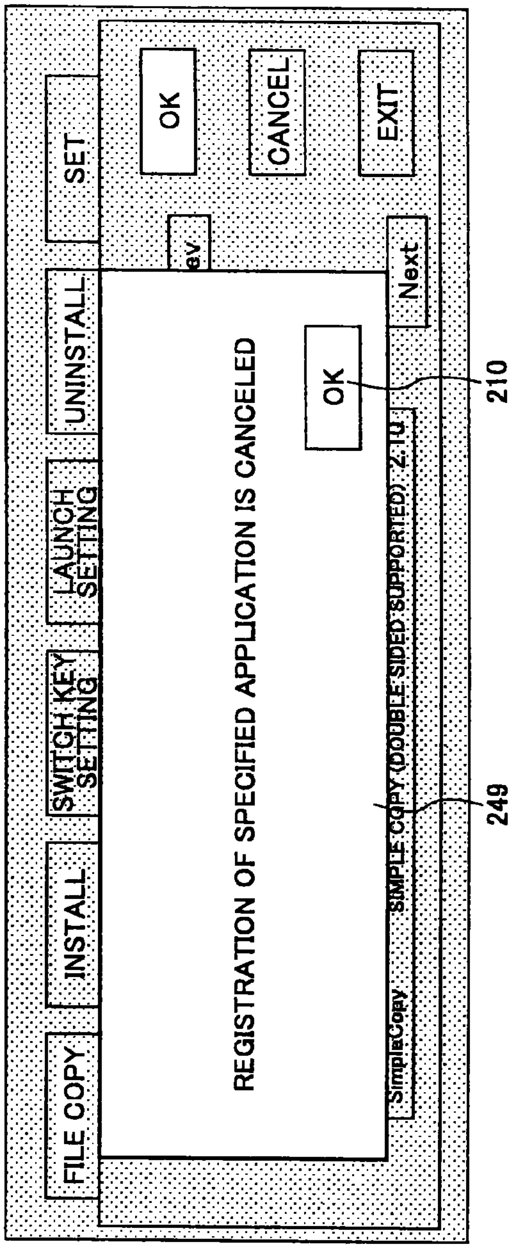
Figure 32:
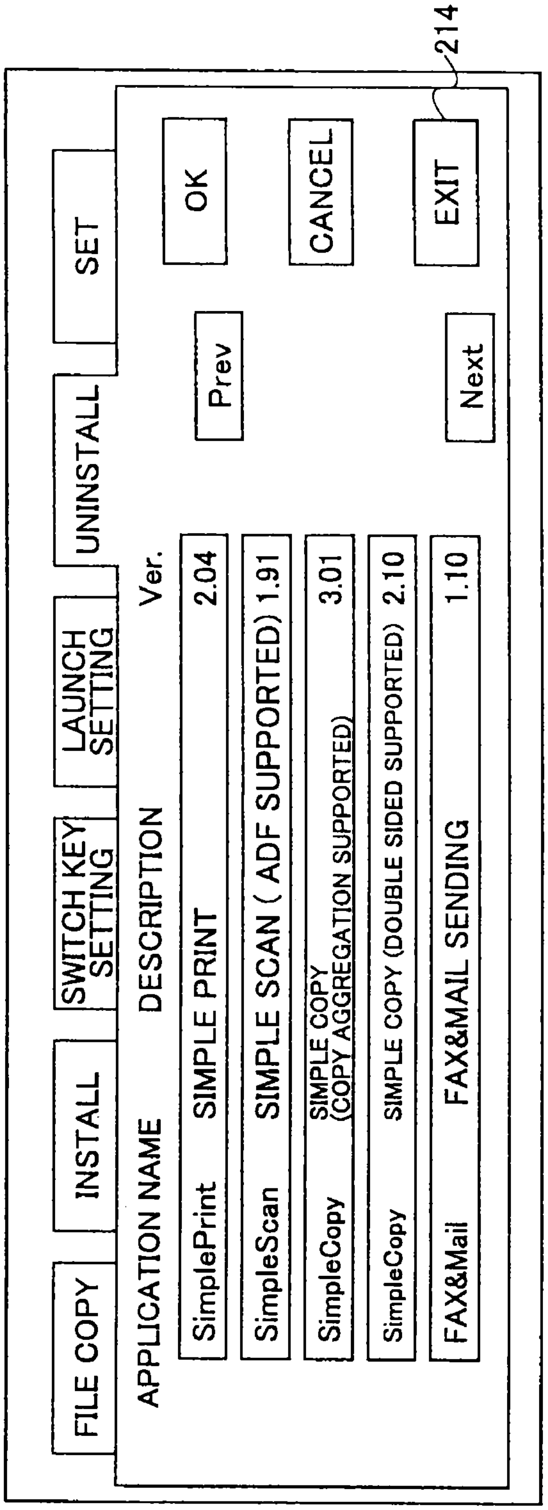

As to uninstall process, the screen shown in FIG. 29A is shown. FIG. 29B shows a screen in which an application to be uninstalled is selected. When an application for which uninstall is not allowed is selected, warning screens shown in FIGS. 30A-30B are shown. When uninstall is allowed, FIGS. 31A and 31B are shown, and uninstall result is shown as shown in FIG. 32.

Figure 35A:
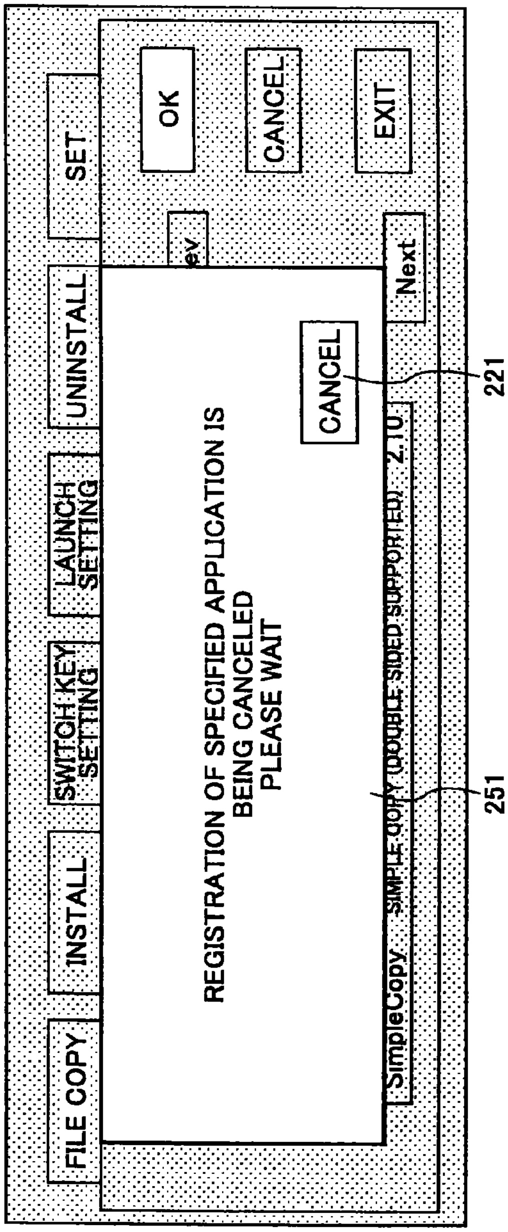
Figure 35B:
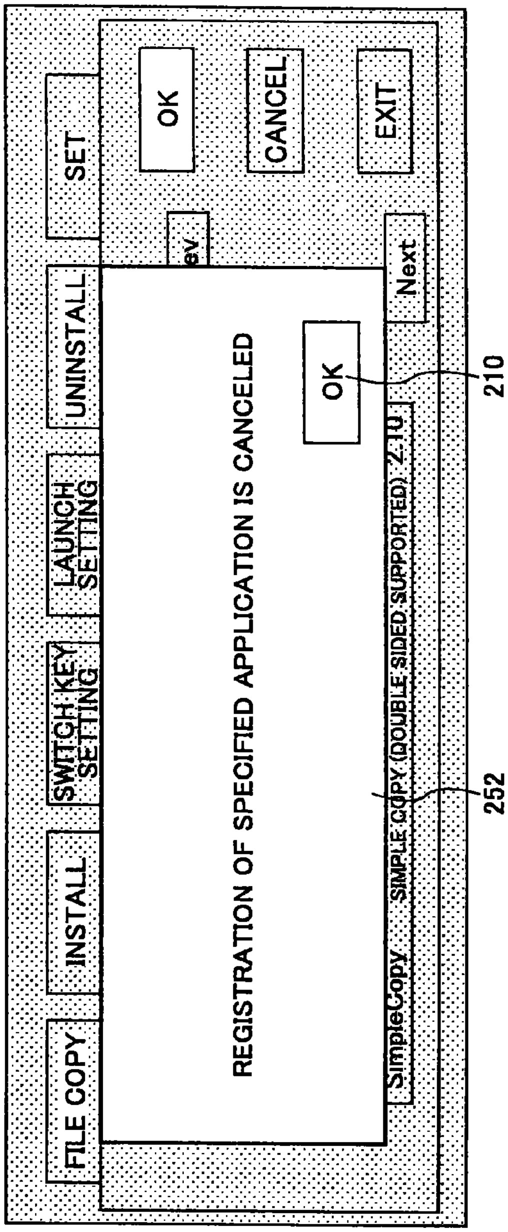
Figure 36:
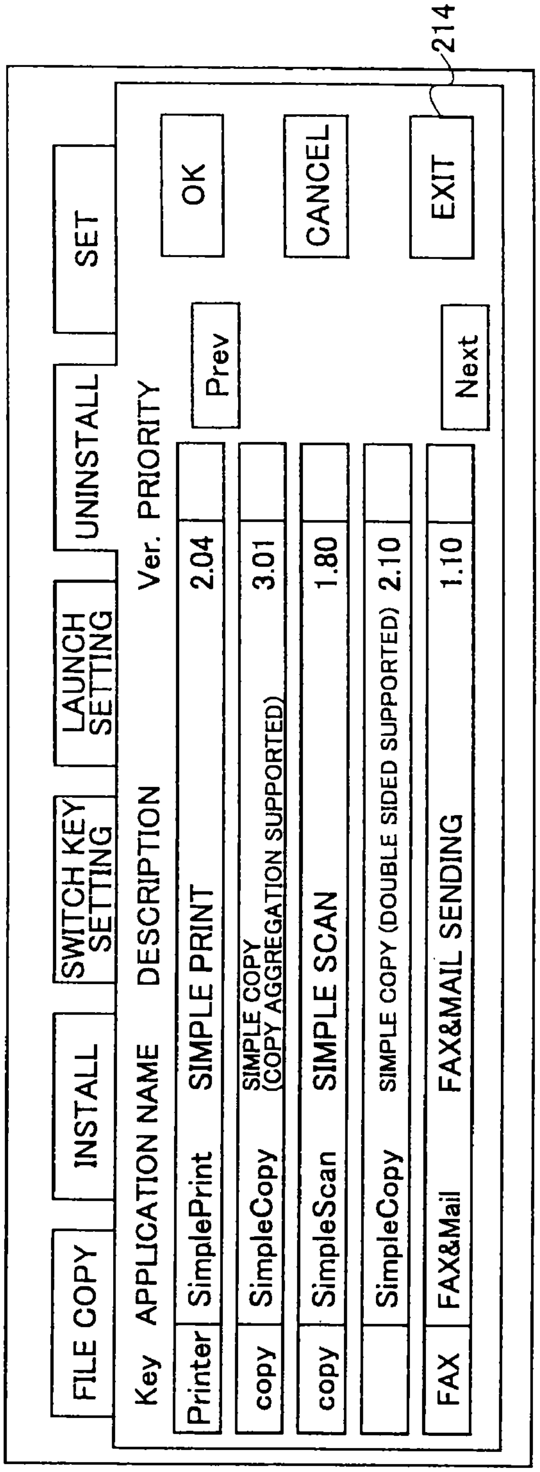

FIGS. 33 and 34 are examples of uninstall screens when a key is already assigned to the application. As shown in FIG. 34A, when SimpleScan is selected, a screen shown in FIG. 34B is shown in which whether key assignment is released and the application is uninstalled is inquired. When OK is pushed, the screens shown in FIGS. 35A and 35B are shown, and uninstall result is shown in FIG. 36.

As mentioned above, according to the compound machine 100 of this embodiment, copy process, install process and uninstall process can be easily operated by using the operation screens shown in FIGS. 9-36. Since various pieces of application information are shown on the operation panel, the user can select screens sequentially according to displayed application information. As a result, easy operation can be realized.

In the examples shown in FIGS. 9-36, the compound machine 100 determines whether an application is installable, and the determination result is shown on the operation panel. However, the compound machine 100 can be also configured such that the compound machine 100 simply displays information necessary for determining whether an application is installable so that the user performs the determination. In this case, for example, version information of APIs used in the application and version information of APIs actually used in the compound machine may be displayed. In addition, a resource amount to be used by the application and an available resource amount that actually can be used in the compound machine may be displayed such that they can be compared.

The above-mentioned series of screens can be displayed on an apparatus such as a PC connected to the compound machine via network, and install process and the like can be performed from the apparatus.

In the case, the net file application 115 shown in FIG. 1 has a Web server capability. A Java program that is a part of the net file application 115 generates a series of the screens and performs install process and the like for the compound machine 100 by using the so-called "servlet" method. The PC include a Web browser.

Figure 37:
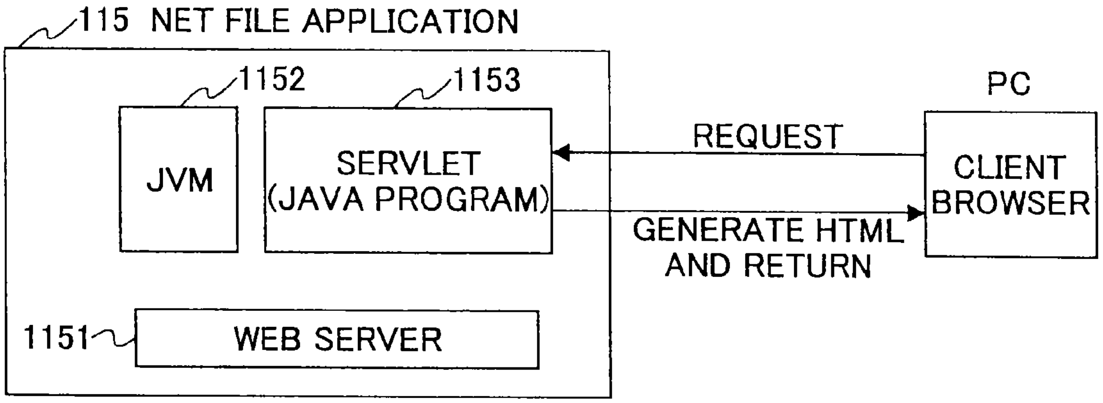
FIG. 37 shows the configuration of the net file application according to the second embodiment.

The configuration of the net file application 115 is sown in FIG. 37. As shown in FIG. 37, the net file application 115 includes a Web server 1151, a JVM (Java virtual machine) 1152 and a Java program 1153. The net file application 115 receives a request from the PC. Then, the net file application 115 performs the install process and generates a HTML file and returns the HTML file to the PC.

The screen can be displayed on the PC simultaneously with displaying the same screen on the operation panel of the compound machine, or the screen can be displayed only on the PC. When the screen is displayed on the PC simultaneously with displaying the same screen on the operation panel, for example, the net file application 115 obtains drawing information from the OCS, and converts the drawing information into HTML and sends the HTML.

(Third Embodiment)

In the following, the third embodiment of the present invention will be described. The functional configuration of the compound machine 100 of the third embodiment is the same as that of the first embodiment. That is, the functional configuration of the compound machine 100 of the third embodiment is shown in FIG. 1.

As to a general personal computer, if a plurality of applications are launched one by one, there is a possibility that the PC hangs due to lack of resources. On the other hand, as to the compound machine 100 of the present invention, the preinstalled applications such as the copy application do not hang.

However, since the compound machine 100 can install a new application developed by a third vendor or a user, there may be a case in which lack of resource occurs when launch setting is performed for a new application if a plurality of applications are already set to be launched.

The "launch setting" is performed for setting an installed application to be launched when the compound machine 100 is powered on. That is, in the compound machine 100 of this embodiment, the application is not launched only by installing the application. It is necessary to perform launch setting on the application for launching the application. By performing the launch setting, information indicating that the application is to be launched is stored in a memory. Then, when the compound machine 100 is powered on, the information is referred to so that the application is launched.

The VAS 140 obtains information on resources to be used by the application (also referred to as necessary resource information) from the application, and generates a resource use information file by using the information in the hard disk (HD 200). A text memory area size, a heap area size and a stack area size are examples of the information on resources to be used. The text memory area is a memory area in which programs of each application are loaded. The heap area is a memory area in which each application dynamically keeps. The stack area is an area that is kept for storing arguments that are used for calling external modules by each application.

The information on the necessary resource amount is included in the execution file of the application when developing the application. Then, the VAS 140 provisionally launches the application so as to obtain the information by using interprocess communication.

In addition, by storing the information on resources to be used by the application in a file, the VAS 140 can obtain the necessary resource information by referring to the file.

Further, if the application has been actually executed on the compound machine 100, the VAS 140 can obtain the necessary resource amount by obtaining the resource usage records of the application.

The VAS 140 also obtains an available resource amount in the compound machine 100 by subtracting resource amounts already used by applications and system programs from the whole resource amount of the compound machine 100. As the resource amounts already used by applications and system programs, usage records that are recorded in the compound machine can be used. The resource amounts already used by applications and system programs can be recorded in the resource use information file, and the VAS 140 can refer to them.

At the time when the launch setting is performed for an application, the VAS 140 compares the necessary resource amount for the application and the available resource amount. When the resource amount lacks in the compound machine, launch is restricted, that is, launch setting is not performed for the application. In addition to that, if the application has a limited execution mode, the VAS 140 may set the application to run by the limited execution mode, in which the limited execution mode is a mode in which, for example, if the memory area is not enough, the application runs by using the hard disk area instead of the memory area.

The resource check and the launch restriction can be performed not only when the launch setting is performed but also when the application is just actually launched.

Figure 38:
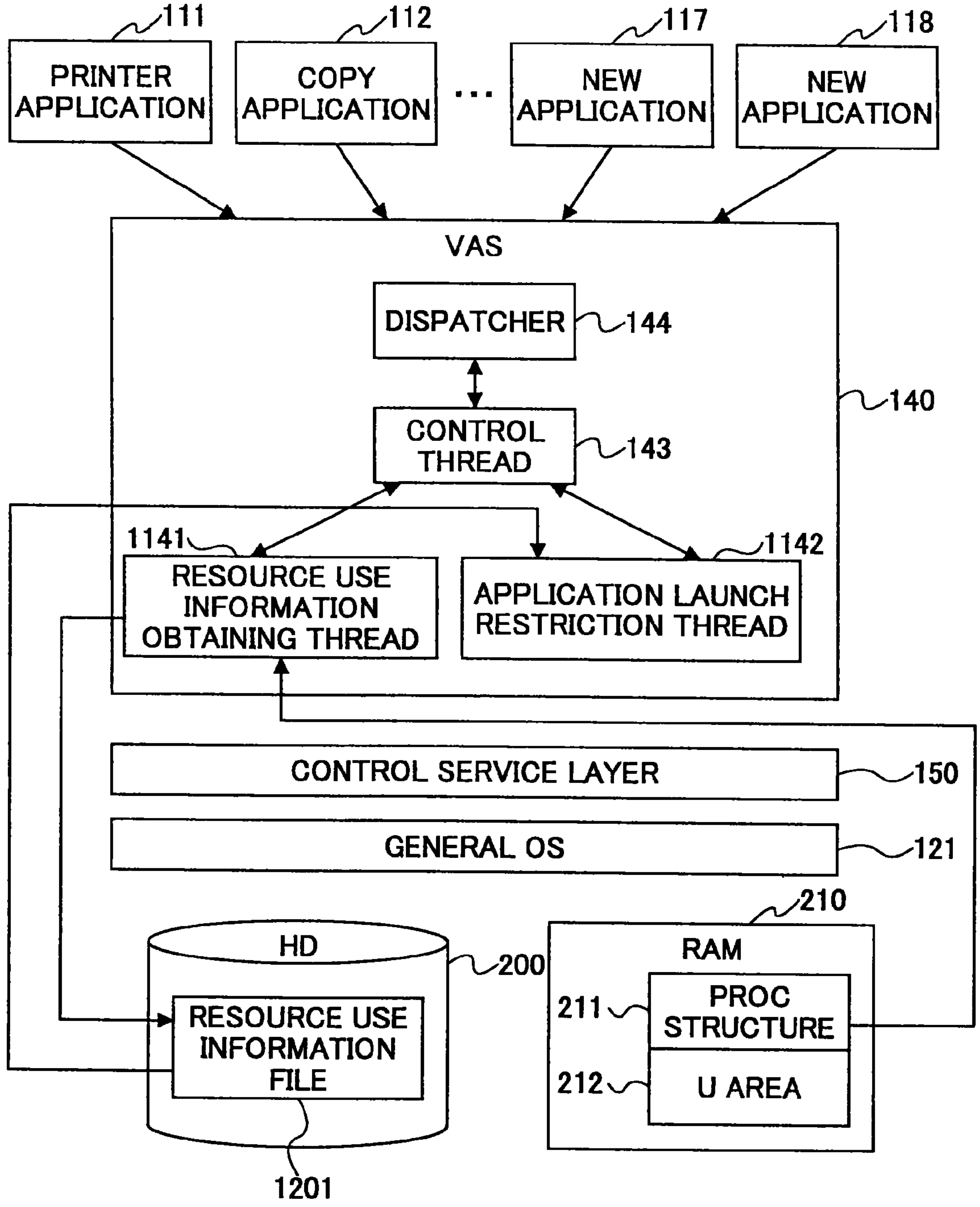
FIG. 38 is a block diagram showing the configuration of the VAS 140, and the relationship among the VAS 140, the applications, the control service layer 150 and the general OS 121 according to the third embodiment.

FIG. 38 is a block diagram showing the configuration of the VAS 140 of this embodiment, and the relationship among the VAS 140, the applications, the control service layer 150 and the general OS 121.

In the process of the VAS 140, a dispatcher 144, a control thread 143, a resource use information obtaining thread 1141, and an application launch restriction thread 1142 operate.

The dispatcher 144 monitors message receiving from the application or the control services, and sends a process request accordion to the message.

In a situation in which an application is actually launched, when the dispatcher 144 receives an application launch request message from the control service, the dispatcher 144 sends the received application launch request message to the control thread 143. The control thread 143 sends a process request to the resource use information obtaining thread 1141 and the application launch restriction thread 1142.

In a situation in which launch setting is performed, for example, the dispatcher 144 sends a process request message to the control thread 143, and the control thread 143 sends a process request to the resource use information obtaining thread 1141 and the application launch restriction thread 1142.

The control thread 143 can determine whether resource use information is recorded for an application that is installed by referring to the resource use information file 1201.

Then, the control thread 143 obtains the resource use information from the resource use information obtaining thread, and sends the resource use information to the application launch restriction thread 1142. The application launch restriction thread 1142 may refer to the resource use information file 1201. The application launch restriction thread 1142 compares the available resource amount and the necessary resource amount. If the necessary resource amount is larger than the available resource amount, the application launch restriction thread 1142 performs launch restriction process.

When the resource use information obtaining thread 1141 receives a process request from the control thread 143, the resource use information obtaining thread 1141 refers to a proc structure (or u area 212) of the general OS 121 to obtain the text memory area size, heap area size and the stack area size used by an application. Then, the resource use information obtaining thread 1141 produces the resource use information file 1201 in the hard disk (HD) 200. The resource use information is recorded for each application as a record. Instead of this, as mentioned before, the resource use information obtaining thread 1141 may obtain necessary resource information from the application that is included in the execution file of the application, and record the resource information in the resource use information file 1201.

In addition, the resource use information obtaining thread 1141 can obtain resource amounts that are used by current processes from the proc structure 211, in which the currently used resource amounts are used for calculating the available resource amount.

Instead of performing the above-mentioned processing by using the threads, the VAS 140 may be configured as one process.

FIG. 39 shows an example of the resource use information file 1201 stored in the HDD 200. As shown in FIG. 39, the resource use information file 1201 stores the text memory area size, heap area size and the stack area size for each application ID (also referred to as product ID).

This file may store configuration data of the compound machine 100, for example, ADF. By doing so, launch restriction can be performed according to the configuration data. For example, if the compound machine 100 does not have the ADF, launch of an application that uses the ADF may be restricted.

FIG. 40 shows an example of the proc structure 211 that is referred to by the resource use information obtaining thread 1141. As shown in FIG. 40, the proc structure 211 includes process ID (p_pid), text memory area size, heap memory area size and stack area size for each process. The proc structure is updated by the general OS when a process is executed, when a process ends, and when the status of the process changes.

In addition, the resource use information obtaining thread 1141 obtains resource amounts used by applications and system programs that are already set to be launched from the proc structure 211, and calculates the available resource amount by subtracting the currently used resource amounts from the whole resource amount of the compound machine.

When the application launch restriction thread 1142 receives a launch request for a new application or receives a launch setting request, the application launch restriction thread 1142 refers to the resource use information file 1201, and obtains information on resources to be used by the new application. In addition, the application launch restriction thread 1142 obtains the available resource amount, for example, from the resource use information obtaining thread 1141. Then, the application launch restriction thread 1142 compares them and determines whether launch of the new application needs to be restricted.

In a case of launch setting, when the application launch restriction thread 1142 determines that application launch restriction is necessary, the application launch restriction thread 1142 displays an after-mentioned warning screen.

In a case of actual launching, when the application launch restriction thread 1142 determines that application launch restriction is necessary, the application launch restriction thread 1142 sends a launch restriction request message to an application that sent the application launch request. When the application launch restriction thread 1142 determines that application launch restriction is not necessary, the application launch restriction thread 1142 sends a launch request message to the application so that normal launch process is performed.

Figure 41:
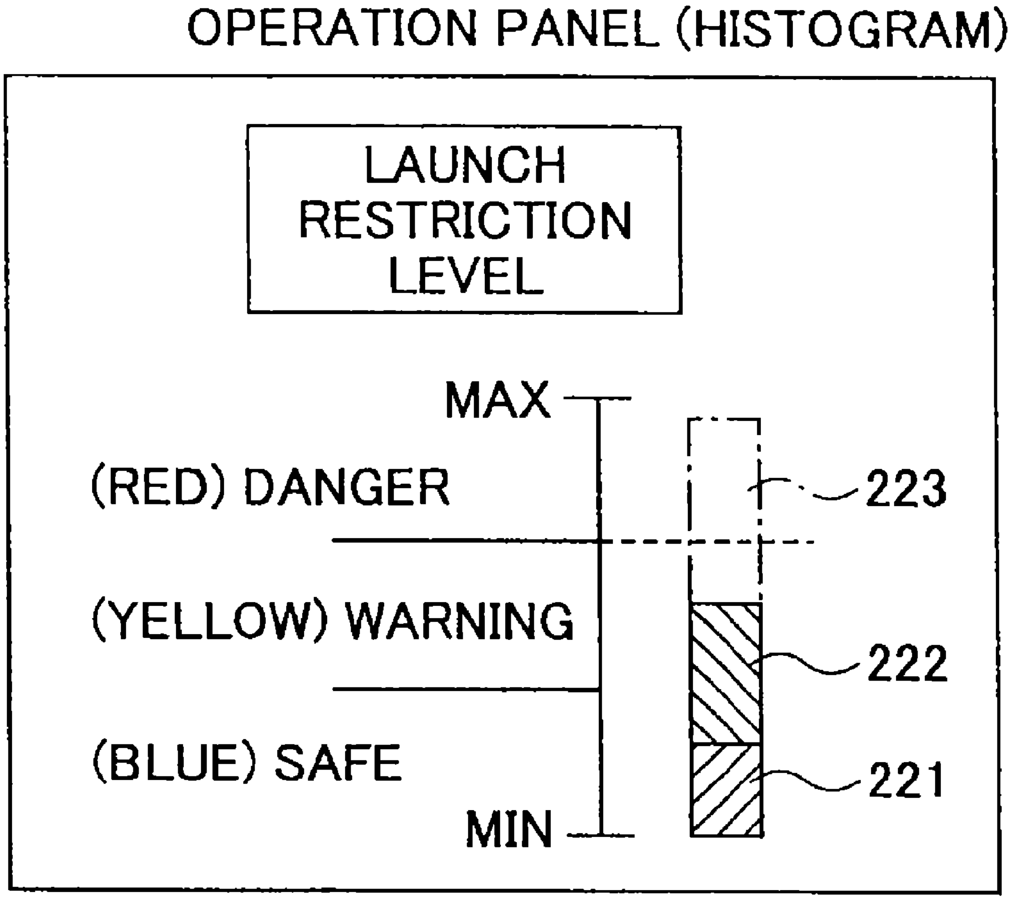
FIG. 41 shows a figure of a screen displayed on the operation panel in which launch restriction levels are shown by using a histogram.

FIG. 41 shows a figure of a screen displayed on the operation panel in which launch restriction levels are shown by using a histogram. This screen is displayed when launch setting is performed. The histogram shown in FIG. 41 indicates the available resource amount that is obtained by subtracting resources used by applications and system programs that are preinstalled in the compound machine from the whole resource amount. That is, the figure visually shows how to divide remaining resources among new applications. By using the screen, the user can visually determine how to divide remaining resources among new applications. The histogram shows a resource amount to be used by a user application 221 that is set to be launched first, and resource amount to be used by a user application 222 that is set to be launched secondly. As for a user application 223 for which launch setting has not been performed, predicted resource amount is shown. In the example of FIG. 41, if launch setting is performed for the user application 223, the resource amounts reach a dangerous level. Thus, launch setting can not be performed for the user application 223. In the screen, the launch restriction levels are shown by using colors, for example, safe (blue), warning (yellow) and danger (red). In addition, at the position of the dangerous level, the histogram may blink, or a voice guidance or warning sound may be output.

Examples of screens displayed on the operation panel will be shown in the following. Each screen is displayed by the VAS 140, for example.

Figure 42:
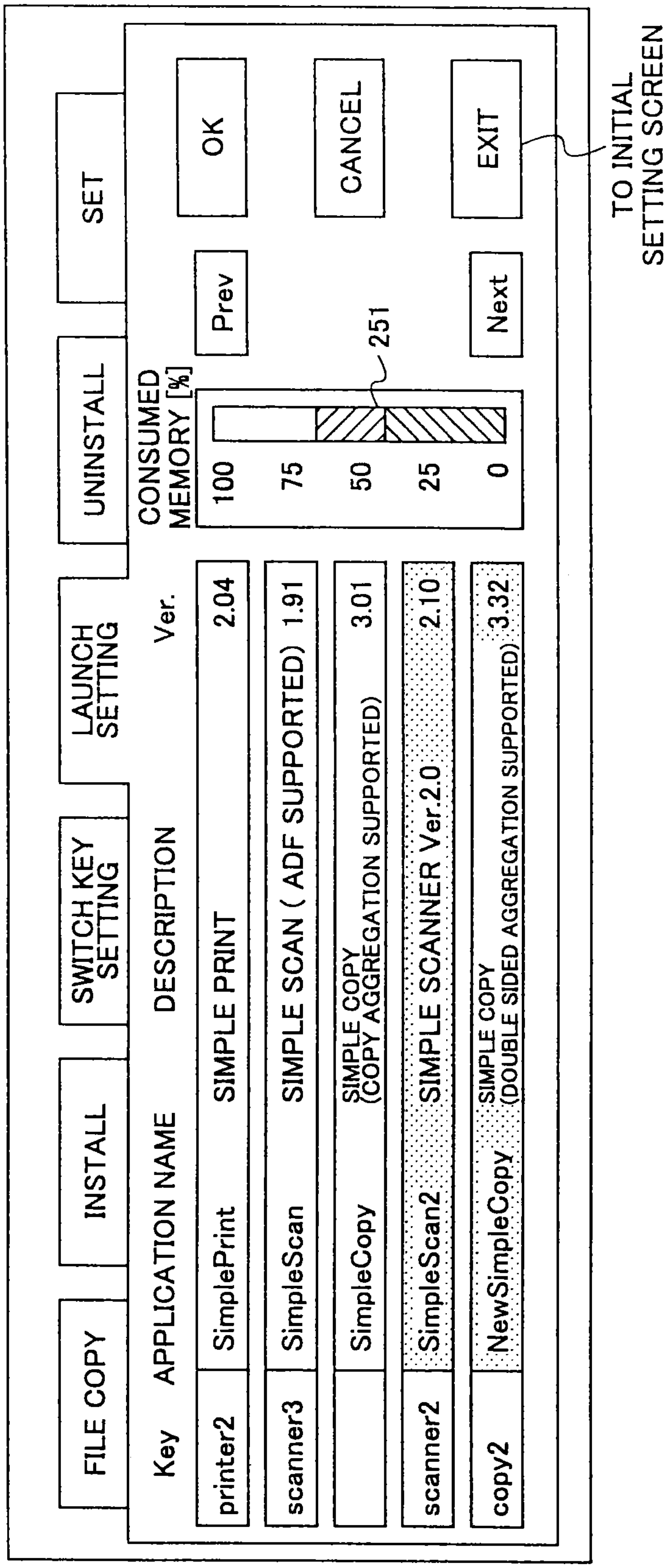
FIG. 42 shows a launch setting screen in which launch setting has been performed for "simple scanner" and "simple copy"

FIG. 42 shows a launch setting screen in which launch setting has been performed for "simple scanner" and "simple copy". As shown in the figure, memory amounts to be used by the "simple scanner" and "simple copy" are shown in the histogram 251.

Figure 43:
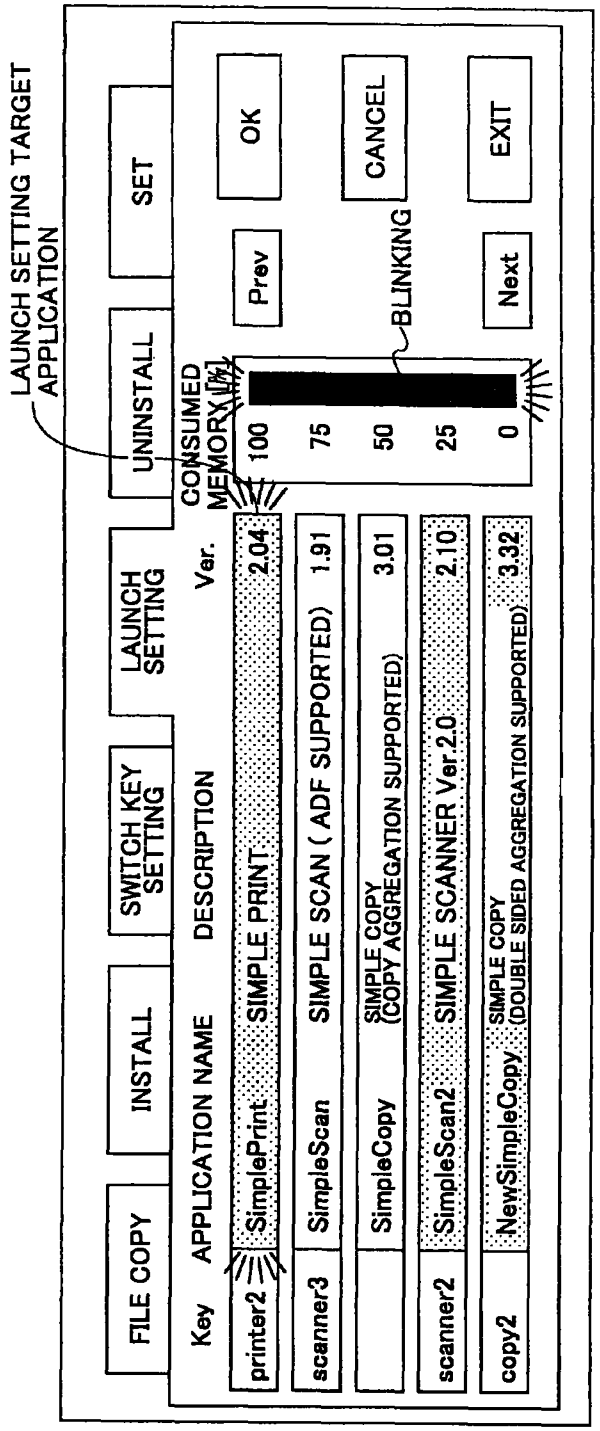
FIG. 43 shows the launch setting screen in which "simple print" is selected.

Next, when "simple print" is selected for performing launch setting as shown in FIG. 43, the part of "simple print" blinks for a second. Then, the value of the histogram becomes 100% and the histogram blinks.

Figure 44:
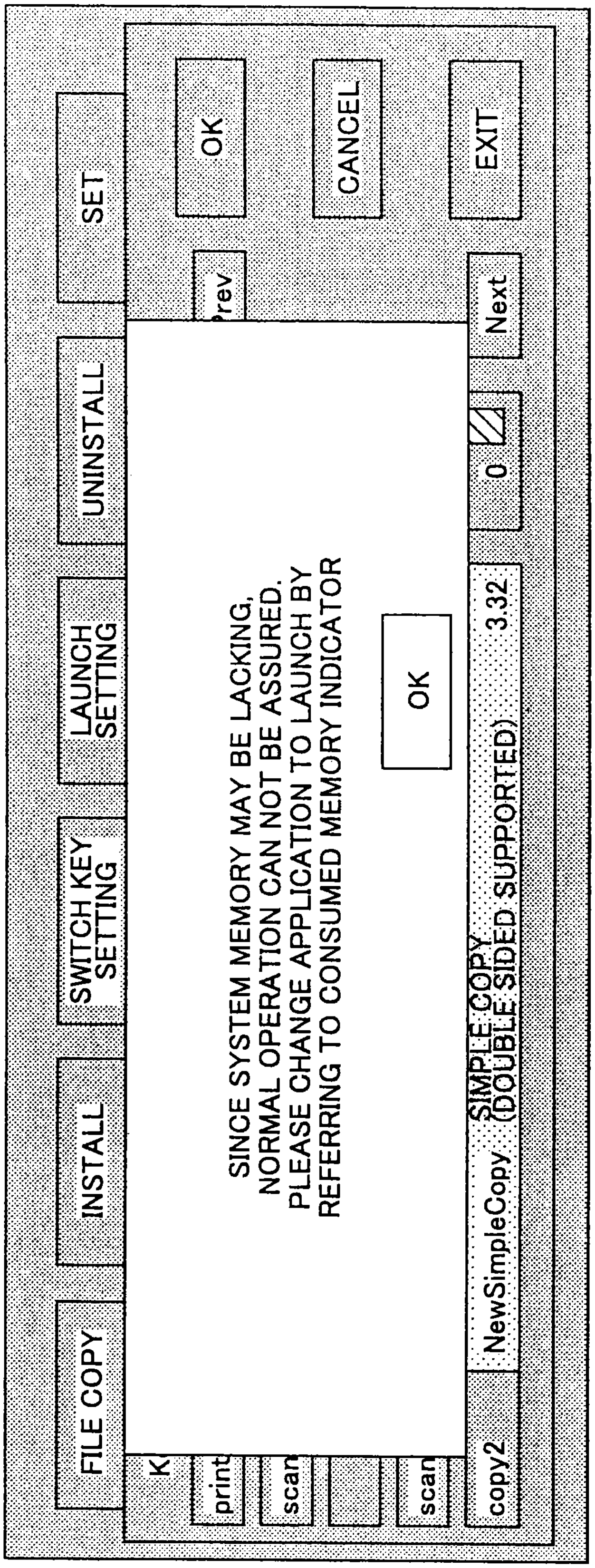
FIG. 44 is a screen for advising to select another application.
Figure 45:
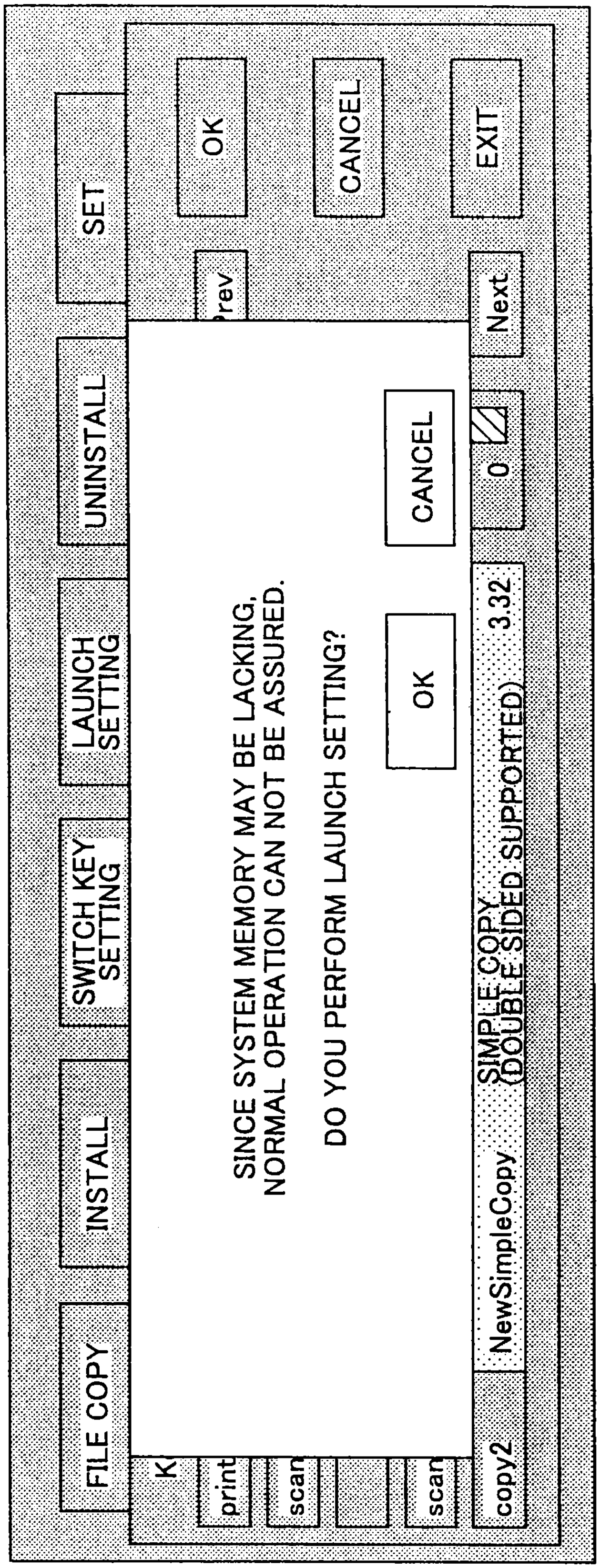
FIG. 45 is an example of a screen in which launch setting can be performed even if enough memory is not included in the compound machine.
Figure 46:
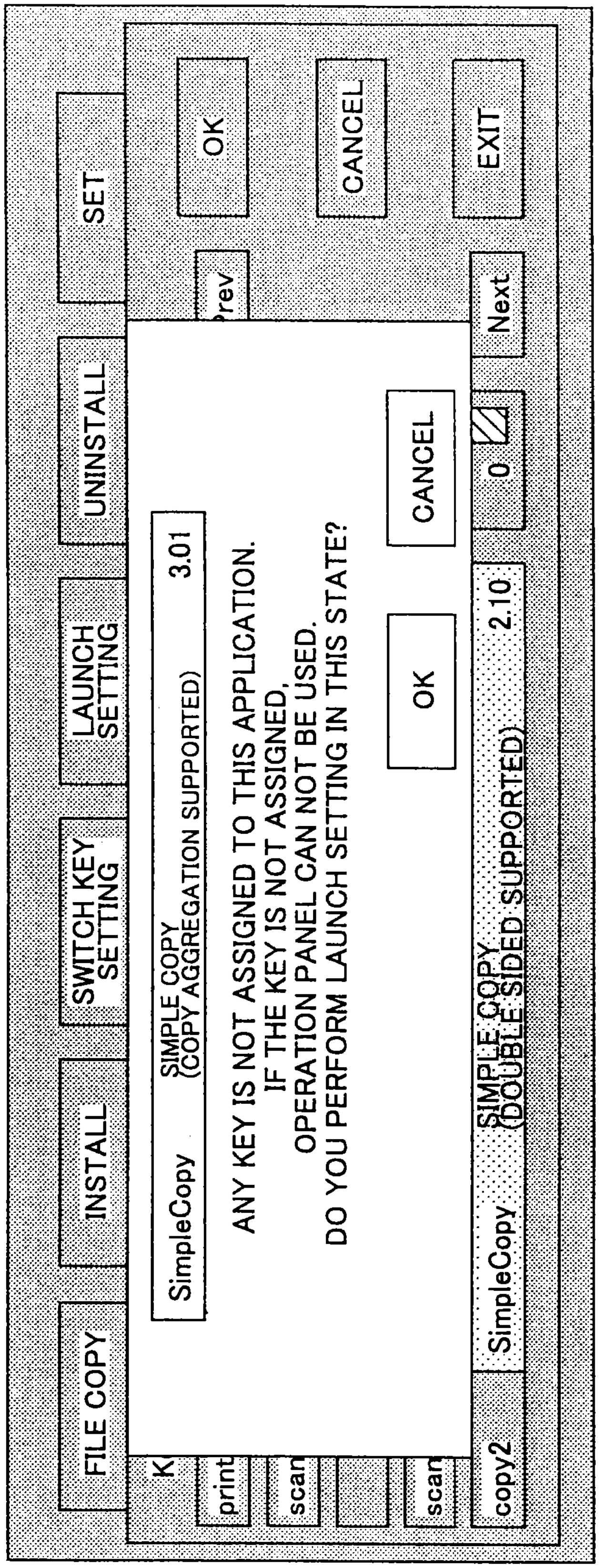
FIG. 46 is a screen displayed when an application for which any key is not assigned is selected.

After that, screens shown in FIGS. 44 and 45 are displayed. FIG. 44 is a screen for advising to select another application. By pushing the OK button, the screen returns to FIG. 42. FIG. 45 is an example of a screen in which launch setting can be performed even if enough memory is not included in the compound machine. When an application for which any key is not assigned is selected, a screen shown in FIG. 46 is displayed.

Figure 47:
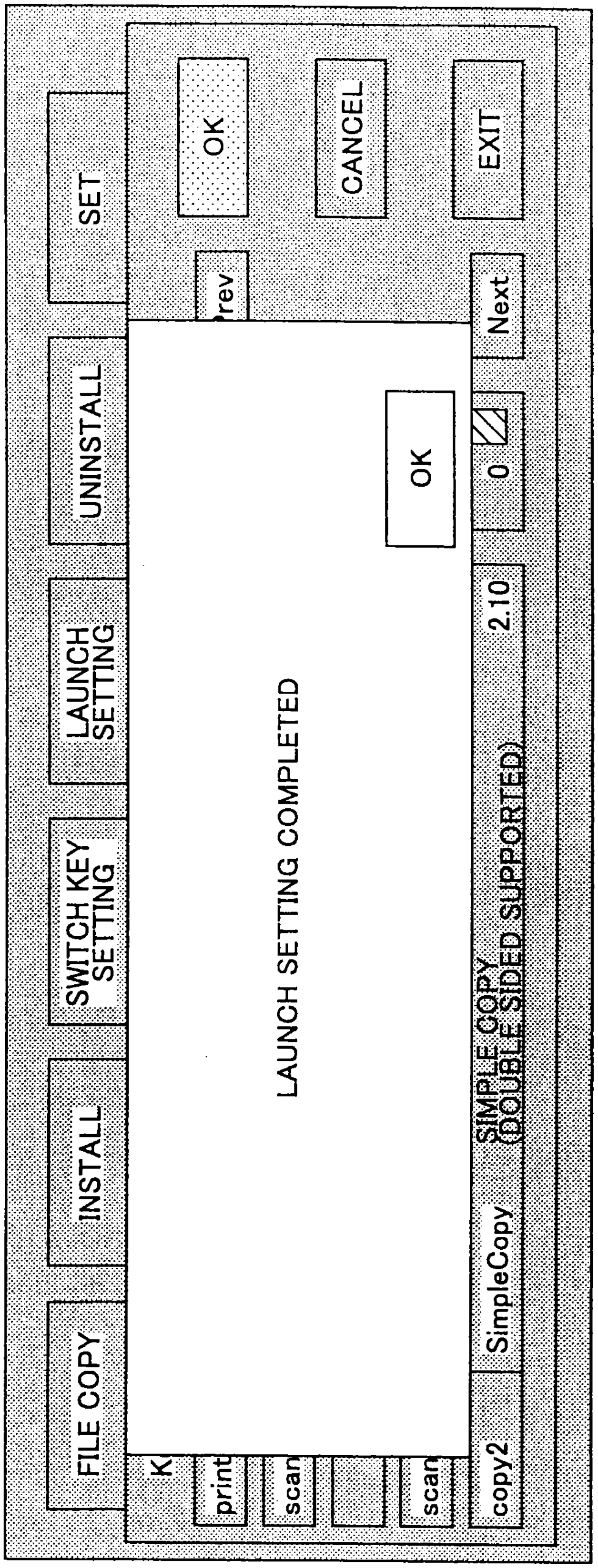
FIG. 47 is a screen showing completion of launch setting.
Figure 48:
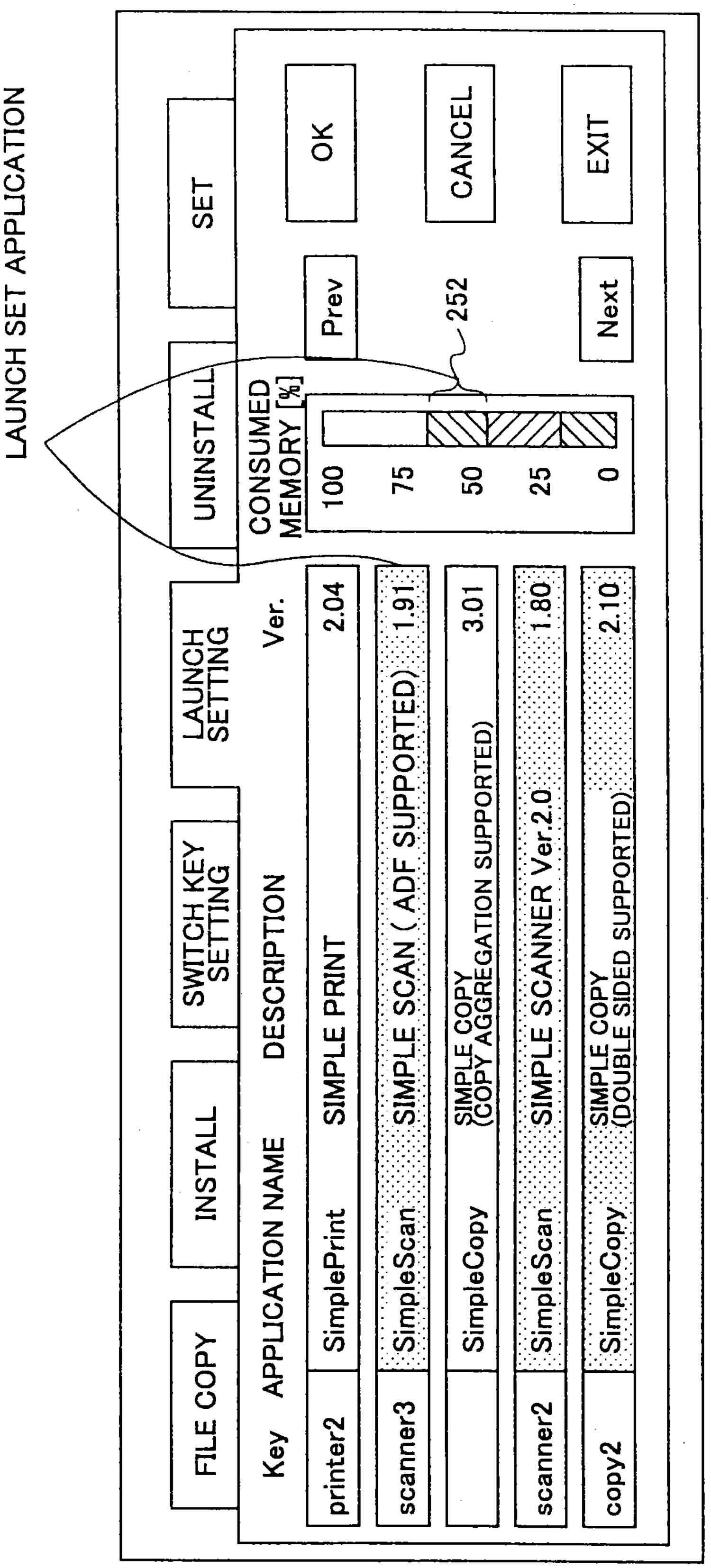
FIG. 48 is a screen shown after the launch setting ends.

In the screen of FIG. 42, when "simple scanner" is selected and when launch setting ends, a screen shown in FIG. 48 is displayed after the screen of FIG. 47. As shown in FIG. 48, the value of the histogram is increased by the memory amount to be used by the "simple scanner".

Figure 49:
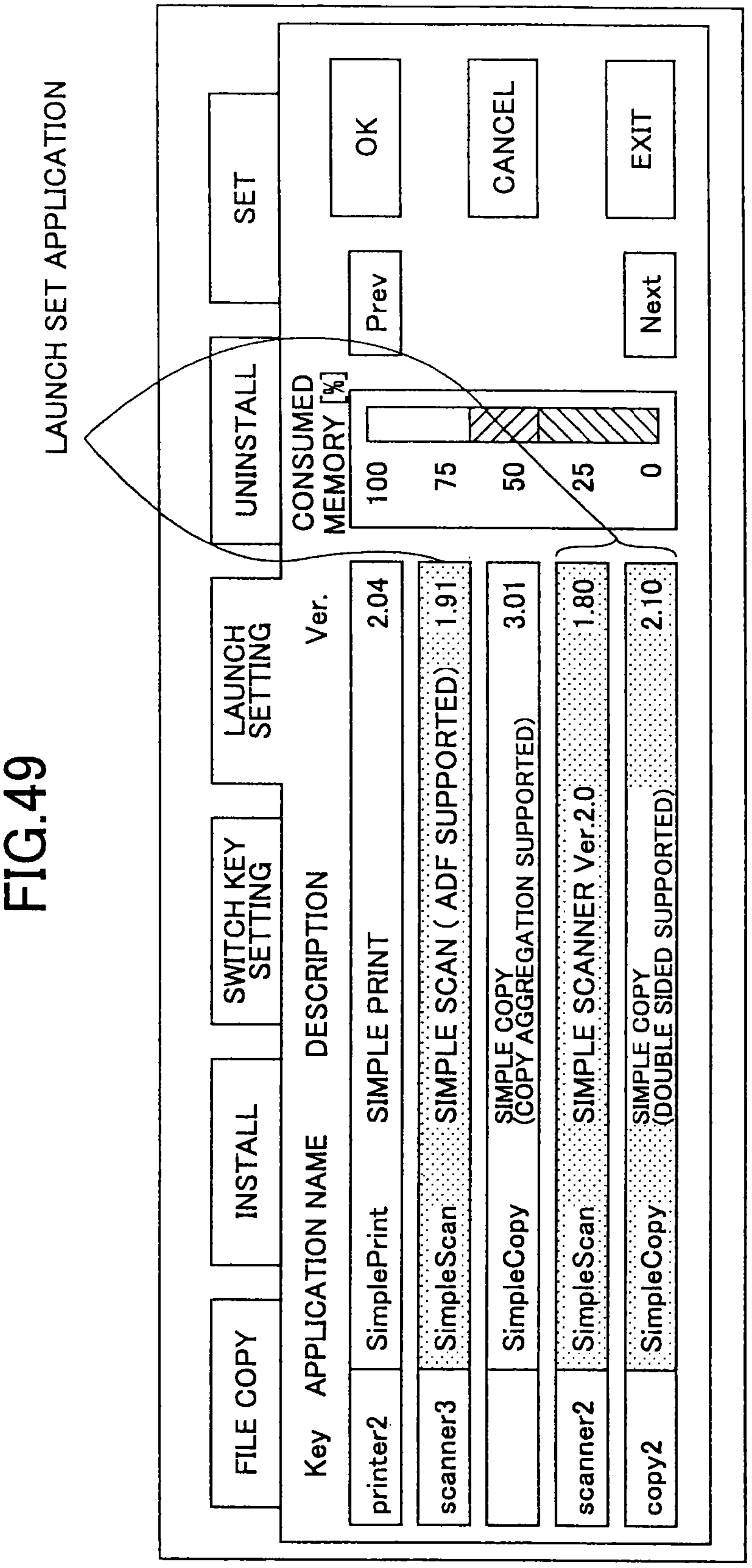
FIGS. 49-53 shows screens in which release of launch setting is performed.
Figure 50:
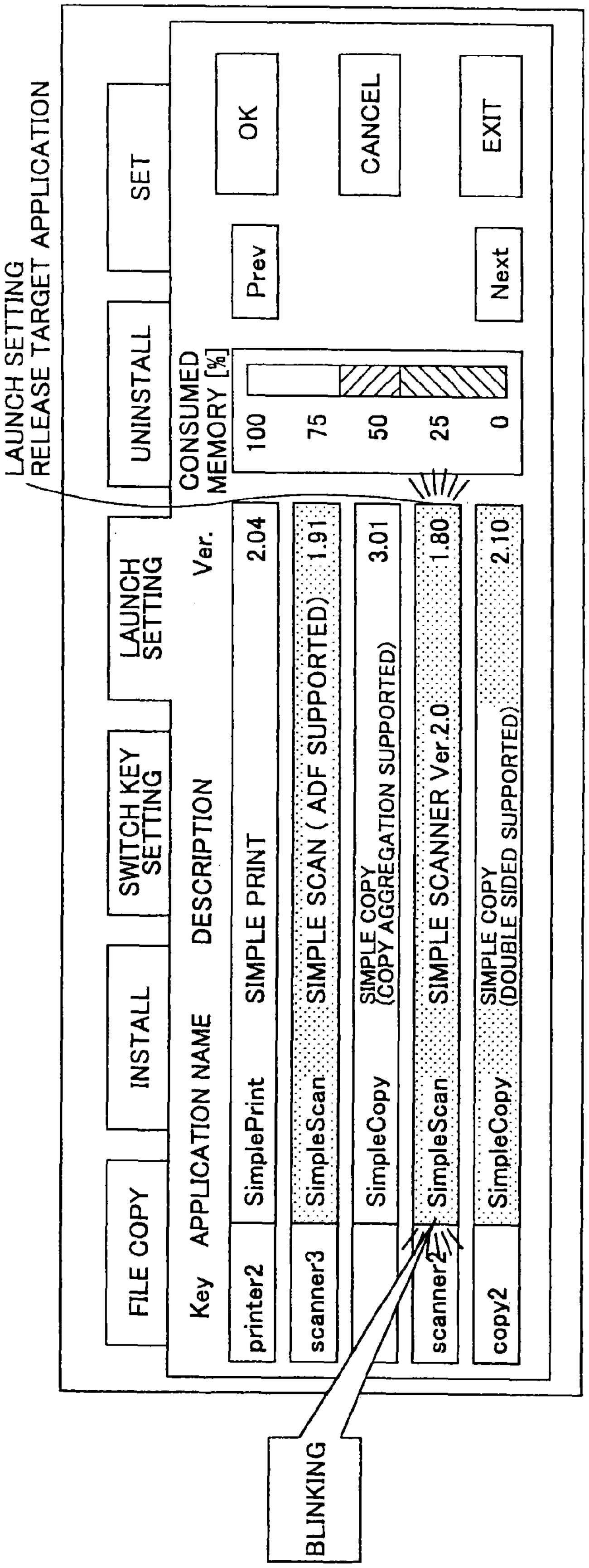
Figure 51:
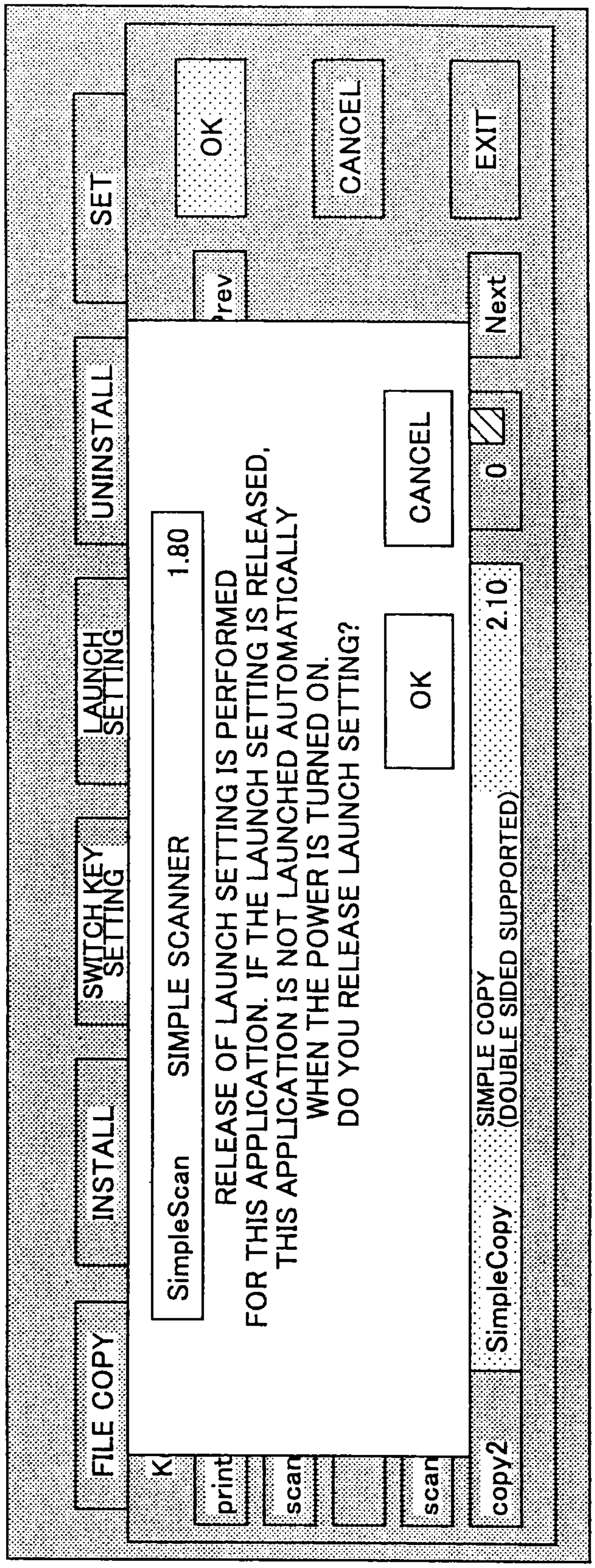
Figure 52:
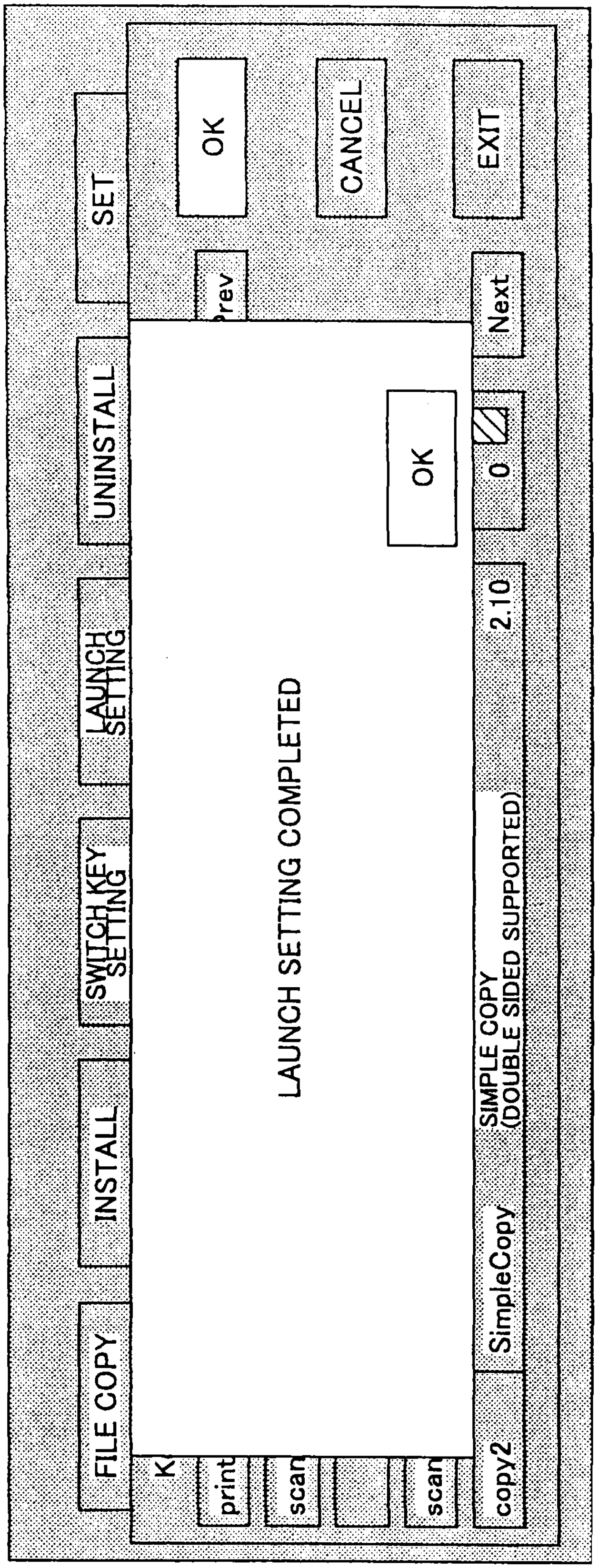
Figure 53:
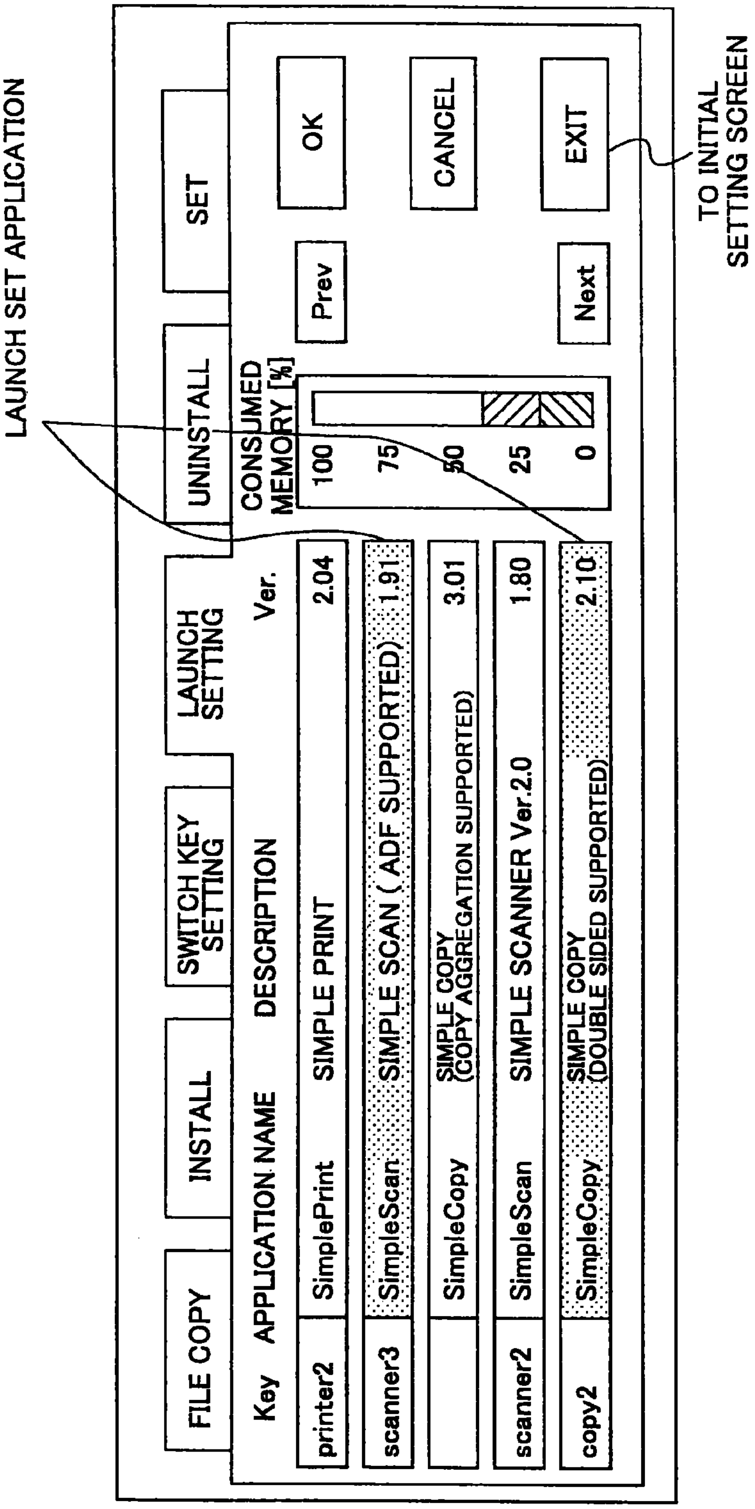

When releasing launch setting for an application, screens shown in FIGS. 49-53 are displayed. In the state of FIG. 49, when "simple scanner" is selected for releasing launch setting, "simple scanner" blinks as shown in FIG. 50. If OK is pushed, a screen shown in FIG. 51 is displayed. Then, if OK is pushed, a screen of FIG. 53 is shown via FIG. 52. As shown in FIG. 53, a memory amount of the simple scanner is decreased from the histogram.

Figure 54:
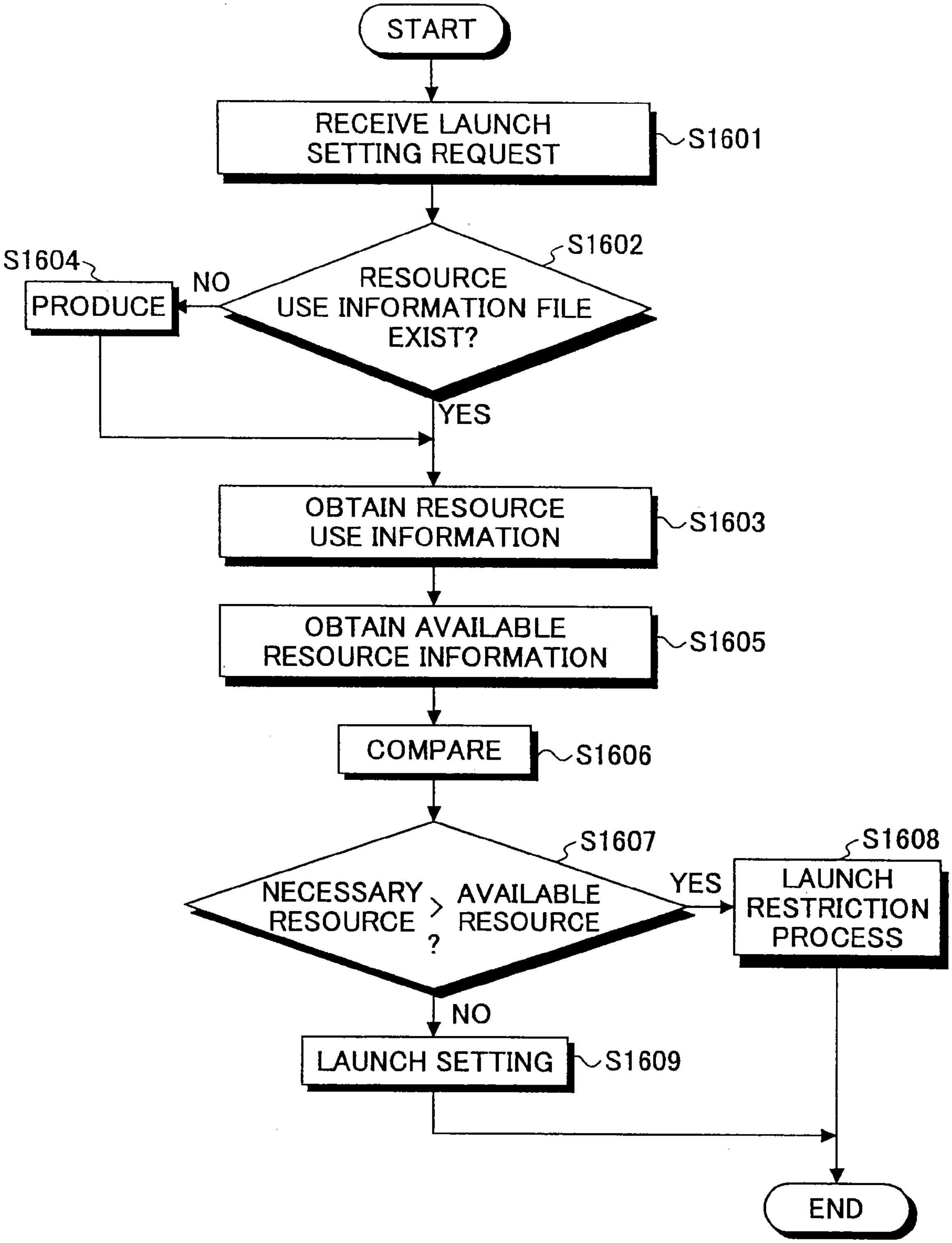
FIG. 54 shows a procedure performed by the VAS 140 when performing launch setting according to the third embodiment.

The application launch restriction process performed by the VAS 140 of the compound machine 100 will be described with reference to a flowchart of FIG. 54. FIG. 54 shows a procedure performed by the VAS 140 when performing launch setting.

When the VAS 140 receives a launch setting request for an application in step S1601, the VAS 140 checks whether there is resource use information for the application by referring to the HD 200 in step S1602.

When the resource use information file exists, the VAS 140 obtains the resource use information from the resource use information file 1201 in step S1603. If the resource use information file does not exist in step S1602, the VAS 140 produces the resource use information file in step S1604. For example, the control thread 143 requests the resource use information obtaining thread 1141 to produce the resource use information file, so that the resource use information obtaining thread 1141 produces the resource use information file.

The procedure for producing the resource use information file will be described later with reference to FIG. 56.

Next, the VAS 140 obtains the available resource amount in step S1605. For calculating the available resource amount, resource amounts of applications for which launch setting has already been performed can be obtained from the proc structure by using a system call or a service function call. The system call is provided by the general OS, and the service function is provided by the control service layer 150. In addition, if the resource amounts are included in the resource use information file 1201, the resource amounts can be also obtained from the resource use information file 1201.

Next, the VAS 140 compares the necessary resource amount to be used by the application for which launch setting is requested with the available resource amount in step S1606. The application launch restriction thread 1142 determines whether the necessary resource amount is larger than the available resource amount in step S1607. If the necessary resource amount is larger than the available resource amount, a screen shown in FIG. 44 is displayed in step S608. If the necessary resource amount is not larger than the available resource amount, launch setting is normally performed in step S1609.

If the application has a mode in which the application runs by using a hard disk area instead of a memory area, a screen for asking the user whether to use the mode can be displayed. When the user selects the mode, the application is executed by using the mode. The VAS 140 can know that the application has the mode by referring to the application information.

Figure 55:
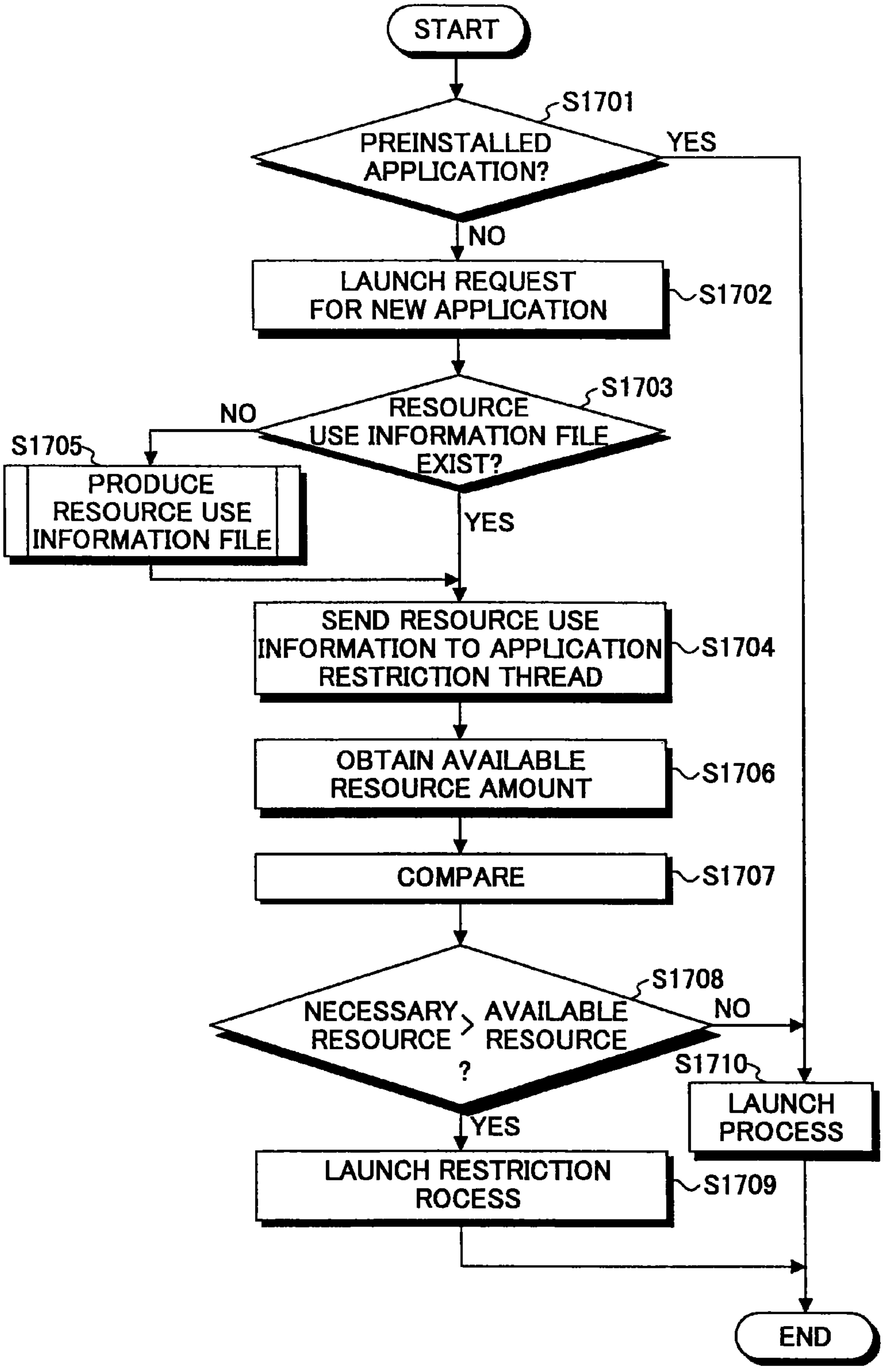
FIG. 55 is a flowchart for performing launch restriction process when an application is launched according to the third embodiment.

FIG. 55 is a flowchart for performing launch restriction process when an application is launched.

When the dispatcher 144 receives an application launch request message from the control service layer, the dispatcher 144 send the message with a process ID to the control thread 1143. The control thread 143 determines whether the application that is requested to launch is an application other than the preinstalled applications such as the copy application, that is, whether the application that is requested to launch is a new application in step S1701. If the application is the new application in step S1702, the control thread 143 checks whether there is resource use information for the application by referring to the HD 200 in step S1703.

When the resource use information file exists for the application, the control thread 143 obtains the resource use information from the resource use information file 1201, and sends the resource use information to the application launch restriction thread 1142 in step S1704. If the resource use information file does not exist in step S1703, the control thread 143 requests the resource use information obtaining thread 1141 to produce the resource use information file, so that the resource use information obtaining thread 1141 produces the resource use information file 1201 for the new application in step S1705. After the file is produced, the step S1704 is performed.

Next, the VAS 140 obtains the available resource amount in step S1706.

Next, the VAS 140 compares the necessary resource amount to be used by the new application for which launch is requested with the available resource amount in step S1707. The application launch restriction thread 1142 determines whether the necessary resource amount is larger than the available resource amount in step S1708. If the necessary resource amount is larger than the available resource amount, a screen of warning is displayed in step S1709. If the application has the mode in which the application runs by using a hard disk area instead of a memory area, a screen for asking the user whether to use the mode can be displayed. When the user selects the mode, the application may be executed by using the mode.

If the necessary resource amount is not larger than the available resource amount, the new application is normally launched in step S1710.

Figure 56:
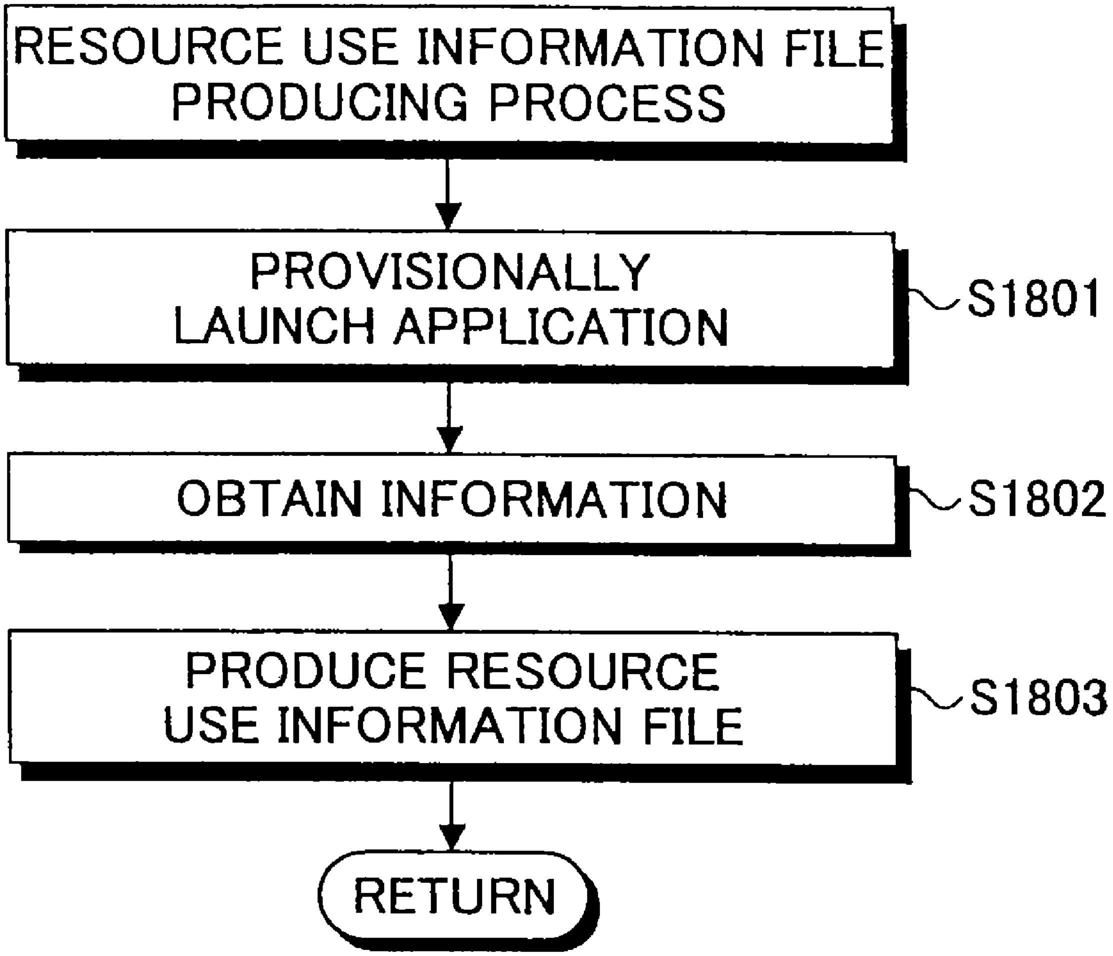
FIG. 56 shows a flowchart for explaining the operation of the VAS 140 when the resource use information file is produced.

FIG. 56 shows a flowchart for explaining the operation of the VAS 140 when the resource use information file is produced.

First, the VAS 140 provisionally launches applications from which the VAS 140 wants to obtain resource information in step S1801. Then, the VAS 140 obtains resource information from the application by using interprocess communication in step S1802. Then, the VAS 140 produces the resource use information file 1201 by using the obtained resource information in step S1803. FIG. 39 is an example of the resource use information file in which text memory area size, heap area size and stack area size are recorded for each application ID.

If the application has been launched and the actual record of resource usage of the application is stored in the proc structure 211, the VAS 140 can obtain the usage record instead of obtaining information from the application. By updating the resource use information file by using the actual records, updated resource information can always be obtained, that is, learning capability is provided. If the actual usage record changes each time when obtaining the record, the mean value or the maximum value of the records can be used as recourse information to be recorded in the resource use information file 1201.

In the case in which the resource use information file 1201 is produced by using the proc structure 211 in the RAM 210, when the resource use information obtaining thread 1141 receives the process ID, the product ID and the resource use information obtaining request message from the control thread 143, the resource use information obtaining thread 1141 refers to the proc structure 211, and searches for a position of a block of the process ID of the application ID. Then, the resource use information obtaining thread 1141 obtains the resource use information from the block of the process ID, and records the obtained information in the resource use information file 1201 with the application ID.

According to the compound machine of this embodiment, it can be prevented that the compound machine operates unstably due to lack of resources. In addition, the new applications developed by the user or the third vendor can be executed safely.

In this embodiment, the VAS 140 performs the resource use information obtaining process and the application launch restriction process for all applications 130. However, the VAS 140 can be also configured so as to cover a part of applications. For example, the VAS 140 may perform the resource use information obtaining process and the application launch restriction process only for the new applications 117 and 118.

In addition, considering that the resource use amount of the new application may change, the VAS 140 may perform launch restriction on the new application even when the necessary resource amount is smaller than the available resource to some extent.

(Fourth Embodiment)

The compound machine 100 of the third embodiment includes one VAS for all applications. According to the compound machine of the fourth embodiment, a plurality of VASes are launched for each application in which each VAS performs the resource use information obtaining process and the application launch restriction process for a corresponding application.

Figure 57:
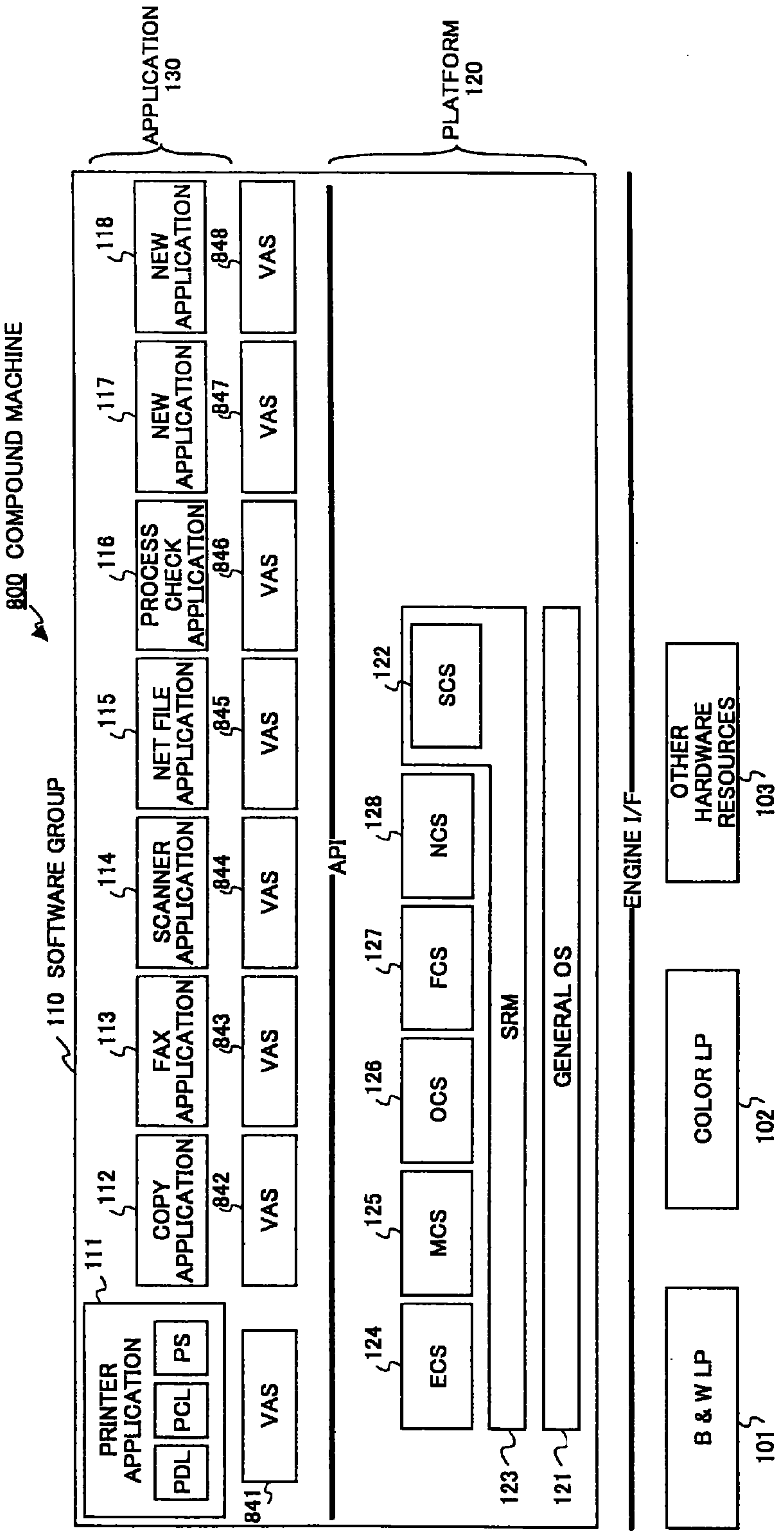
FIG. 57 is a block diagram of the compound machine of the fourth embodiment.

FIG. 57 is a block diagram of the compound machine of the fourth embodiment. As shown in FIG. 57, the compound machine 800 is different from the compound machine 100 of the third embodiment in that a plurality of virtual application services 841-848 operate for each application.

The VASes 841-848 performs the resource use information obtaining process and the application launch restriction process for a corresponding application for the printer application 111, copy application 112, fax application 113, the scanner application 114, the net file application 115 and the process check application 116 and the new applications 117 and 118.

Figure 58:
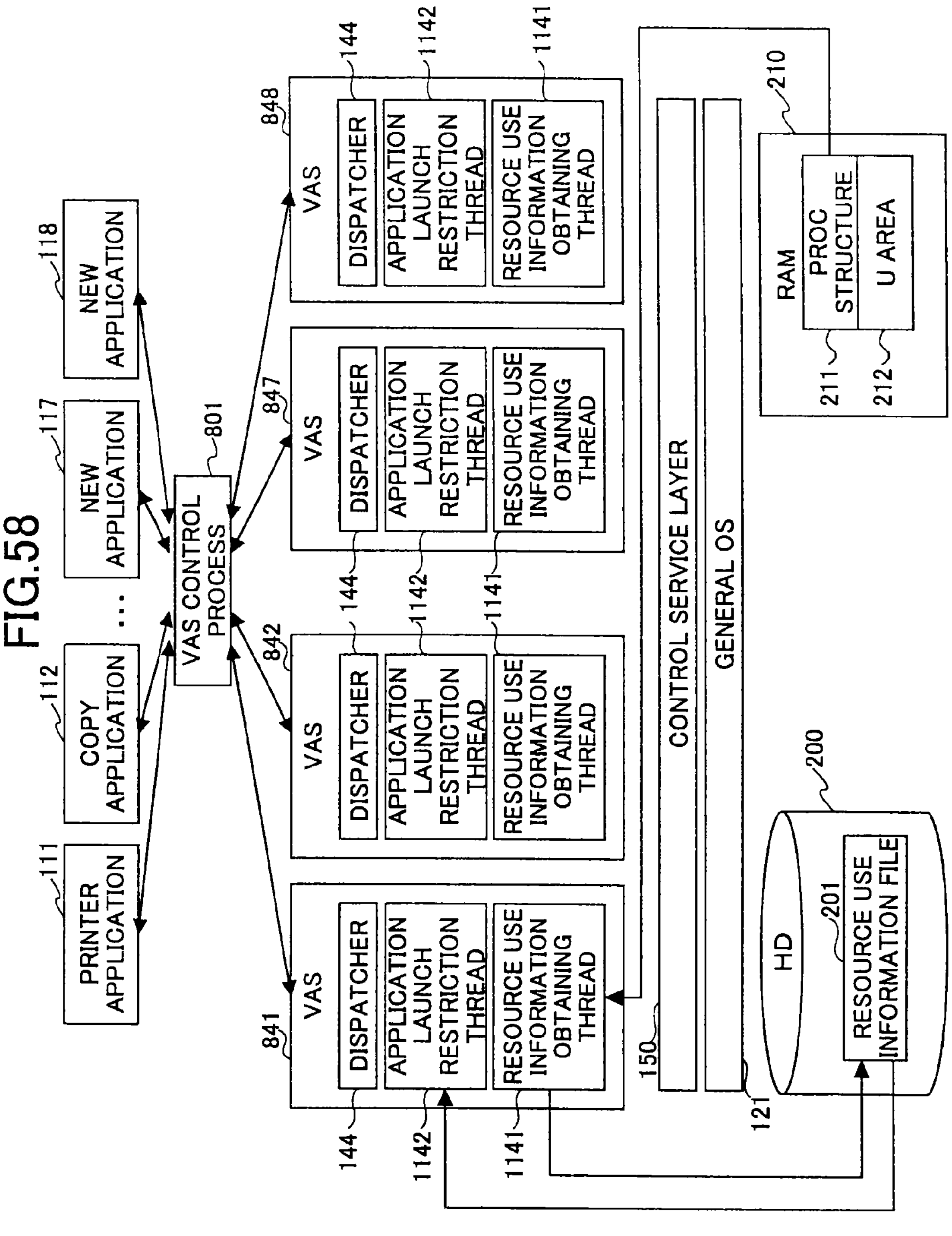
FIG. 58 is a figure showing a configuration of the VAS 841-848 of the compound machine 800 of the fourth embodiment.

FIG. 58 is a figure showing a configuration of the VAS 841-848 of the compound machine 800 of the fourth embodiment, and relationship among the VAS 841-848, each application, control service layer 150 and general OS 121.

According to the compound machine 800 of the fourth embodiment, different from the compound machine 100 of the third embodiment, as shown in FIG. 58, a VAS control process (daemon) 801 operates between the VASes and each application. The VAS control process 801 generates the VASes 841-848 for each corresponding application. The operation of the VAS control process 801 is similar to that of the control thread 143.

Each process of the VASes 841-848 includes the dispatcher 145 and the threads 1141 and 1142. The function of each thread of the compound machine 800 is the same as that of corresponding thread of the third embodiment. According to the fourth embodiment, the processing for each application can be performed in parallel, so that the launch restriction process can be performed efficiently.

According to the third and fourth embodiments, the text memory area, the heap memory area, and the stack memory area are examples, and other resources can be used for application launch restriction.

(Fifth Embodiment)

In the following, the fifth embodiment of the present invention will be described. The functional configuration of the compound machine 100 of the fifth embodiment is the same as that of the first embodiment. That is, the functional configuration of the compound machine 100 of the third embodiment is shown in FIG. 1.

In this embodiment, the VAS 140 obtains application compatibility information and produces an application compatibility information in an hard disk (after-mentioned HD 200), in which the application compatibility information indicates incompatible applications for each application. As to mutually incompatible applications, exclusive control is required.

The following example pairs of applications require exclusive control. An example is a pair of applications of the same type such as a pair of authentication applications, and a pair of billing applications. In addition, each of a pair of printer applications and a pair of display applications require exclusive control, since the applications of each of the pairs may scramble the same device (printer or display part). Further, a pair of the same applications of different versions requires exclusive control.

In addition, exclusive control is necessary for the following cases.

As a first case, exclusive control is required for an application that requires large memory area. The exclusive control is also required for an application that uses very large CPU power.

In addition, exclusive control is necessary for applications that generate RAW files of different formats in order to prevent problems due to format mismatch.

In addition, as to an authentication or billing application, there are applications suitable for a specific authentication or billing application. For example, in a case in which a scanner application A and a copy application A are suitable for an authentication application A, and a scanner application B and a copy application B are suitable for an authentication application B, exclusive control is necessary between the authentication application A and the scanner/copy applications B if authentication methods of the authentication applications A and B are different. In addition, exclusive control is necessary between the authentication application B and the scanner/copy applications A.

In addition, exclusive control is necessary between a log obtaining application and a copy application wherein the log obtaining application produces thumbnails of copied images, and the copy application instantaneously deletes image data in the hard disk.

Further, for example, if there is an arrangement that applications of vendor A and vendor B can not be executed simultaneously in an compound machine, exclusive control is necessary.

When the VAS 140 obtains the application compatibility information, the VAS 140 also obtains attribute information of each application. The attribute information is used, for example, for displaying a screen.

In addition, the VAS 140 obtains the application compatibility information by provisionally launching the application by using interprocess communication. The VAS 140 may obtain the application compatibility information from an external server.

When launch setting is performed or when an application is launched, the VAS 140 detects incompatible applications according to the application compatibility information so as to perform launch control. For example, if incompatible applications are detected, one application is launched and another application is not launched.

Figure 59:
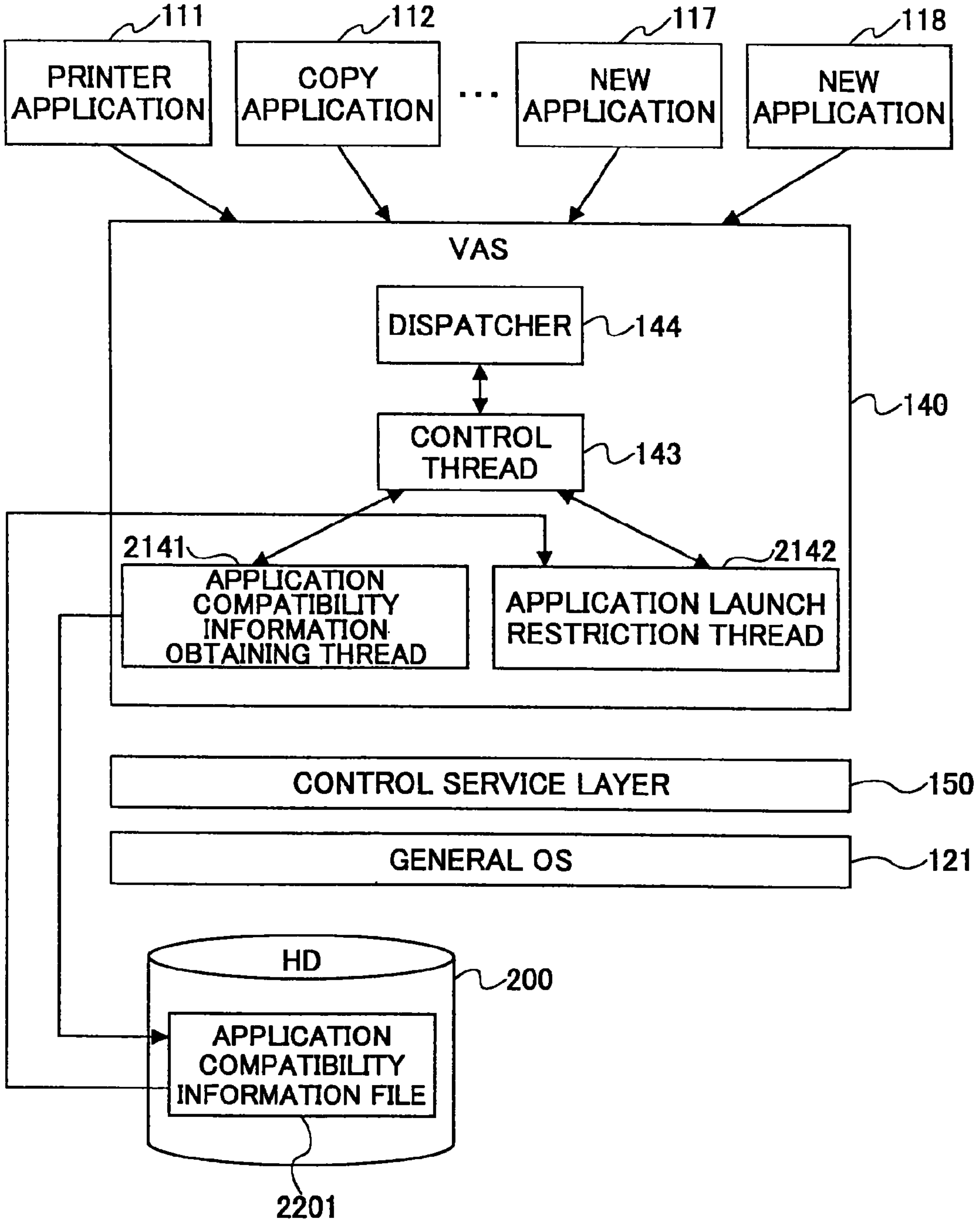
FIG. 59 shows the configuration of the VAS 140 of the fifth embodiment, and shows relationship between the VAS 140, each application, the control service layer 150 and the general OS 121.

FIG. 59 shows the configuration of the VAS 140 of the fifth embodiment, and shows relationship between the VAS 140, each application, the control service layer 150 and the general OS 121.

The process of the VAS 140 includes a control thread 143, an application compatibility information obtaining thread 2141 and an application launch restriction thread 2142. Processing by the VAS 140 can be also performed without using the threads.

The dispatcher 144 monitors message receiving from an application or a control service. The dispatcher 144 sends a process request to the control thread 143, the application compatibility information obtaining thread 2141 and the application launch restriction thread 2142 according to the received message. In this embodiment, when the dispatcher 144 receives application launch request message for applications, the dispatcher 144 sends the message to the control thread 143. The control thread 143 sends a process request to the thread 2141 and the thread 2142.

Application launch restriction process of this embodiment is execution control process in which only one application in a pair of applications is launched and another application is not launched.

When the application compatibility information file 2201 does not include application compatibility information for all installed applications, the control thread 143 can request the thread 2141 to obtain necessary application compatibility information. The obtained application compatibility information is stored in the application compatibility information file 2201.

When the application compatibility information file 2201 includes necessary application compatibility information, the control thread 143 requests the application launch restriction thread 2142 to perform application launch restriction according to the application compatibility information.

The application compatibility information obtaining thread 2141 obtains application compatibility information by using interprocess communication, and stores the information in the application compatibility information file 2201. In addition, if the application compatibility information can be obtained via a network, the application compatibility information obtaining thread 2141 receives necessary information from the network by using the NCS 128. The application compatibility information is recorded as a record for each application.

The application compatibility information file 2201 can be stored in the compound machine 100 by the user. In addition, when the application compatibility information file 2201 can be downloaded from a server, the VAS 140 can obtain the application compatibility file 2201 from the server.

Although the above-mentioned operation of each threads is an operation when an application is launched, similar operation can be performed when launch setting is performed. application launch restriction process for the launch setting is, for example, displaying mutually incompatible applications and performing launch setting only for one selected application.

FIG. 60 shows an example of the application compatibility information file 2201 stored in the HDD 200. As shown in the figure, the file includes, for each application ID (can be referred to as product ID), one or more application IDs that are incompatible with an application. In addition, the HD 200 stores a file shown in FIG. 61. The file shown in FIG. 61 includes, for each application ID, application attribute, operation target, application name (file name), version and the like. The information can be used for displaying a screen, and also can be used for determining which application should be launched among incompatible applications.

The application launch restriction thread 2142 refers to the application compatibility information file 2201, determines whether there are incompatible applications. If there are incompatible applications, the application launch restriction thread 2142 performs execution control in which only one application is launched among the incompatible applications. In this process, it is necessary to determine which application to launch when execution control is performed. For example, by assigning higher priority to an application having a newer version for applications having the same name, an application can be automatically determined to launch among incompatible applications by using information shown in FIG. 61. Alternatively, by displaying the incompatible applications on the operation panel, the user can select an application.

Figure 62:
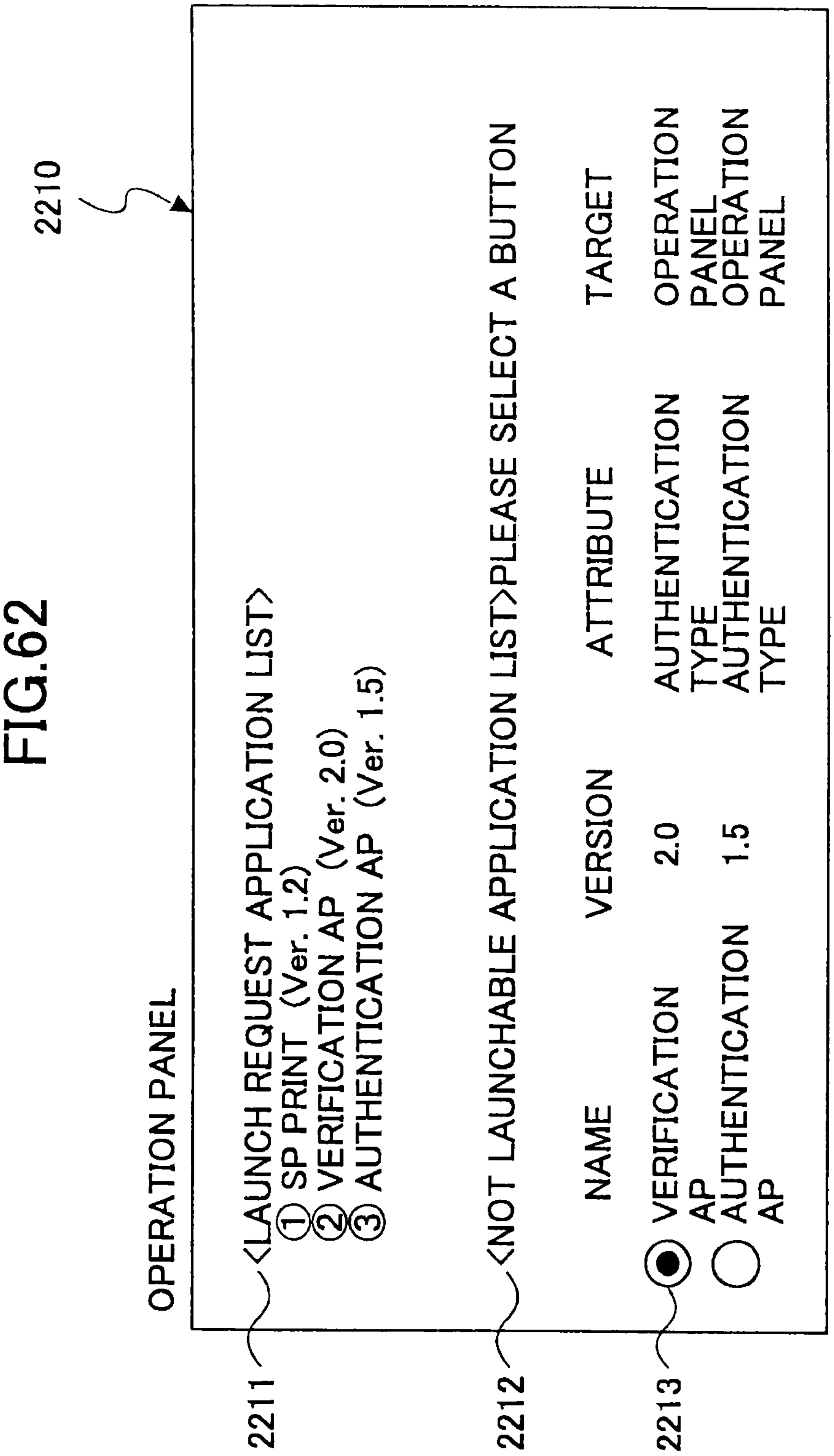
FIG. 62 shows an example of a user selection screen for applications that can not be launched at the same time according to the fifth embodiment.

FIG. 62 shows an example of a user selection screen for applications that can not be launched at the same time. As shown in FIG. 62, the screen shows a launch requested application list 2211, an incompatible application list 2212 and a radio button 2212 used when user selects an application. The user can selects an application by using an operation key.

When the application launch restriction thread 2142 determines that application launch restriction is necessary, the application launch restriction thread 2142 sends a launch restriction request message to an application that can not be launched. On the other hand, when the application launch restriction thread 2142 determines that launch restriction is not necessary, the thread 2142 sends a launch request message to each application, so that the applications are normally launched. In addition, when launch restriction is necessary, a launch request message is sent to an application to be launched according to the exclusive control.

Figure 63:
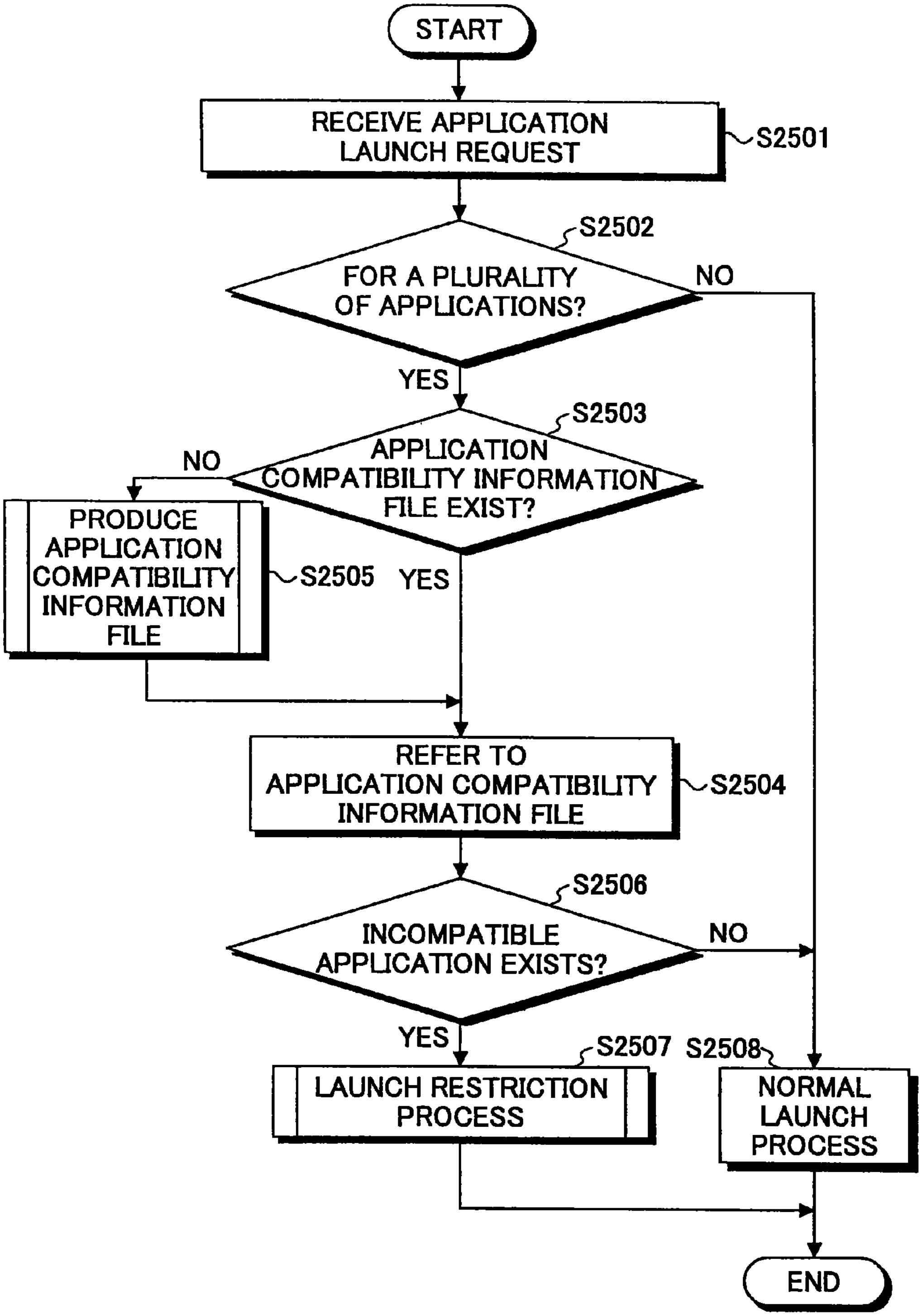
FIG. 63 shows a flowchart of the procedure of the application launch restriction process by the VAS 140 according to the fifth embodiment.

Next, the application launch restriction process by the VAS 140 will be described. FIG. 63 shows a flowchart of the procedure.

When the dispatcher 144 receives an application launch request message from the control service layer 150 in step S2501, the dispatcher 144 sends the message to the control thread 143 with a process ID of the application. The control thread 143 determines whether launch is requested for a plurality of applications in step S2502. When a plurality of applications are requested to launch, it is determined whether the application compatibility information file 2201 exists in step S2503. When the file exists, the control thread 143 refers to the file in step S2504. When the file does not exist, the application compatibility information file is generated in step S2505, and the generated file is referred to. The process of the step S2505 will be described later with reference to FIG. 64.

The application launch restriction thread 2142 determines whether there are a pair of incompatible applications among the launch requested applications in step S2506. If such pair exists, launch restriction process is performed in step S2507. The launch restriction process will be described in detail later with reference to FIG. 65.

If there is no pair of incompatible applications, normal launch process is performed in step S2508.

Figure 64:
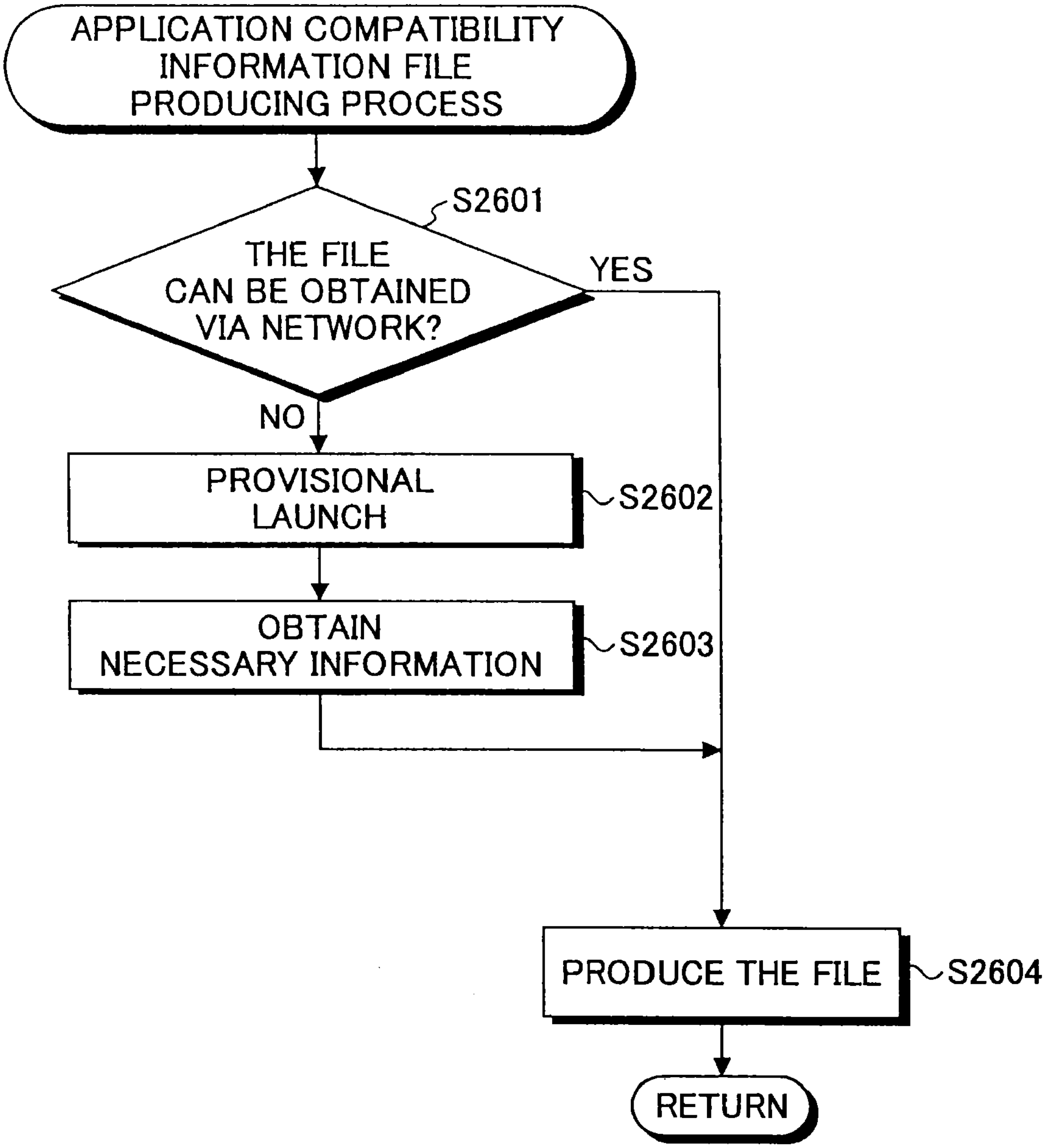
FIG. 64 shows a flowchart of the procedure of the process of step S2505 according to the fifth embodiment.

FIG. 64 is a flowchart for explaining the process of generating the application compatibility information file 2201.

First, the control thread 143 determines whether application compatibility information can be obtained via a network in step S2601. When the information can not be obtained via the network, the VAS 140 provisionally launches the application that is requested to launch in step S2602. Then, the VAS 140 obtains the application compatibility information in step S2603 from the application. Then, the file 201 for the application is produced by using the application compatibility information in step S2604. The application compatibility information for an application corresponds to a record of the file shown in FIG. 60.

As mentioned before, instead of producing the application compatibility information file 2201, the user may prepare the application compatibility information file 2201 and store it in the compound machine 100.

Figure 65:
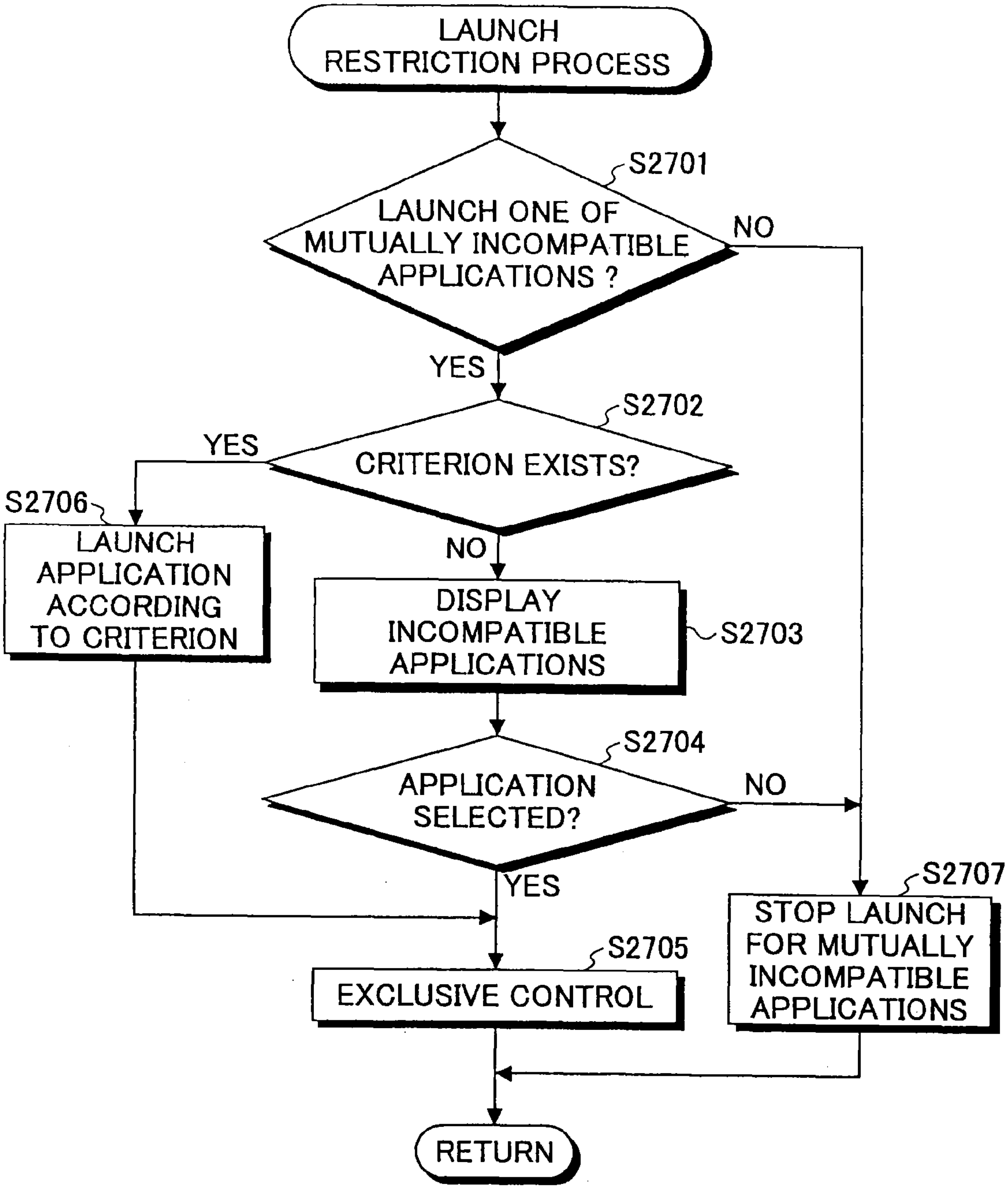
FIG. 65 shows a flowchart of the procedure of launch restriction process according to the fifth embodiment.

FIG. 65 is a flowchart of the launch restriction process. This flowchart corresponds to the step S2507 in FIG. 63.

When launch restriction is necessary for a pair of incompatible applications, it is determined whether one of the pair of the applications is launched or launch is not performed for both of the applications of the pair in step S2701. For example, this determination can be performed according to initial setting. When one application is launched (Yes in step S2701), the VAS 140 determines whether there is a selection criterion in step S2702. The selection criterion may be predetermined priorities, and may be recorded in the application compatibility file. In addition, the version can be used as an example of a criterion, in which an application of a newer version is to be selected when the names of the applications of the pair are the same.

When there is no selection criterion, the VAS 140 displays a selection screen including an incompatible application list on the operation panel in step S2703. FIG. 62 shows an example of this screen. The launch requested application list 2211 shows three application names with the versions. The incompatible application list 2212 shows two incompatible applications (verification AP and authentication AP) with other information (version, attribute, target), and radio buttons are provided for selection in the left side. The user refers to information displayed on the operation panel so that the user can easily select an application to be launched by checking a radio button in step S2704.

As mentioned above, when the user selects an application in step S2704, execution control is performed in which launch of applications that are not selected is restricted in step S2705.

In the step S2702, if there is a selection criterion for an application to launch, an application selected according to the criterion is launched, and launch of other applications is restricted in step S2706.

If launch of all incompatible applications is restricted in step S2701, or if the user does not select any application in step S2704, all of the incompatible applications are not launched in step S2707.

Although the above-mentioned example relates to actual launch of applications, exclusive control can be also performed when launch setting is performed. In the case of launch setting, launch setting is performed instead of an application is actually launched.

As mentioned above, according to the compound machine 100 of the this embodiment, since exclusive control is performed to prevent incompatible applications from being launched simultaneously, the compound machine 100 operates stably.

In addition, according to the compound machine of the this embodiment, when the application compatibility information is obtained via a network, the application compatibility information file can be easily updated to include newest information. Thus, a new application can be supported.

(Sixth Embodiment)

The compound machine 100 of the fifth embodiment includes one VAS for all applications. According to the compound machine of the sixth embodiment, a plurality of VASes 941-948 are launched for each application in which each VAS performs the application compatibility information obtaining process and the application launch restriction process for a corresponding application.

Figure 66:
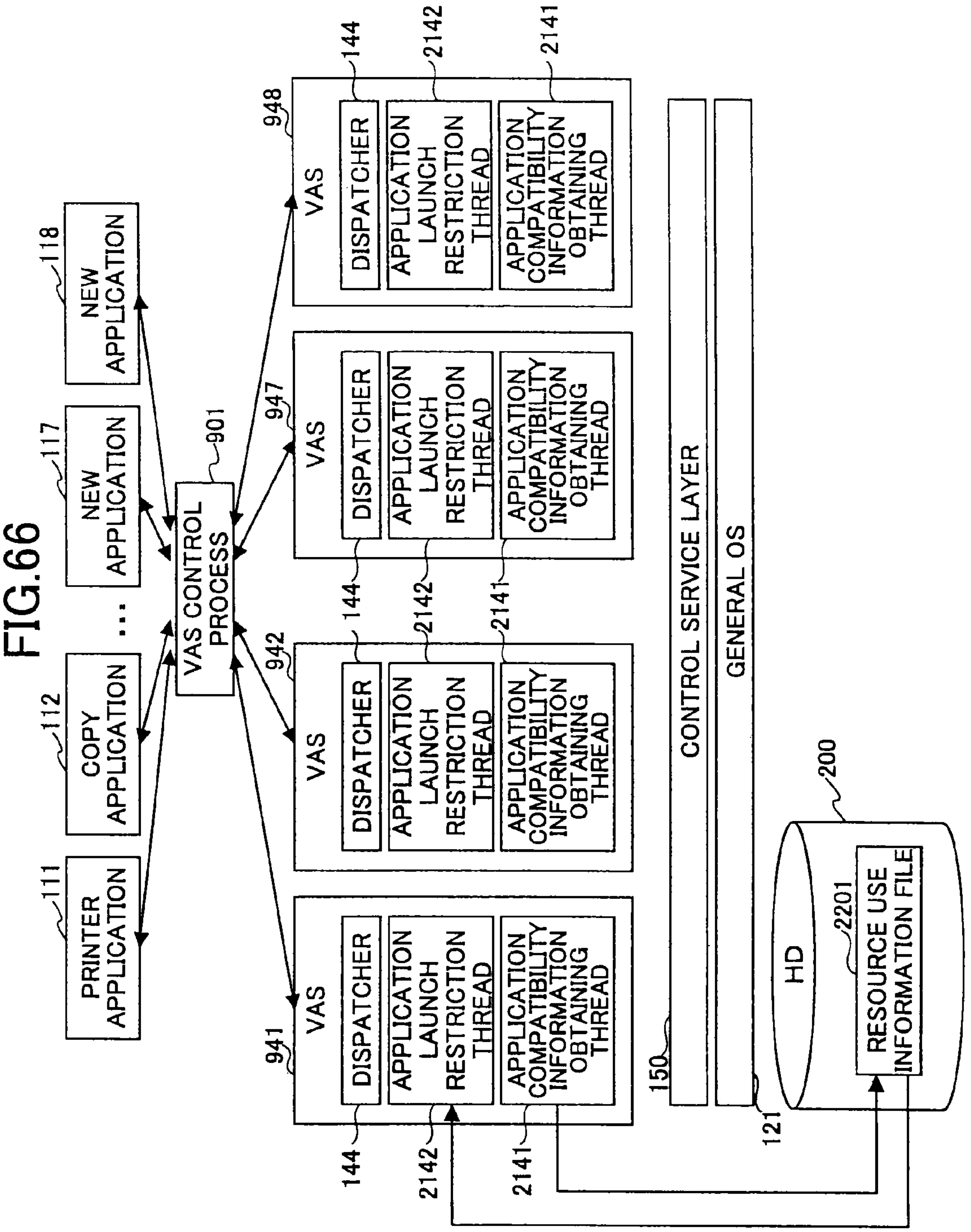
FIG. 66 is a figure showing a configuration of the VASes 941-948 of the compound machine 100 of the sixth embodiment, and relationship among the VASes 941-948, each application, control service layer 150 and general OS 121.

FIG. 66 is a figure showing a configuration of the VASes 941-948 of the compound machine 100 of the sixth embodiment, and relationship among the VASes 941-948, each application, control service layer 150 and general OS 121.

According to the compound machine 100 of the sixth embodiment, different from the compound machine 100 of the fifth embodiment, as shown in FIG. 66, a VAS control process (daemon) 901 operates between the VASes and each application. The VAS control process 901 generates the VASes 941-948 for each corresponding application. The operation of the VAS control process 901 is similar to that of the control thread 143.

Each process of the VASes 941-948 includes the dispatcher 145 and the threads 2141 and 2142. The function of each thread of the compound machine 100 of this embodiment is the same as that of corresponding thread of the fifth embodiment. According to the sixth embodiment, the processing for each application can be performed in parallel, so that the launch restriction process can be performed efficiently.

(Seventh Embodiment)

In this embodiment, the compound machine 100 can simultaneously launch applications of indispensable relationship or recommended relationship. Applications of indispensable relationship means that executing one application is indispensable for executing another application. Applications of recommended relationship means that executing one application is recommended for executing another application.

The configuration of the compound machine 100 this embodiment is similar to that of the compound machine 100 of the fifth embodiment. The functions of the VAS 140 are different between the fifth embodiment and this embodiment.

The VAS 140 of the seventh embodiment refers to indispensable application information file 2202, and identify an application that can be executed solely, and an application that requires another application to run. The indispensable application information file 2202 may be produced by the VAS 140, or may be stored in the compound machine 100 by the user. In addition, the compound machine 100 can obtain the indispensable application information file 2202 from a server via a network.

For example, in a case when a new capability can be provided by adding another application (plug-in software) to an application, indispensable application information in the indispensable application information file 2202 may be information on the plug-in software. However, the indispensable application information is not limited to this. The indispensable application information can be any information on pair of applications that can be executed simultaneously for providing a capability.

The VAS 140 can obtain indispensable application information via a network, and also can obtain the information from an application by provisionally launching the application.

The VAS 140 obtains indispensable application information corresponding to an application that is requested to launch. If there is an indispensable application for the application, the VAS 140 controls the compound machine 100 to launch both of the application and the indispensable application. For example, if launch of the indispensable application is not requested yet, launch of the application corresponding to the indispensable application is not performed. Alternatively, for example, when the indispensable application is installed in the compound machine 100, the indispensable application is automatically launched with the application. Further, for example, notification to urge the user to launch the indispensable application may be output. The notification is, for example, information display on the operation panel, voice guidance, warning sound and the like.

Figure 67:
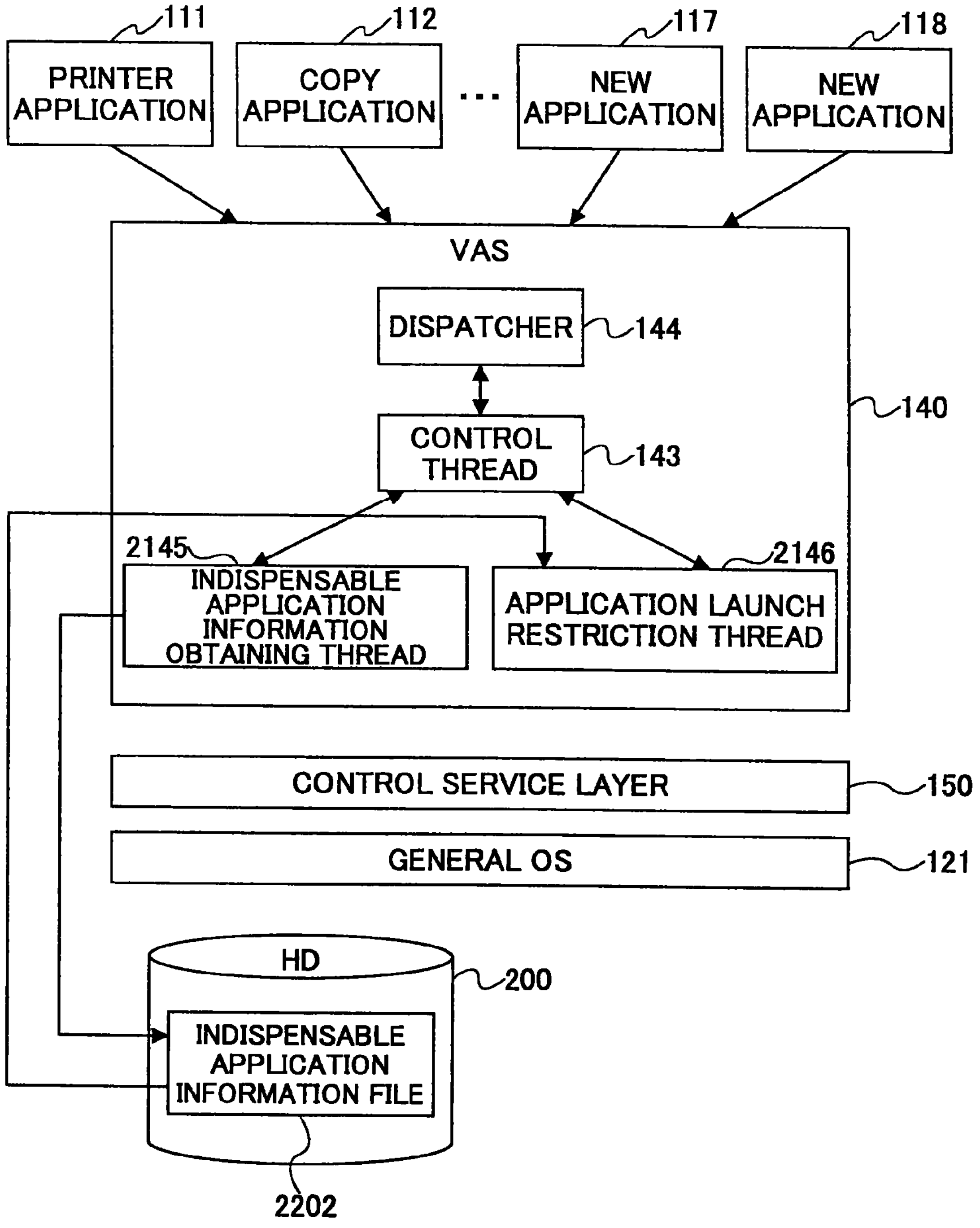
FIG. 67 shows the configuration of the VAS 140 of seventh embodiment, and shows relationship between the VAS 140, each application, the control service layer 150 and the general OS 121.

FIG. 67 shows the configuration of the VAS 140 of this embodiment, and shows relationship between the VAS 140, each application, the control service layer 150 and the general OS 121.

The process of the VAS 140 includes a dispatcher 144, a control thread 143, an indispensable application information obtaining thread 2145, and an application launch control thread 2146. The function of the dispatcher 144 is the same as that of the fifth embodiment.

When the indispensable application information file 2202 does not include indispensable application information for an application, the control thread 143 can request the thread 2145 to obtain necessary indispensable application information. The obtained information is stored in the indispensable application information file 2202.

When the indispensable application information file 2202 includes necessary indispensable application information, the control thread 143 requests the application launch control thread 2146 to perform application launch restriction according to the indispensable application information read from the file 2202.

Like the fifth embodiment, the indispensable application information obtaining thread 2145 obtains indispensable application information by provisionally launching the application or via network, and generates the indispensable application information file 2202. Alternatively, the indispensable application information file 2202 can be prepared and stored in the compound machine 100 by the user. In addition, the compound machine 100 may obtain the indispensable application information file 2202 from a server.

FIG. 68 is an example of the indispensable application information file 2202 stored in the HD 200. As shown in FIG. 68, the indispensable application information file 2202 records, for each application ID, presence or absence of indispensable application, application type, application ID of indispensable application.

When the application launch control thread 2146 receives an application launch request from the control service layer 150, the application launch control thread 2146 refers to the indispensable application information file 2202, and determines whether information on an application that is requested to launch is recorded in the file 2202. If the information is recorded, it is determined whether there is an indispensable application corresponding to the application. If the indispensable application does not exist, the application is normally launched. If the indispensable application exists, the VAS 140 performs launch control for the application and the indispensable application. In FIG. 68, the browser (ID:103) and the plug-in (ID:105) are mutually indispensable.

When information on the application that is requested to launch is not recorded in the indispensable application information file 2202, the application launch control thread 142 requests the indispensable application information obtaining thread 2145 to obtain information on the application.

FIG. 69 is an example of a screen for prompting the user to launch an indispensable application (plug-in) for a launch-requested-application (browser).

Figure 70:
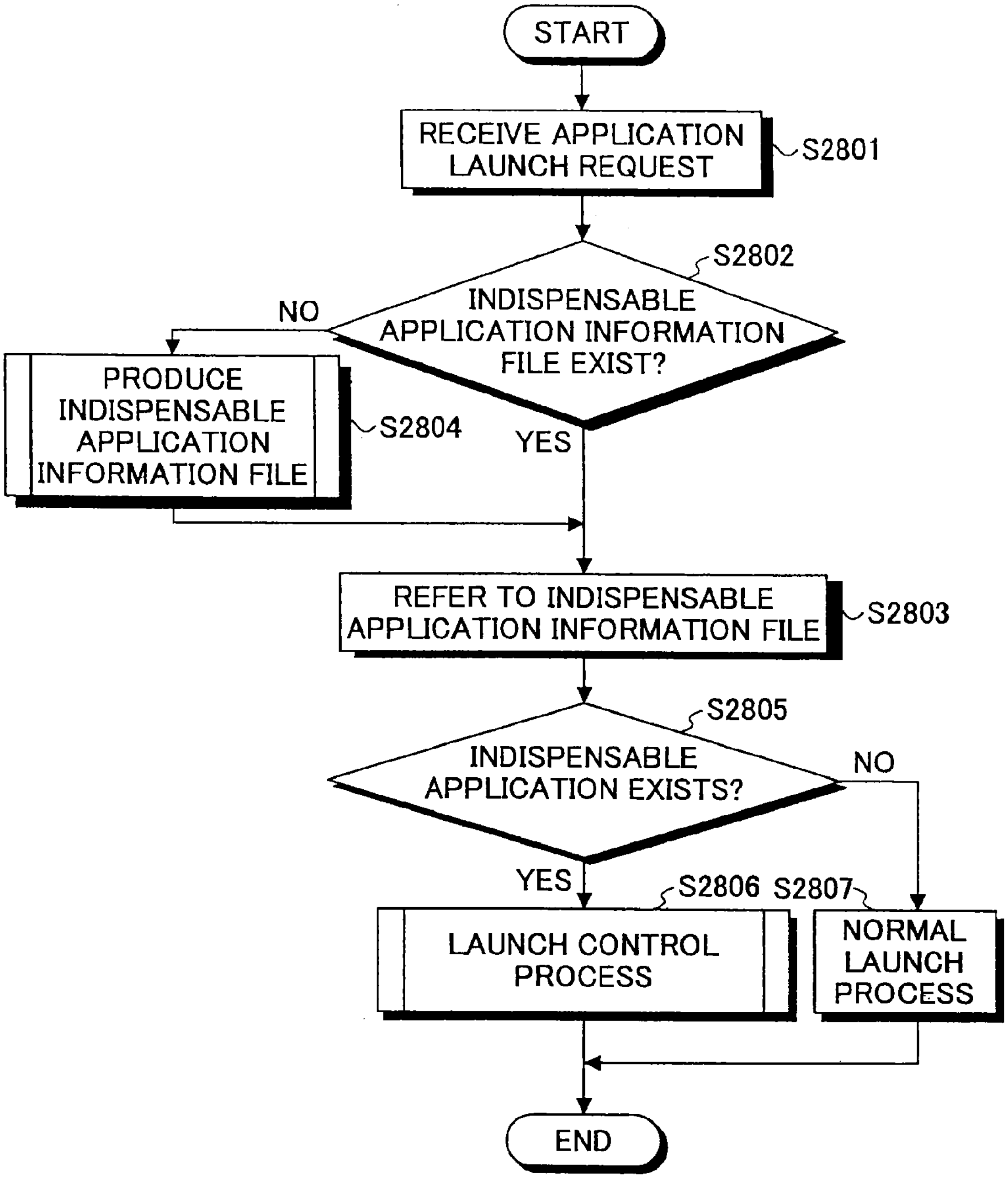
FIG. 70 shows a flowchart of the procedure of the application launch control process by the VAS 140 according to the seventh embodiment.

Next, the application launch control process performed by the VAS 140 will be described. FIG. 70 shows a flowchart of the procedure.

When the dispatcher 144 receives an application launch request message from the control service layer 150 in step S2801, the dispatcher 144 sends the message to the control thread 143 with a process ID of the application. The control thread 143 checks whether information on the launch requested application is recorded in the indispensable application information file 2202 in step S2802. When the information is recorded, the file 2202 is referred to in step S2803.

If the information is not recorded in the file 2202 in step S2802, the file 2202 is prepared in step S2804, and the file 2202 is referred to in step S2803. The process of the step S2804 will be described later with reference to FIG. 71.

The application launch control thread 2146 determines whether there is an indispensable application corresponding to the launch requested application by referring to the indispensable application information file 2202 in step S2805. If the indispensable application exists, launch control process is performed in step S2806. If the indispensable application does not exist, the launch requested application is normally launched in step S2807. The launch control process for the application and the indispensable application will be described in detail later with reference to FIG. 72.

Figure 71:
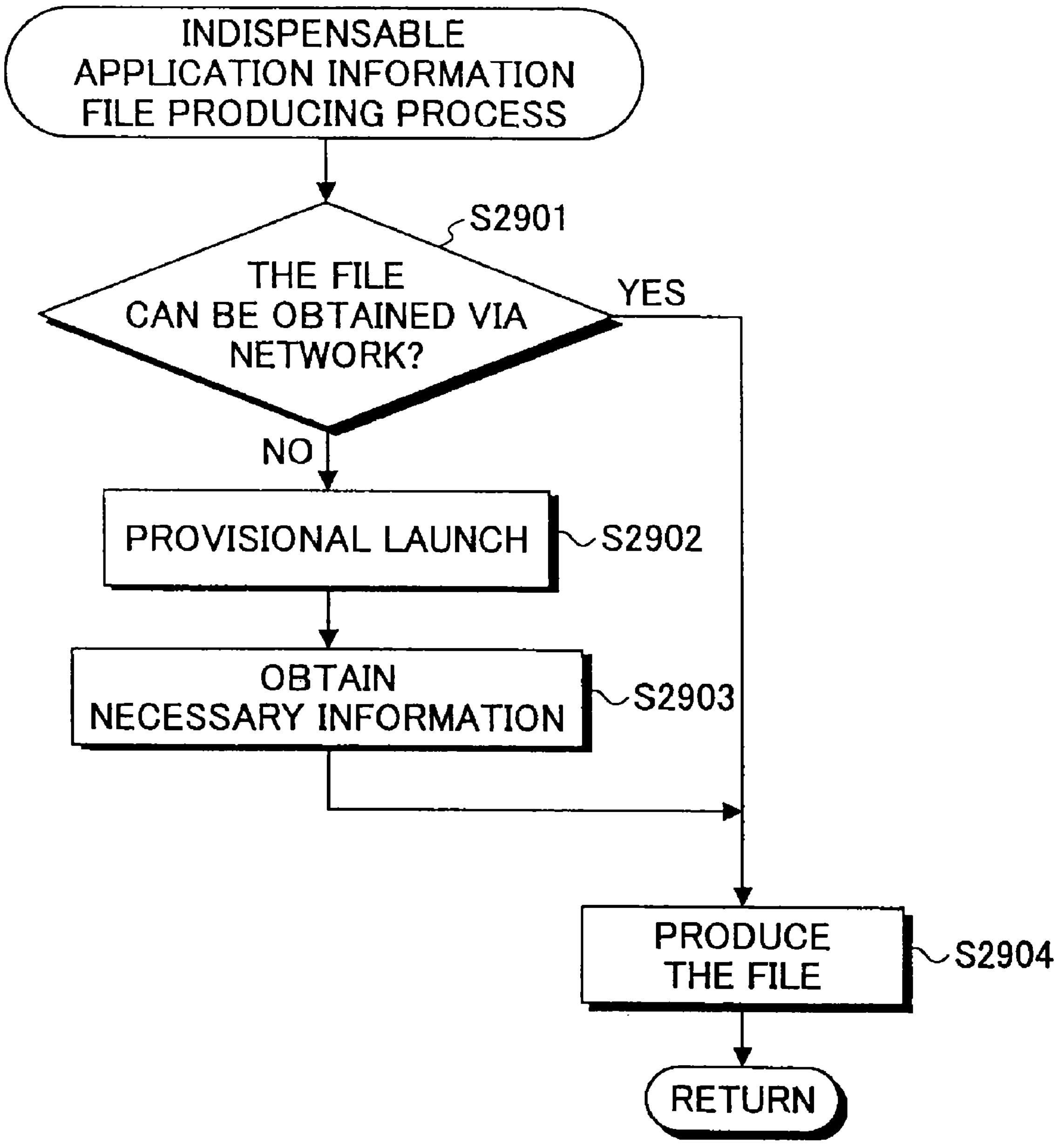
FIG. 71 shows a flowchart of the procedure of the process of step S2804 according to the seventh embodiment.

FIG. 71 is a flowchart for explaining the process of generating the indispensable application information file 2202.

First, the control thread 143 determines whether the indispensable application information can be obtained via a network in step S2901. When the information can not be obtained via the network, the VAS 140 provisionally launches the launch requested application in step S2902. Then, the VAS 140 obtains necessary information in step S2903. Then, the file 2202 for the application is produced by using the obtained information in step S2904.

Figure 72:
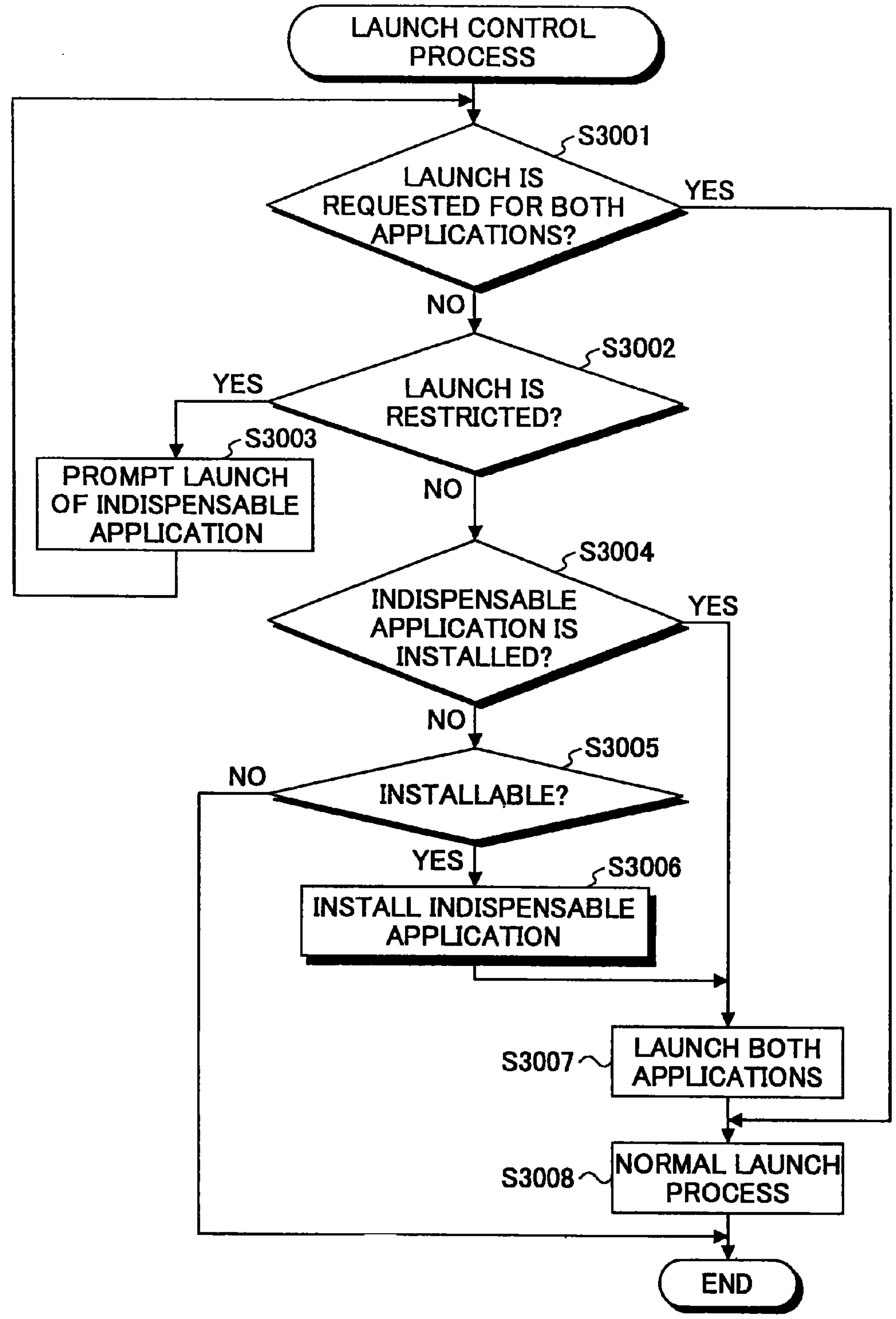
FIG. 72 shows a flowchart of the procedure of launch control process according to the seventh embodiment.

FIG. 72 is a flowchart showing launch control process for a pair of the launch-requested-application and the corresponding indispensable application.

As shown in FIG. 72, first, the application launch control thread 2146 determines whether launch of the indispensable application is requested in step S3001. If Yes, both of the application and the indispensable application are normally launched in step S3008.

In step S3002, it is determined whether the launch of the launch-requested-application should be restricted until the indispensable application is requested to launch. By storing information, in the file 2202, indicating whether the application should be launched or not until the indispensable application is launched, the VAS 140 can perform the determination of step S3002 by referring to the file 2202.

If the launch of the launch requested application should be restricted, a notification is output for prompting launch of the indispensable application in step S3003. As an example of the notification, an error message is displayed on the operation panel as shown in FIG. 69. After outputting the notification, the process returns to the step S3001, and the VAS 140 determines whether launch is requested for both of the application and the indispensable application. After the step S3003, if the user launches both of the application and the indispensable application, the applications are normally launched in step S3008 (Yes in step S3001).

In step S3002, if it is determined that launch of the launch requested application is not restricted, it is determined whether the corresponding indispensable application has been installed in the compound machine 100 in step S3004. If the indispensable application has been installed, the indispensable application is automatically launched normally in steps S3007 and S3008.

If the indispensable application has not been installed in step S3004, it is determined whether the indispensable application is installable in step S3005. If installable, the indispensable application is installed and launched (steps S3006-S3008).

If the indispensable application is not installable in step S3005, the process ends since both of the applications can not be launched. At this time, the VAS 140 can display a screen indicating that the indispensable application is not installable.

Although the above-mentioned process is performed when the application is actually launched, the similar process can be performed when launch setting is performed for the application. In this case, instead of actually launching the applications, launch setting is performed for the applications.

As mentioned above, according to the compound machine 100 of the third embodiment, since the applications that are mutually indispensable can be executed at the same time, the compound machine 100 can operate stably.

In the same way as the sixth embodiment, a plurality of VASes 941-948 can be launched for each application in which each VAS performs the indispensable application information obtaining process and the application launch control process for a corresponding application.

Figure 73:
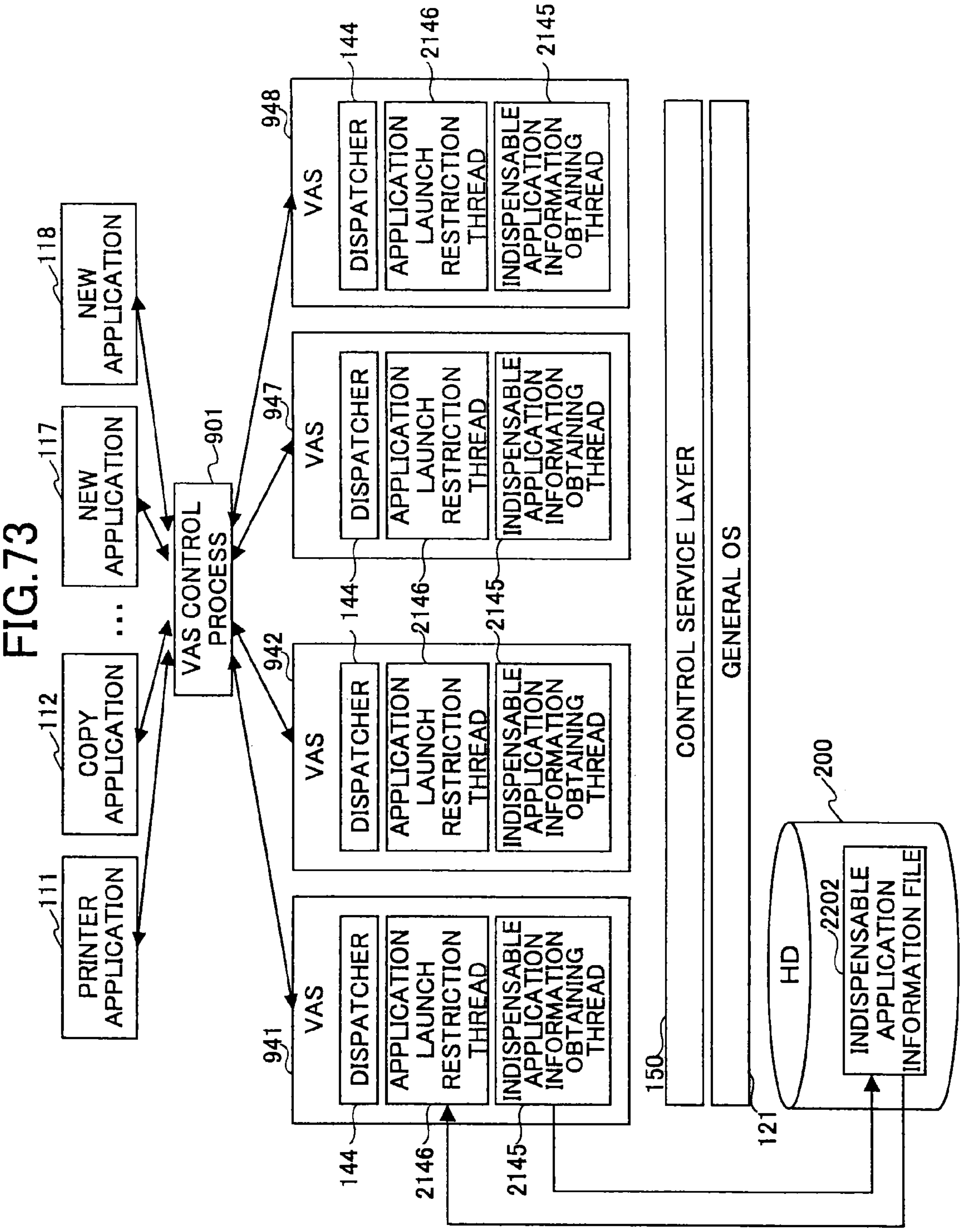
FIG. 73 is a figure showing a configuration of the VASes 941-948 of the compound machine 100, and relationship among the VASes 941-948, each application, control service layer 150 and general OS 121.

FIG. 73 is a figure showing a configuration of the VASes 941-948 of the compound machine 100, and relationship among the VASes 941-948, each application, control service layer 150 and general OS 121.

(Eighth Embodiment)

In the following, the eighth embodiment will be described. The whole configuration of the compound machine 100 of the Eighth embodiment is the same as that of the first embodiment.

In the eighth embodiment, the compound machine 100 stores a database that can represent incompatible or unrecommended relationship and indispensable or recommended relationship for applications. The VAS 140 performs launch control by referring to the database. In this specification, incompatible or unrecommended relationship may be called simply "incompatible relationship", and indispensable or recommended relationship may be called simply "indispensable relationship".

An example of the database file is shown in FIG. 74. As shown in FIG. 74, the file shows indispensable or incompatible applications for each application. In the field of "incompatible or indispensable application", the number inside the parentheses indicates a level of incompatible relationship or indispensable relationship. The larger the absolute value in the minus side is, the higher the level of incompatible relationship is. The larger the absolute value in the plus side is, the higher the level of indispensable relationship is. For example, "−1" means that although both of the applications can be executed simultaneously, it is not recommended to execute both of the applications since there is a possibility that the speed of the system may be lowered. In addition, for example, "−3" means that the applications can not be executed simultaneously. In addition, for example, "+1" means that, although each of the applications can be executed solely, more functions can be provided if both of the applications are executed simultaneously. In addition, for example, "+3" means that the applications should be executed simultaneously. As to the incompatible relationship, in addition to the above-mentioned level, priority of launch can be included. The VAS 140 performs launch control by referring to the file shown in FIG. 74.

In addition to the information shown in FIG. 74, the file may include, for each pair of applications, a reason for being indispensable or incompatible relationship, and other information. By including such information, the reasons can be displayed on the operation panel.

The above-mentioned file can be stored in the compound machine 100 by the user. In addition, the compound machine 100 may obtain the file from a server. In the case when the file is stored in the server, if a problem as to indispensability or incompatibility of applications is found, the problem information can be sent to the server by using a proper format, so that the file can be automatically updated. In addition, when an application is developed and the application is indispensable for another application or is incompatible with another application, such information can be sent to the server, so that the file can be automatically updated.

The file is not necessarily stored in the compound machine 100, and the VAS 140 can refer to the file that exists outside of the compound machine 100.

Figure 75:
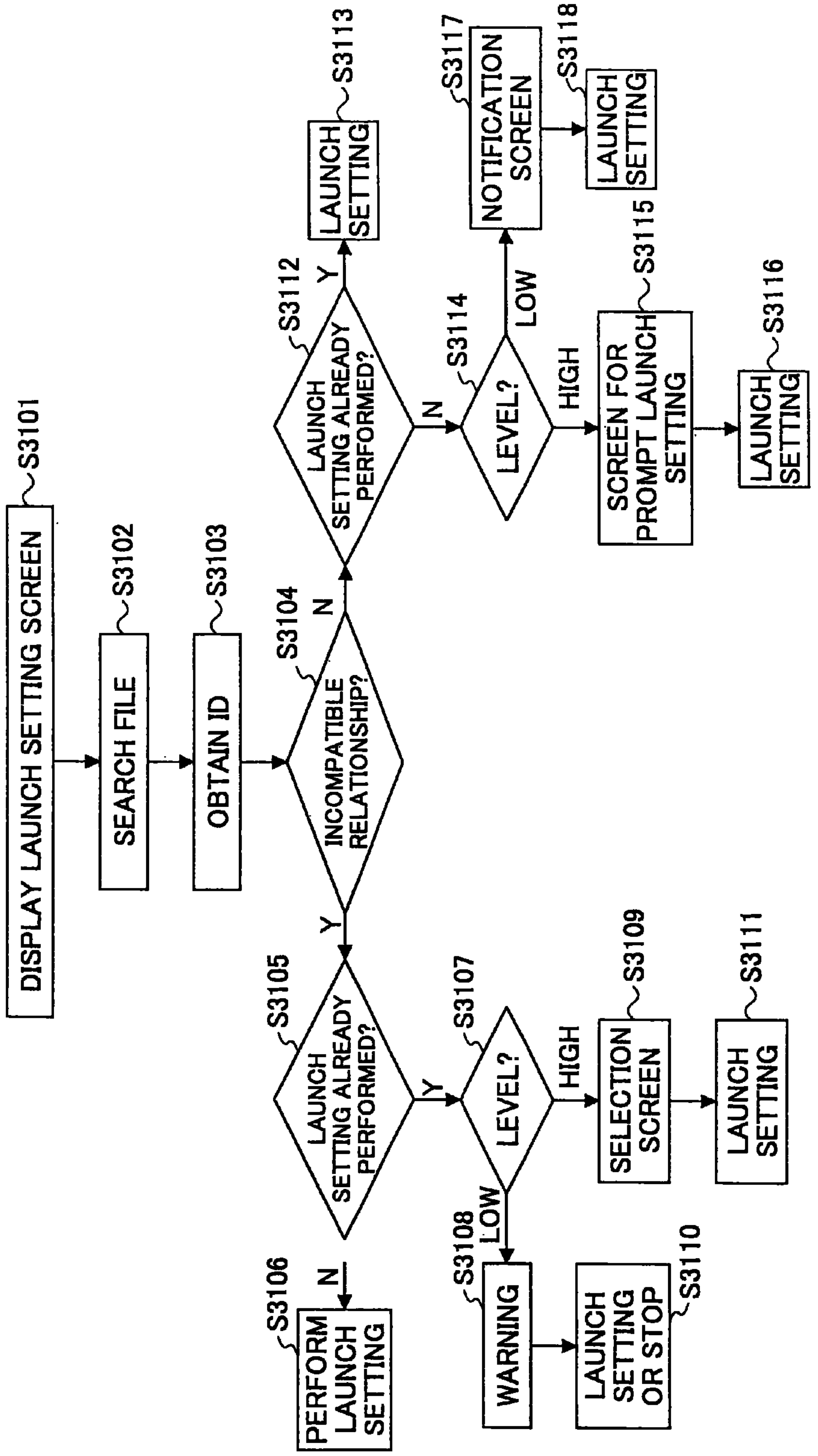
FIG. 75 shows the procedure of launch control by the compound machine 100 according to the eighth embodiment.

Next, the procedure of launch control by the compound machine 100 by using the file shown in FIG. 74 will be described with reference to the flowchart shown in FIG. 75. The following procedure is for a case when launch setting is performed.

Figure 76:
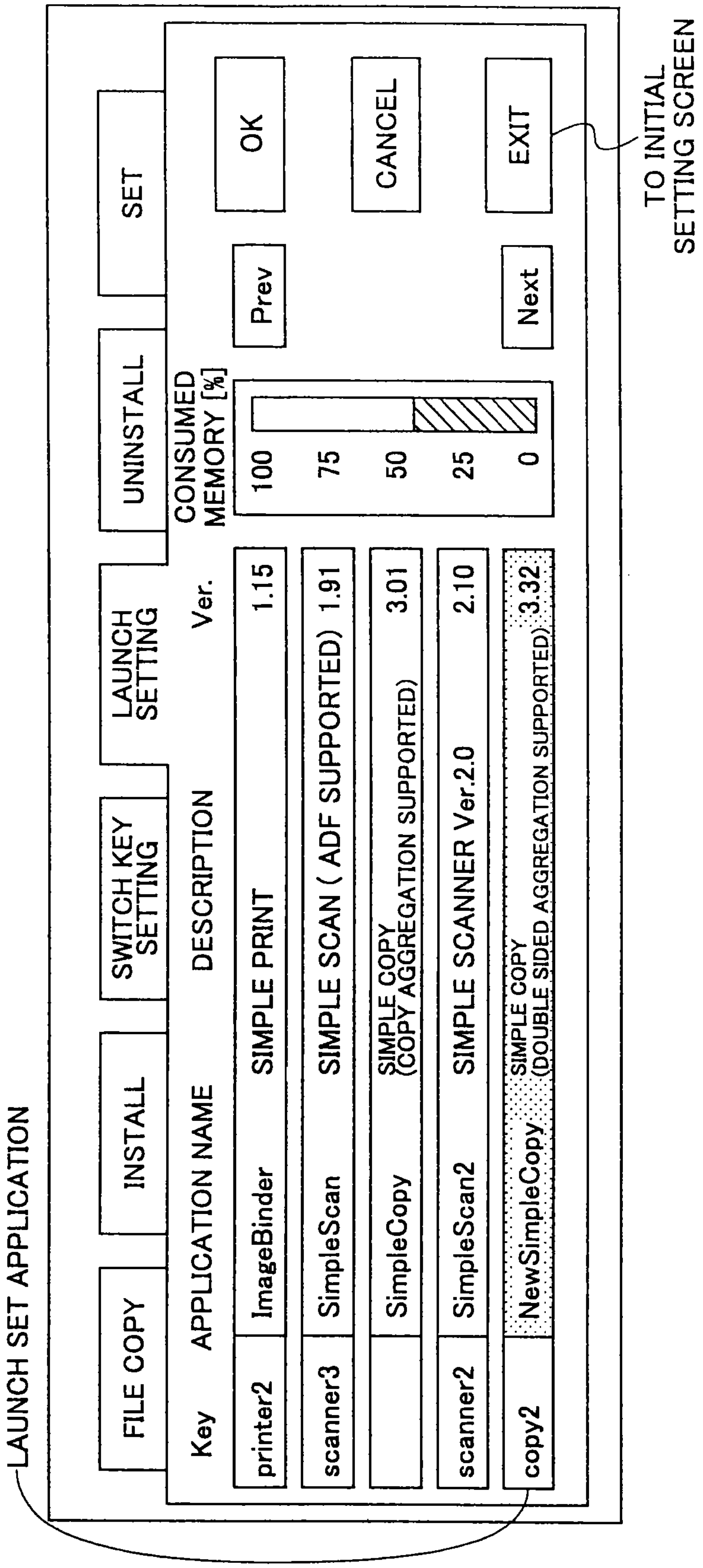
FIGS. 76-81 show screens displayed when launch setting is performed according to the eighth embodiment.

First, the VAS 140 displays a screen for launch setting on the operation panel in step S3101. An example of the launch setting screen is shown in FIG. 76. The screen shown in FIG. 76 shows that launch setting has been already performed for "simple copy".

Next, the user selects an application (to be referred to as "selected application" hereinafter) on which the user wants to perform launch setting. The VAS 140 obtains the product ID of the selected application, and searches the file shown in FIG. 74 on the basis of the product ID in step S3102.

Then, the VAS 140 obtains product IDs and related information (such as reason for being incompatible or indispensable relationship) corresponding to the key product ID in step S3103. For exempla, in the example of FIG. 74, if the product ID of the selected application is 101, the VAS 140 obtains 102 (−3) and 103(+1).

Then, the VAS 140 performs launch control according to the obtained information.

If the application corresponding to the product ID obtained from the file is an incompatible application against the selected application, that is, if the level is minus (Y in step S3104), the VAS 140 checks if launch setting has been performed for the incompatible application in step S3105. If launch setting has not been performed for the incompatible application, launch setting is performed for the selected application in step S3106.

If launch setting has been performed for the incompatible application (Y in step S3105), the level is checked in step S3107. Then, the VAS 140 displays a warning screen (S3108, if the level is low), or display a selection screen for selecting an application on which launch setting is performed between the incompatible application and the selected application (S3109). The warning screen shows information that inquires the user whether launch setting can be allowed for both of the applications. When the warning screen is displayed, launch setting is stopped for one of the selected application and the incompatible application or launch setting is performed for both of the applications in step S3110. When the selection screen is displayed, launch setting is performed on an application selected in the selection screen in step S3111. In this case, if the selected application is selected, launch setting for the incompatible application is released.

When an application corresponding to the obtained product ID is indispensable for the selected application (N in step S3104), the VAS 140 checks whether launch setting has been performed on the indispensable application in step S3112. If launch setting has been performed on the indispensable application, launch setting of the selected application is performed in step S3113. If launch setting has not been performed on the indispensable application, next process is performed (N in step S3112).

The level of indispensable relationship is checked in step S3114. If the level is high so that the both applications should be executed simultaneously, the VAS 140 displays a screen for prompting the user to perform launch setting on the indispensable application in step S3115. Then, launch setting is performed on the indispensable application according to determination of the user in step S3116. In this case, launch setting is performed for both of the selected application and the indispensable application.

Figure 77:
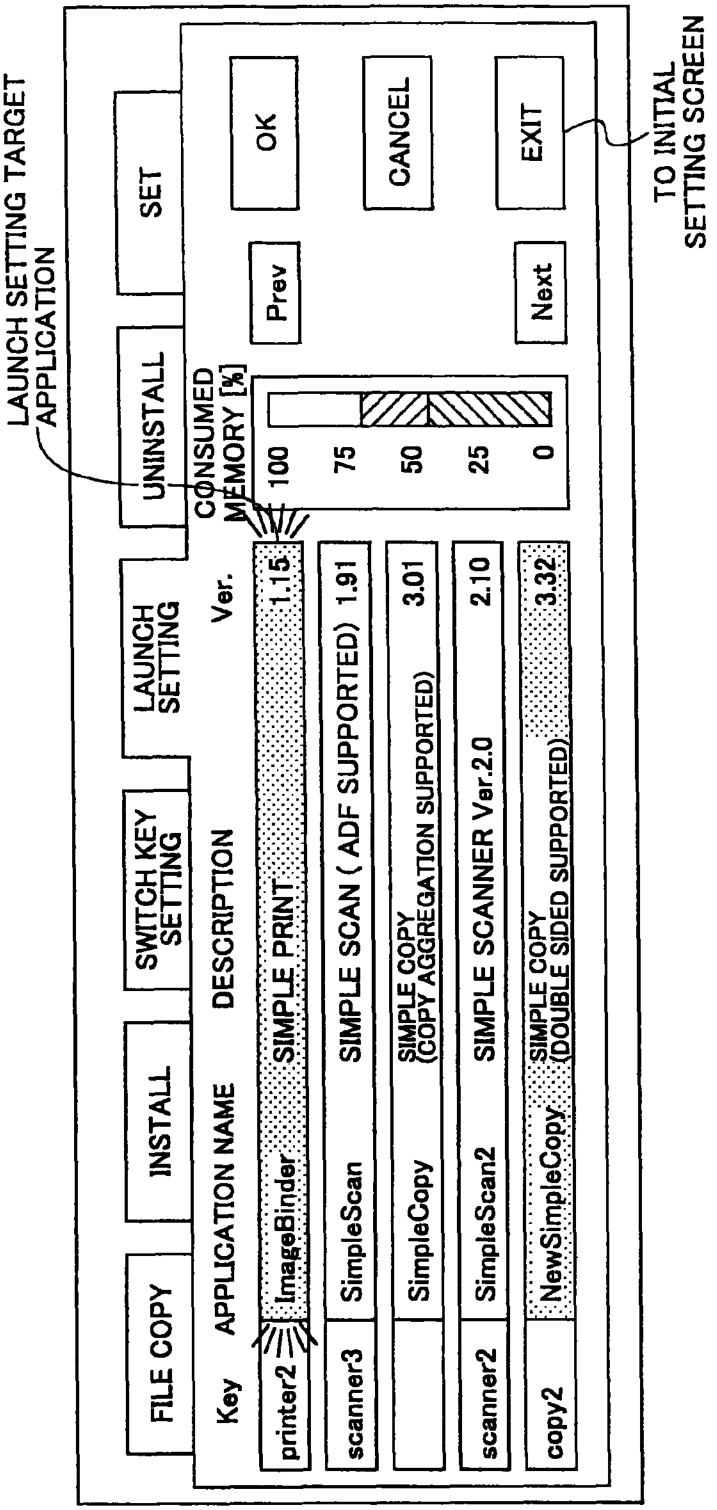
Figure 78:
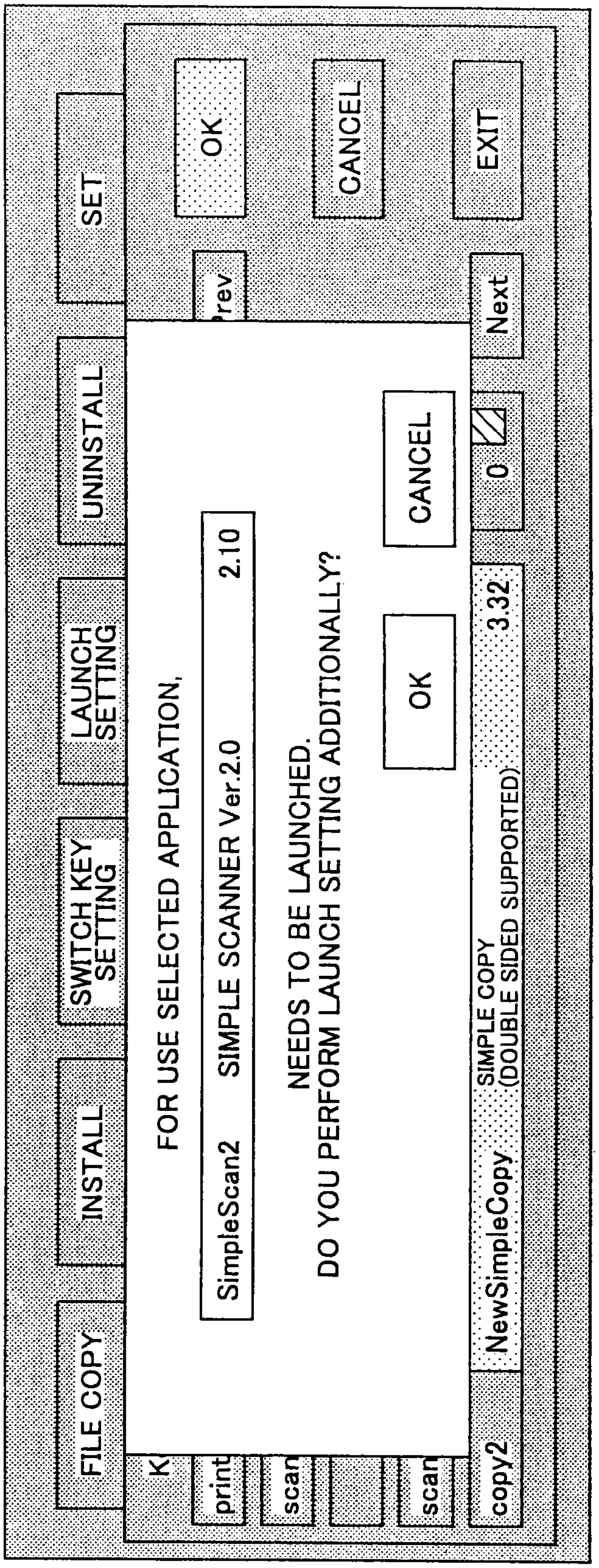

For example, in the screen shown in FIG. 76, assuming that "simple scanner" is the indispensable application for the "edit print tool", when "edit print tool" is selected for performing launch setting as shown in FIG. 77, a screen shown in FIG. 78 is shown since launch setting has not been performed on "simple scanner". When the user pushes the OK button, launch setting is performed on both of "edit print tool" and "simple scanner".

If the level of indispensable relationship is low in step S3114, that is, if the level indicates recommended relationship (for example, extension can be provided by another application), the VAS 140 displays a screen for notifying the user that the recommended application can add extension to the selected application in step S3117. Then, the VAS 140 performs launch setting on both of the selected application and the corresponding recommended application in step S3118.

Figure 79:
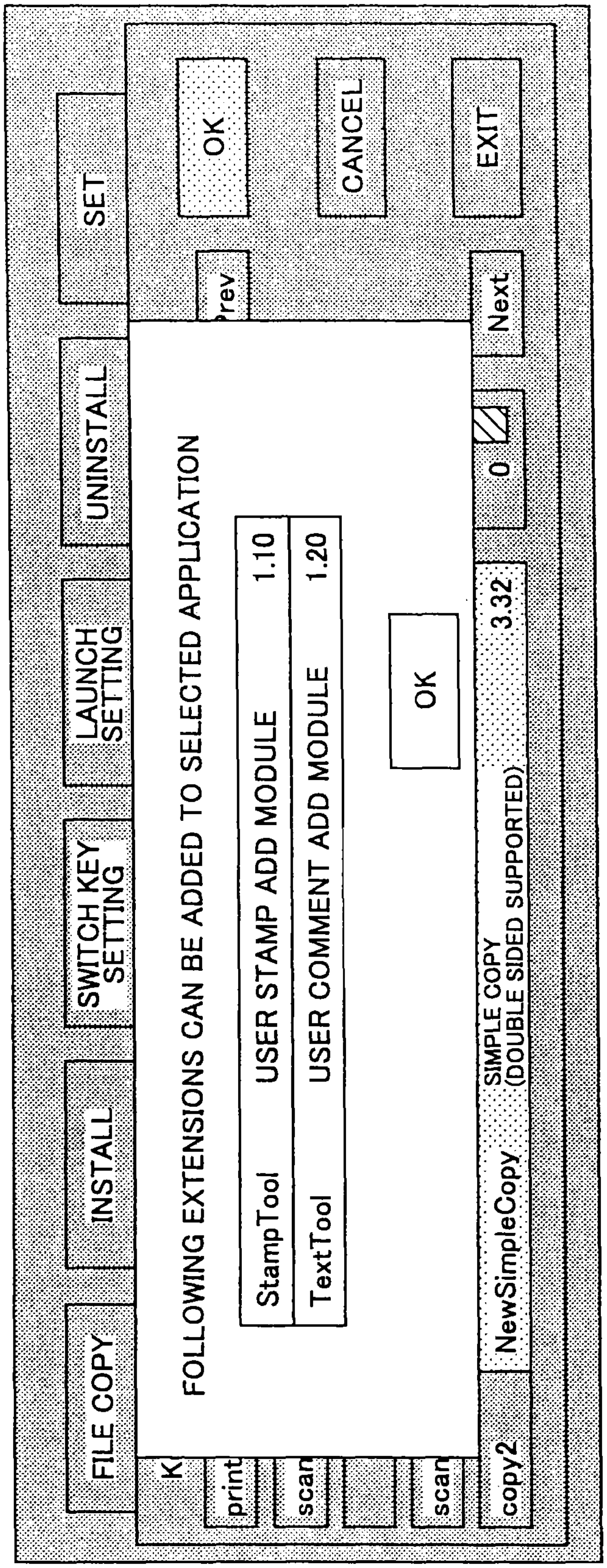

For example, in the example of FIG. 77, if "user stamp add module" and "user comment add module" can add extension to "edit print tool", the screen shown in FIG. 79 is displayed. If OK button is pushed, launch setting is performed for the three applications.

For performing launch setting for applications of indispensable relationship, launch setting can be performed for the applications without inquiring the user.

Figure 80:
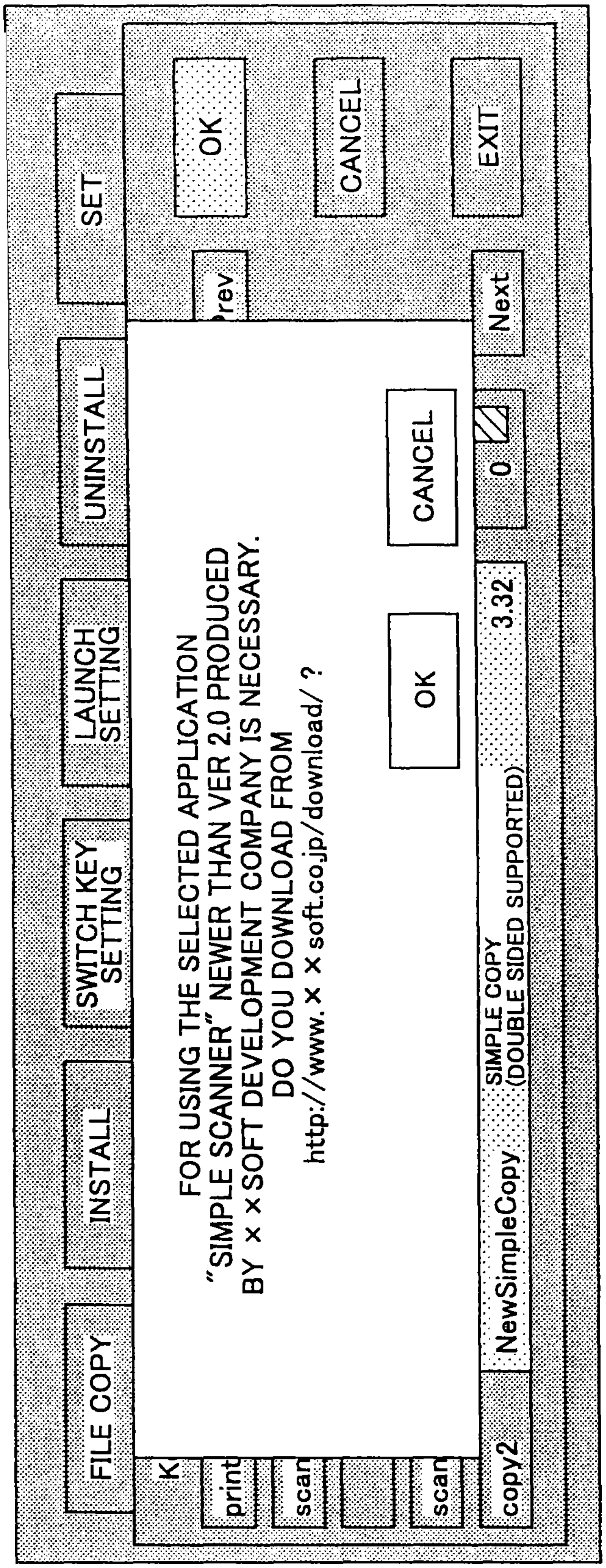
Figure 81:
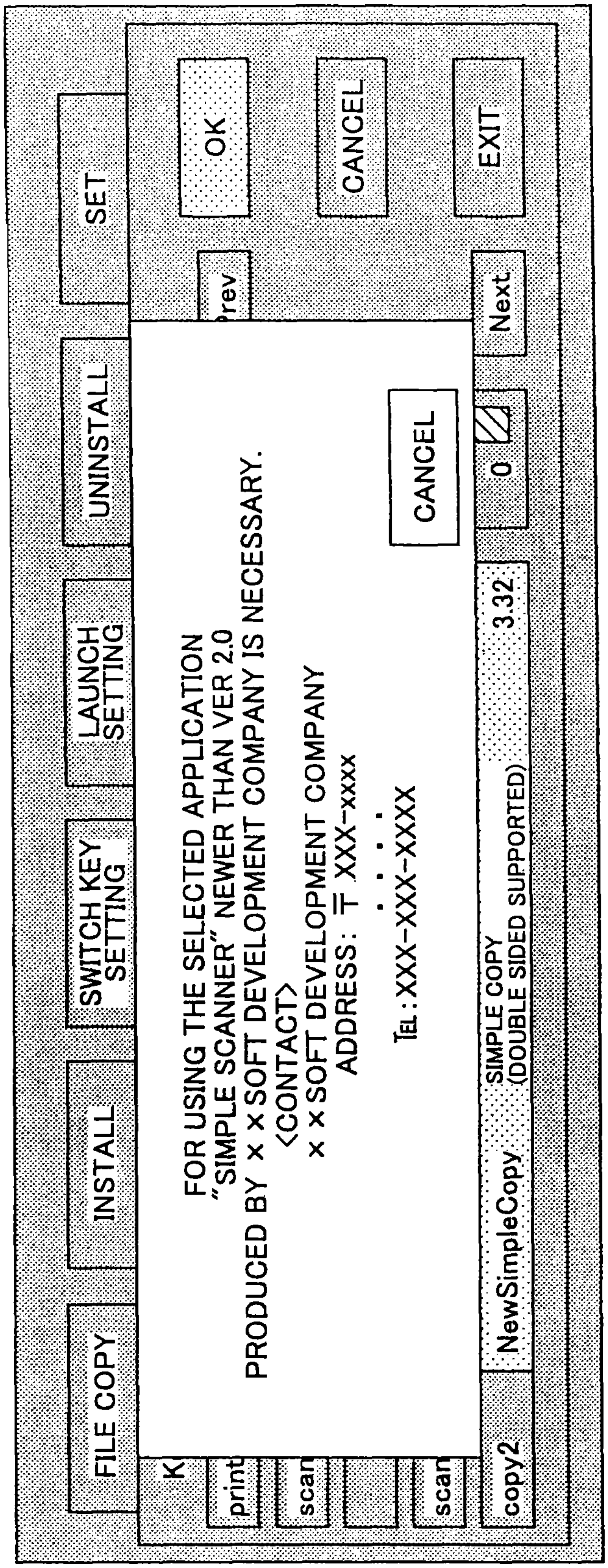

When the indispensable application that should be launched with the selected application is not installed in the compound machine 100, a screen of FIG. 80 is displayed before displaying the screen of FIG. 78, so that the indispensable application can be downloaded. Instead of displaying the screen for download, a screen showing reference of the application can be displayed as shown in FIG. 81.

In the above-mentioned example, in a case when an application that is selected for performing launch setting is incompatible with another application on which launch setting has been performed, the VAS 140 can refer to the priorities between the selected application and the another application, and can automatically perform launch setting for an application that has a higher priority. For example, if the priority of the selected application is higher than the another application, the VAS 140 can release the launch setting for the another application and perform launch setting for the selected application.

Although the above-mentioned example is for a case when launch setting is performed, the above-mentioned method can be applied to a case when an application is actually launched.

As mentioned above, according to the present invention, an image forming apparatus in which applications can be installed is provided, and the image forming apparatus includes: an application information obtaining part for obtaining application information that is used for determining whether an application is installable in the image forming apparatus.

According to the present invention, it can be determined whether an application is installable.

In the image forming apparatus, the application information obtaining part obtains the application information that is included in an execution file of the application by using interprocess communication between the application information obtaining part and the application.

The application information obtaining part may obtain the application information from a file separate from the application. For example, the application information can be obtained via a network.

In the image forming apparatus, the application causes the image forming apparatus to perform: a step of determining whether to provisionally launch the application or to normally launch the application according to a request from the application information obtaining part; a step of providing the application information to the application information obtaining part if the application is provisionally launched. There, normal launch or provisional launch can be selected.

The image forming apparatus may further includes a storage for storing the application information obtained by the application information obtaining part. The storage is at least one of a hard disk, a nonvolatile memory and a memory card, and the application information obtaining part obtains the application information by reading information stored in the storage.

In addition, the application information includes a product ID that is specific for the application. The application information may further includes at least one of a vendor name, an application name, version information and resource information.

In the image forming apparatus, the storage stores product IDs of installable applications, and the image forming apparatus determines whether a target application is installable by checking whether a product ID of the target application is stored. Thus, it becomes easy to determine whether an application is installable.

In addition, according to the present invention, an image forming apparatus including an operation panel for displaying or inputting operation information is provided, and the image forming apparatus includes:

an information obtaining part for obtaining application information on an application to be used in the image forming apparatus; and a display part for displaying the application information or information related to the application information on the operation panel.

According to the present invention, since application information is displayed on the operation panel, the user can determine whether an application is installable.

The image forming apparatus may further includes a determination part for determining whether the application is installable in the image forming apparatus according to the application information obtained by the information obtaining part. Accordingly, the image forming apparatus can automatically determine whether an application is installable. The display part can display one or more installable applications on the operation panel according to the result of determination by the determination part, wherein an installable application can be selected from the one or more installable applications.

In addition, the display part can display a reason why an application is not installable according to the result of determination by the determination part. According to this invention, the user can know the reason why the application is not installable. For example, if an application is installable due lack of a hardware resource, the user can know the reason.

In addition, the display part can display a warning when an application selected for install is already installed in the image forming apparatus.

In the image forming apparatus, the application information or the information related to the application information that is displayed on the operation panel can be information necessary for determining whether the application is installable. According to this configuration, the user can determines whether an application is installable.

The image forming apparatus may further include a part for causing a remote apparatus to display a screen that is the same as a screen displayed on the operation panel. Accordingly, the user can operate the image forming apparatus from the remote apparatus.

In addition, according to the present invention, an image forming apparatus in which a plurality of applications can be installed is provided, in which the image forming apparatus includes:

an information obtaining part for obtaining necessary resource information for executing an application and available resource information in the image forming apparatus; and a launch restriction part for comparing the necessary resource information and the available resource information, and performing launch restriction process on the application according to the result of comparison between the necessary resource information and the available resource information.

According to the present invention, the image forming apparatus can prevent erroneous launch of an application for which resources are lacking. Thus, the image forming can operate stably.

In the image forming apparatus, the image obtaining part can obtain, as the necessary resource information, a usage record of a resource used by the application. Therefore, accurate information can be obtained. The information obtaining part can obtain the usage record from system information that holds usage records used by processes in the image forming apparatus.

In the image forming apparatus, the necessary resource information indicates a necessary resource amount and the available resource information indicates an available resource amount, and wherein the launch restriction part can display a ratio of the necessary resource amount to the available resource amount on an operation panel. According to this configuration, the user can grasp the ratio of the necessary resource amount to the available resource amount.

In addition, the launch restriction part can display a warning on an operation panel when the necessary resource amount is larger than the available resource amount. Therefore, the user can know lack of resources for an application.

In the image forming apparatus, if the application can operate by using a second resource that is different from a first resource corresponding to the necessary resource amount, the launch restriction part causes the application to use the second resource instead of the first resource. Therefore, even when a resource is lacking, the application can be executed by using another resource.

In addition, according to the present invention, an image forming apparatus in which a plurality of applications can be installed is provided in which the image forming apparatus includes:

a part for referring to a database which includes, for each application, information on propriety of combination of applications; and a launch control part for performing launch control process on an application according to the information on propriety.

According to the present invention, proper applications can be launched according to the information on propriety of combination of applications.

In the image forming apparatus, the information on propriety indicates incompatible relationship or unrecommended relationship among a plurality of applications, and the launch control part can display a screen for selecting at least one application from among the plurality of applications on an operation panel. Therefore, the user can select a desired application among mutually incompatible applications.

The launch control part may launch at least one application among the plurality of applications or performs launch setting on at least one application among the plurality of applications. According to this configuration, the image forming apparatus can prevent mutually incompatible applications from being launched simultaneously.

In addition, the launch control part may display a warning screen on an operation panel when combination of applications is unrecommended. Since the warning screen is displayed, the user can determines whether to launch one application or both of the applications.

In the image forming apparatus, the information on propriety can indicate a level of the incompatible relationship or the unrecommended relationship, in which the launch control part can perform the launch control process according to the level.

In the image forming apparatus, the information on propriety may indicate indispensable relationship or recommended relationship among a plurality of applications, wherein the launch control part can display a screen showing an indispensable or recommended application for another application on an operation panel. According to this configuration, the user can select the indispensable or recommended application.

In addition, launch control part can launch an indispensable or recommended application for another application, or performs launch setting on the indispensable or recommended application for another application. When the indispensable or recommended application is not installed in the image forming apparatus, the launch control part can download the indispensable or recommended application from a server via a network. Also, the launch control part can display information that can be used for obtaining the indispensable or recommended application.

In the image forming apparatus, the information on propriety can further indicate a level of the indispensable relationship or the recommended relationship, in which the launch control part can perform the launch control process according to the level.

The present invention is not limited to the specifically disclosed embodiments, and variations and modifications may be made without departing from the scope of the present invention.

What is claimed is:

1. An apparatus, comprising:

a user interface for displaying or inputting operation information;

a memory configured to store a plurality of application programs; and a determination part configured to determine whether the plurality of application programs are installable in the apparatus, based on first information obtained from the plurality of application programs and compared against second information obtained from another plurality of application programs, the first information including at least a first product identification, first product version, first install judgment, and first required resources for the plurality of application programs, wherein the first install judgment is a result of a comparison between the first required resources information and available resource information of the apparatus;

the second information including at least a second product identification, second product version, second install judgment, and second required resources for the another plurality of application programs, and the another plurality of application programs are already installed in the apparatus, wherein the determination part is further configured to:

determine whether third information is stored, the third information is product information data including at least the first product identification, the first product version, first install judgment, and the first required resources for the plurality of application programs, obtain the first information from the third information if the third information is stored, and obtain the first information directly from the plurality of application programs if the third information is not stored, create the product information data including the first information based on obtaining the first information directly from one of the plurality of application programs if the third information is not stored, and wherein the user interface is configured to display at least one installable application program of the plurality of programs in a selectable manner, and at least one not installable application program of the plurality of programs in the selectable manner, based on a result of determination by the determination part.

2. The apparatus as claimed in claim 1, wherein:

the determination part stores the result of determination in an information storing memory of the apparatus, and when the application program that is not installable is selected, the user interface displays a reason why an application program is not installable based on the result of determination stored in the information storing memory.

3. The apparatus as claimed in claim 1, further comprising:

an information obtaining part configured to launch at least one of the plurality of application programs in a way that is different from normal launching and to obtain the first information from the launched at least one of the plurality of application programs, wherein the launching different from the normal launching is to execute an application information providing program, in the launched at least one of the plurality of application programs, for providing the first information to the information obtaining part.

4. The apparatus as claimed in claim 3, wherein:

the information obtaining part refers to a predetermined storage location of the apparatus, and obtains the first information from the at least one of the plurality of application programs when registration information of the at least one of the plurality of application programs is not stored in the predetermined storage location.

5. A method, comprising: determining whether a plurality of application programs stored in a memory is installable in an apparatus, based on first information obtained from the plurality of application programs and compared against second information obtained from another plurality of application programs, the first information including at least a first product identification, first product version, first install judgment, and first required resources for the plurality of application programs, wherein the first install judgment is a result of a comparison between the first required resources information and available resource information of the apparatus, the second information including at least a second product identification, second product version, second install judgment, and second required resources for the another plurality of application programs, and the another plurality of application programs are already installed in the apparatus, wherein the determining further comprises:

determining whether third information is stored, the third information is product information data including at least the first product identification, the first product version, first install judgment, and the first required resources for the plurality of application programs, obtaining the first information from the third information if the third information is stored, and obtaining the first information directly from the plurality of application programs if the third information is not stored; and create product information data including the first information based on obtaining the first information directly from one of the plurality of application programs if the third information is not stored, displaying at least one installable application program of the plurality of programs in a selectable manner, and at least one not installable application program of the plurality of programs in the selectable manner, based on a result of the determining.

6. The method as claimed in claim 5, further comprising:

storing a resulting of the determining in a memory of an apparatus; and displaying a reason why an application program is not installable based on the result of the determining which has been stored.

7. The method as claimed in claim 5, further comprising:

launching at least one of the plurality of application programs in a way that is different from normal launching and obtaining first information from the launched at least one of the plurality of application programs, wherein the launching different from the normal launching is to execute an application information providing program, in the launched at least one of the plurality of application programs, for providing the first information to the information obtaining part.

8. The method as claimed in claim 7, wherein:

the launching refers to a predetermined storage location of an apparatus, and obtains the first information from the at least one of the plurality of application programs when registration information of the at least the one of the plurality of application programs is not stored in the predetermined location.

9. A non-transitory computer readable storage medium including computer code which when executed causes a computer processor to perform the steps of:

determining whether a plurality of application programs stored in a memory are installable in an apparatus based on first information obtained from the plurality of application programs and compared against second information obtained from another plurality of application programs, the first information including at least a first product identification, first product version, first install judgment, and first required resources for the plurality of application programs, wherein the first install judgment is the result of a comparison between the first required resources information and available resource information of the apparatus, the second information including at least a second product identification, second product version, second install judgment, and second required resources for the another plurality of application programs, and the another plurality of application programs being already installed in the apparatus, wherein the determining further comprises:

determining whether third information is stored, the third information is product information data including at least the first product identification, the first product version, and the first required resources for the plurality of application programs, obtaining the first information from the third information if the third information is stored, and obtaining the first information directly from the plurality of application programs if the third information is not stored; and creating the product information data including the first information based on obtaining the first information directly from one of the plurality of application programs if the third information is not stored, displaying one or more installable application programs of the plurality of application programs in a selectable manner, and at least one not installable application program of the plurality of programs in the selectable manner, based on a result of the determining.

10. The non-transitory computer readable storage medium according to claim 9 including further computer code which when executed causes the computer processor to further perform:

storing a resulting of the determining in a memory of an apparatus; and displaying a reason why an application program is not installable based on the result of the determining which has been stored.

11. The non-transitory computer readable storage medium according to claim 9 including further computer code which when executed causes the computer processor to further perform:

launching at least one of the plurality of application programs in a way that is different from normal launching and obtaining first information from the launched at least one of the plurality of application programs, wherein the launching different from the normal launching is to execute an application information providing program, in the launched at least one of the plurality of application programs, for providing the first information to the information obtaining part.

12. The non-transitory computer readable storage medium according to claim 11, wherein:

the launching refers to a predetermined storage location of an apparatus, and obtains the first information from the at least one of the plurality of application programs when registration information of the at least the one of the plurality of application programs is not stored in the predetermined location.

* * * * *